US006686879B2

(12) United States Patent
Shattil

(10) Patent No.: US 6,686,879 B2
(45) Date of Patent: Feb. 3, 2004

(54) METHOD AND APPARATUS FOR TRANSMITTING AND RECEIVING SIGNALS HAVING A CARRIER INTERFEROMETRY ARCHITECTURE

(75) Inventor: Steve J. Shattil, Boulder, CO (US)

(73) Assignee: Genghiscomm, LLC, Boulder, CO (US)

( * ) Notice: Subject to any disclaimer, the term of this patent is extended or adjusted under 35 U.S.C. 154(b) by 0 days.

(21) Appl. No.: 09/906,257

(22) Filed: Jul. 16, 2001

(65) Prior Publication Data

US 2002/0034191 A1 Mar. 21, 2002

Related U.S. Application Data

(63) Continuation-in-part of application No. 09/022,950, filed on Feb. 12, 1998, now Pat. No. 5,955,992.
(60) Provisional application No. 60/219,482, filed on Jul. 19, 2000, and provisional application No. 60/163,141, filed on Nov. 2, 1999.

(51) Int. Cl.[7] .................................................. H04B 7/00
(52) U.S. Cl. ........................................................ 342/367
(58) Field of Search ................................ 342/361, 367, 342/378, 383

(56) References Cited

U.S. PATENT DOCUMENTS 3,829,605 A * 8/1974 Dickopp ................ 178/5.4 CD
6,438,173 B1 * 8/2002 Stantchev ................... 375/260

* cited by examiner

Primary Examiner—Dao Phan
(74) Attorney, Agent, or Firm—Steven J. Shattil

(57) ABSTRACT

Principles of quantum interferometry are used to create a signal architecture (known as carrier interferometry) for wireless and waveguide electromagnetic-wave communications. Carrier interferometry provides unprecedented bandwidth efficiency and enables substantial improvements in interference rejection, power efficiency, and system versatility. The carrier interferometry architecture also enables simpler transceiver designs that facilitate digital up-conversion and down-conversion.

15 Claims, 58 Drawing Sheets

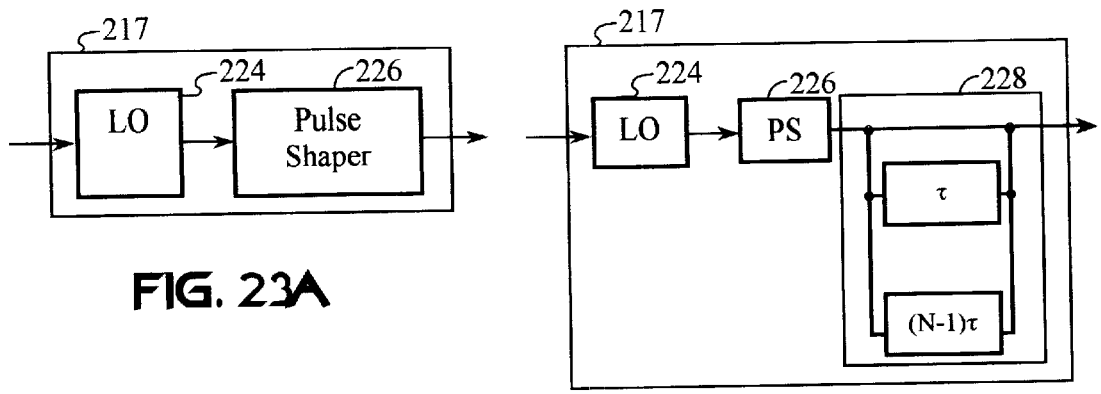
FIG. 23A
FIG. 23B
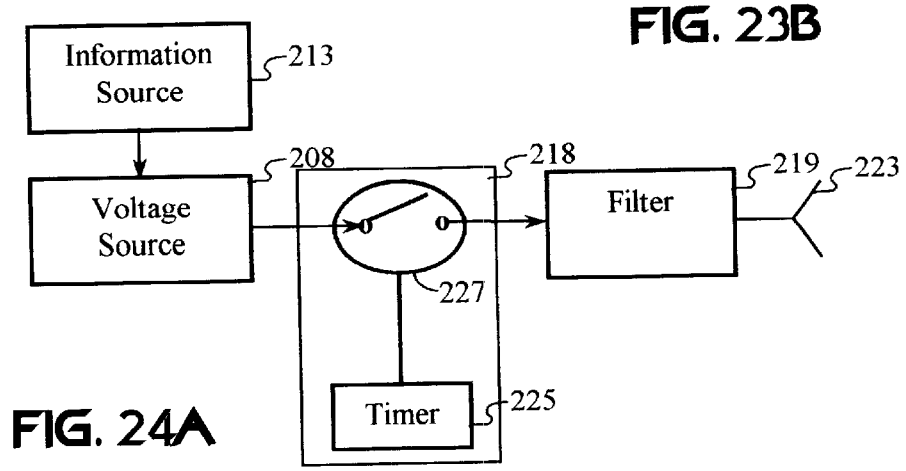
FIG. 24A
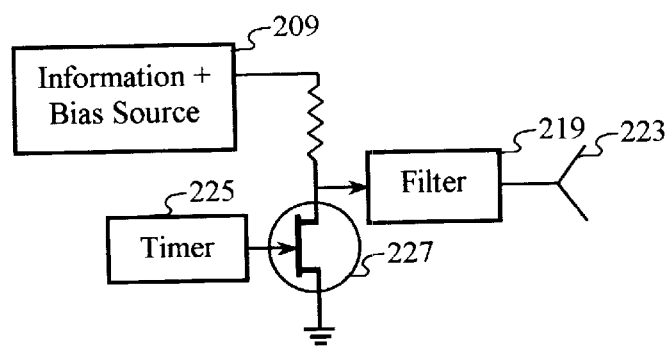
FIG. 24B

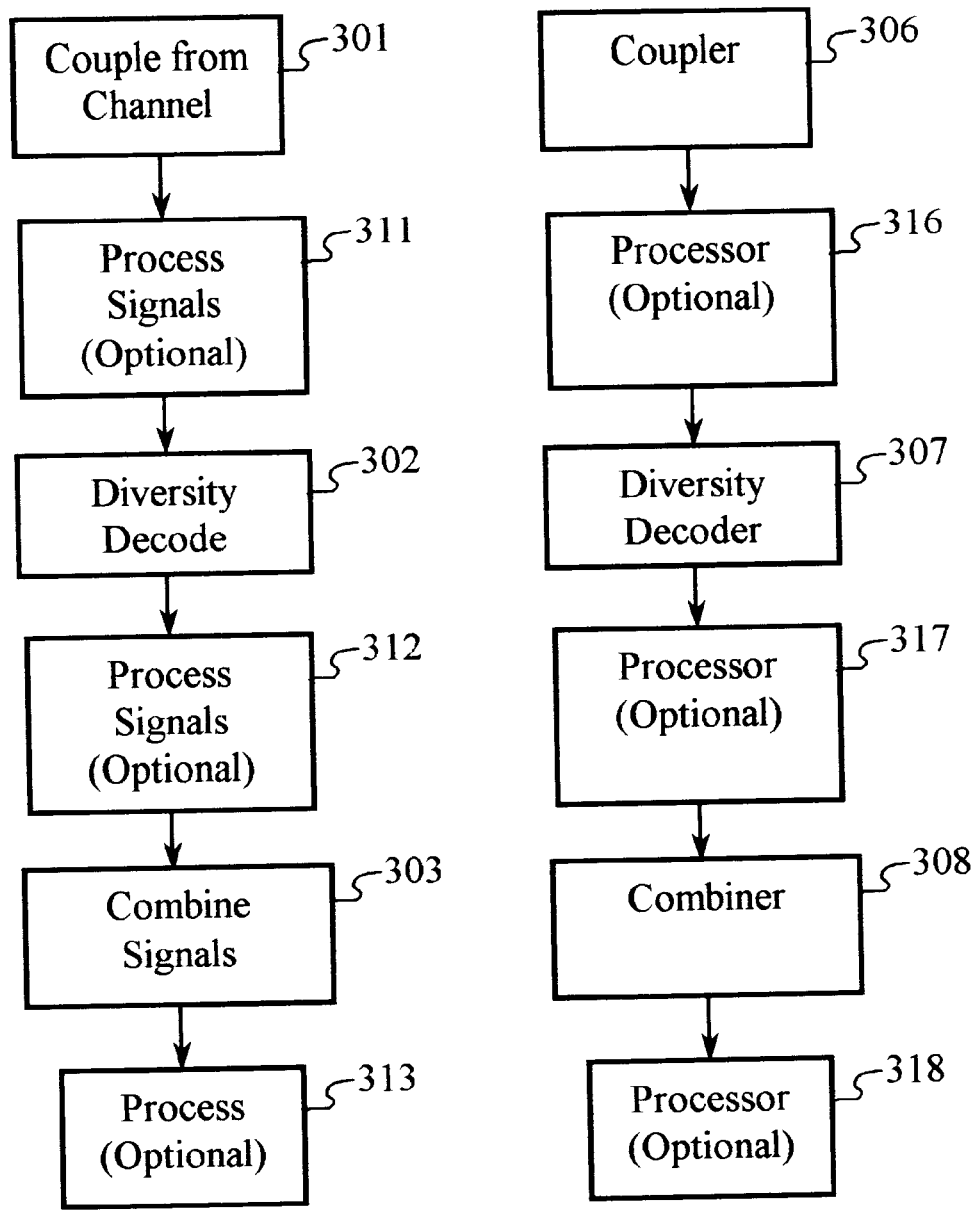

| | ┌─351 | ┌─352 |
|---|---|---|
| 353a | $T_1 + t_1$<br>$T_1 + t_2$<br>⋮<br>$T_1 + t_N$ | Sample 1 collected from Sampler 1: $S_{11}(t)$<br>Sample 1 collected from Sampler 2: $S_{12}(t)$<br>⋮<br>Sample 1 collected from Sampler N: $S_{1N}(t)$ |
| 353b | $T_2 + t_1$<br>$T_2 + t_2$<br>⋮<br>$T_2 + t_N$ | Sample 2 collected from Sampler 1: $S_{21}(t)$<br>Sample 2 collected from Sampler 2: $S_{22}(t)$<br>⋮<br>Sample 2 collected from Sampler N: $S_{2N}(t)$ |
| ⋮ | ⋮ | ⋮ |
| 353M | $T_M + t_1$<br>$T_M + t_2$<br>⋮<br>$T_M + t_N$ | Sample M collected from Sampler 1: $S_{M1}(t)$<br>Sample M collected from Sampler 2: $S_{M2}(t)$<br>⋮<br>Sample M collected from Sampler N: $S_{MN}(t)$ |

FIG. 36D

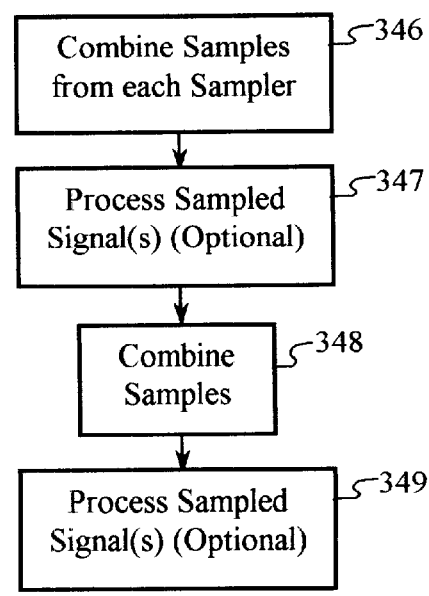

FIG. 36E

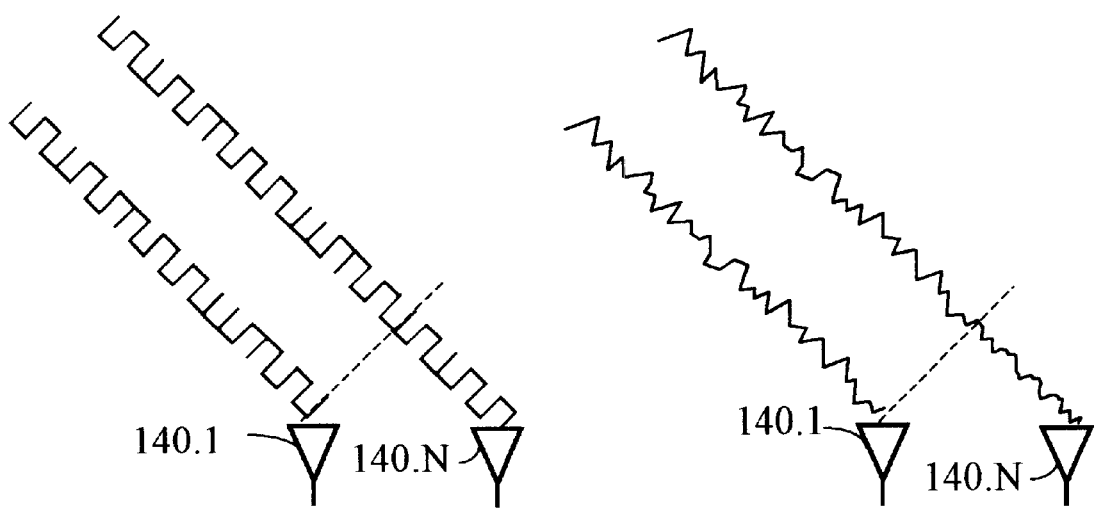
FIG. 40A  FIG. 40B
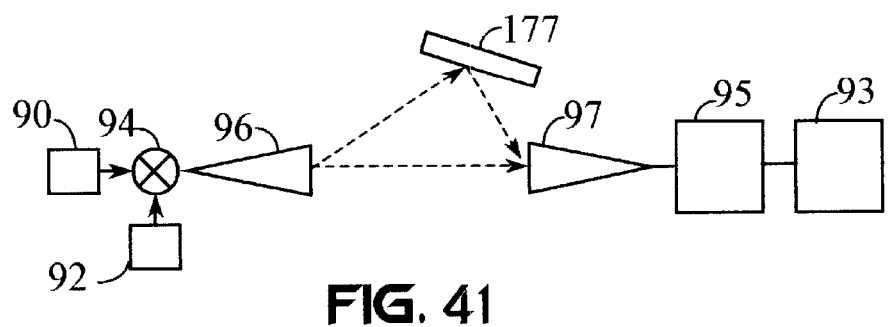
FIG. 41
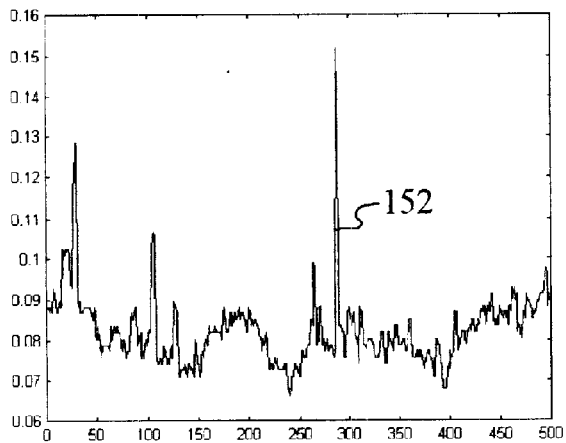
FIG. 42A

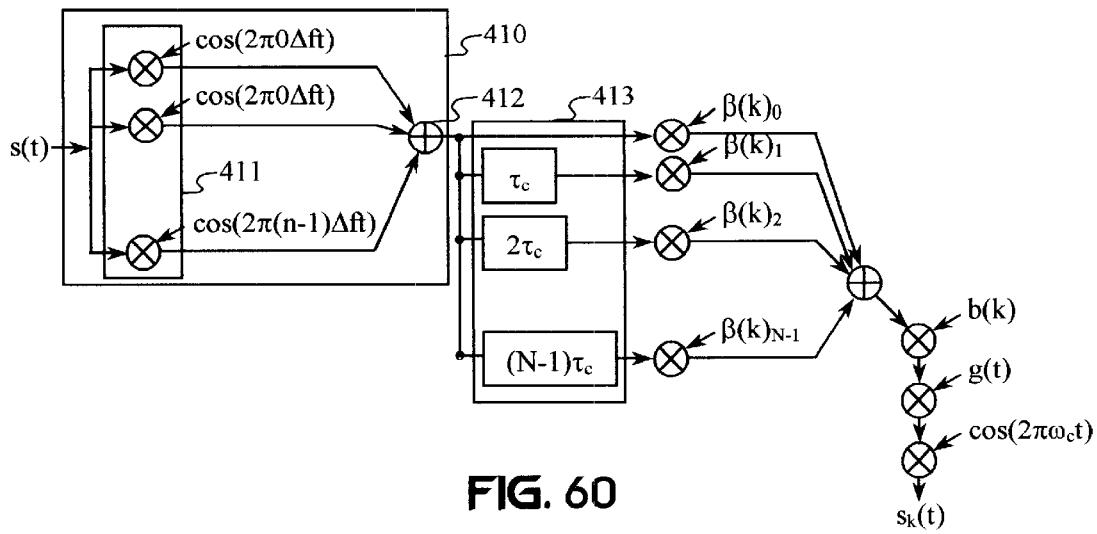
FIG. 60
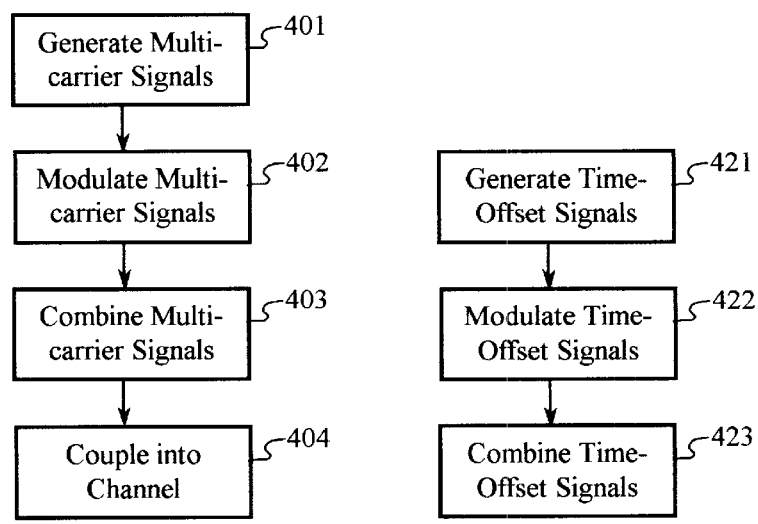
FIG. 59          FIG. 61A

METHOD AND APPARATUS FOR TRANSMITTING AND RECEIVING SIGNALS HAVING A CARRIER INTERFEROMETRY ARCHITECTURE

RELATED APPLICATIONS

This application claims priority to U.S. Pat. Appl. No. 60/219,482, filed on Jul. 19, 2000, U.S. Pat. Appl. No. 60/163,141, filed on Nov. 2, 1999, and a CIP of U.S. Pat. application Ser. No. 09/022,950, filed on Feb. 12, 1998, which is now U.S. Pat. No. 5,955,992.

FIELD OF THE INVENTION

The present invention relates generally to wireless electromagnetic-wave communications, and particularly to interferometry and parallel signal-processing techniques that enhance bandwidth efficiency and reduce complexity of transmitters and receivers.

BACKGROUND OF THE INVENTION

Wireless communications includes a large number of applications that service a wide variety of communication needs. Different communication markets are characterized by different transmission protocols and frequency bands. These markets are encumbered by technology fragmentation resulting from competitors who have a vested interest in promoting their own proprietary transmission protocols and signal-processing technologies. This fragmentation impedes compatibility between different applications and systems, reduces bandwidth efficiency, increases interference, and limits the usefulness of wireless communications. Thus, there is an overwhelming need to unify these technologies.

Throughout history, the quest to understand the universe has focused on discovering the elementary components of the universe. Knowledge of the properties of fundamental elements can provide an understanding of the properties of complex combinations of those elements. From an engineering perspective, the properties of a complex combination of elements are determined by properties of the elements and the manner in which the elements are combined.

Many aspects of conventional Quantum theory, as well as more recent discoveries in high-energy physics, indicate that a wave-based phenomena is the fundamental basis of all matter and energy. Quantum theory also describes a complex state as a superposition between component waveforms, the superposition resulting from constructive and/or destructive interference between the waveforms.

The idea of using multiple low-rate communication channels to transmit a large amount of data is well known. U.S. Pat. No. 5,960,032 describes dividing a high-rate data stream into a plurality of parallel low-rate bit streams that are each modulated with a direct-sequence spreading code. Other methods of multicarrier processing are described in U.S. Pat. No. 6,061,405 and U.S. Pat. No. 5,729,570. Although several prior-art methods involve redundantly modulating multiple component waveforms, none of these methods achieve the benefits of the present invention that are enabled by interferometrically combining the waveforms. For example, U.S. Pat. Nos. 5,519,692 and 5,563,906 describe geometric harmonic modulation (GHM) in which preamble and traffic waveforms are created from multiple carrier frequencies (tones). GHM waveforms comprise tones incorporating a binary phase code where signal phases are 0 or $-\pi/2$. The binary phase offsets, which are applied to the tones, provide the spreading codes. Orthogonality of GHM signals is realized upon correlation with a reference signal at a receiver. A preamble carrier waveform is constructed by summing the tones. Therefore, the preamble signals are similar to Multicarrier CDMA (MC-CDMA) signals.

Each receiver monitors the preamble signals for its own phase code and then despreads and decodes the appended traffic waveforms. The traffic waveforms are products of the tones. The receiver generates a reference waveform from a product of tones having phase offsets that correspond to the receiver's phase code. The reference waveform is correlated with the received signals to produce a correlation result that is integrated over the data-bit duration and over all tones.

GHM uses binary phase offsets instead of incremental poly-phase offsets. Thus, GHM does not provide carriers with phase relationships that enable the superposition of the carriers to have narrow time-domain signatures. Consequently, received GHM signals require processing by a correlator, whereas signals that are orthogonal in time can be processed using simpler signal-processing techniques, such as time sampling and weight-and-sum. Furthermore, GHM does not achieve the capacity and signal-quality benefits enabled by time-orthogonal signals.

U.S. Pat. No. 4,628,517 shows a radio system that modulates an information signal onto multiple carrier frequencies. Received carriers are each converted to the same intermediate-frequency (IF) signal using a bank of conversion oscillators. The received signals are then summed to achieve the benefits of frequency diversity. In this case, frequency diversity is achieved at the expense of reduced bandwidth efficiency. The process of converting the received signals to the same frequency does not allow orthogonality between multiple information signals modulated on the same carriers.

In order to accommodate the processing speeds of conventional signal-processing techniques, high-frequency carrier signals are typically down converted to an IF before demodulation. In conventional receivers, components in the IF sections comprise the majority of components of the receiver.

Conventional down converters include electrical components whose properties are frequency dependent. Consequently, conventional down converters are designed to operate at specific frequencies or frequency bands and do not have flexibility to adapt to different frequencies.

Conventional down converters employ mixers, which generate undesired intermodulation and harmonic products. Filters are needed to remove the undesired signals. Such filters reduce the power level of the modulated carrier signals and, thus, require amplifiers and additional power sources for the amplifiers.

It is preferable to reduce the number of filters and mixers in a wireless system because these components attenuate desired signals and require additional low-noise amplifiers to compensate for the reduced signal strength. Low-noise amplifiers require substantial power to operate. High-frequency amplifiers typically require more power than low-frequency amplifiers. In a portable system, such as a cellular telephone, low-noise amplifiers use a substantial portion of the system's power.

Since many radio-frequency (RF) components, such as amplifiers, filters, and impedance-matching circuits are highly frequency dependent, receivers that are designed for one frequency band are usually not suitable for applications that make use of other frequency bands. Similarly, receivers designed for a particular transmission protocol are typically not adaptable to other protocols. Furthermore, receivers are typically not adaptable to variations of the protocol for which they are designed.

Conventional receiver components are typically positioned over multiple integrated-circuit (IC) substrates to accommodate processing in RF, IF, and baseband frequencies. Receivers that use multi-mode processors (i.e., processors having separate systems designed to process different transmission protocols) use multiple ICs. Additional signal amplification is often required when bridging multiple chips. Thus, the use of multiple substrates introduces additional costs beyond the costs associated with producing the ICs.

What is needed is an underlying signal architecture and signal-processing method that not only enhances signal quality and system capacity, but also simplifies transmission and reception of communication signals. Accordingly, it is desirable that a proposed signal-processing method eliminate the need for IF processing and, thus, substantially reduce the number of components in a receiver. It is preferable that a proposed signal-processing technique enable parallel processing, adaptability to different frequency ranges, compatibility with different transmission protocols, interference mitigation, and reduced distortion.

In commercial telecommunication systems, it is well known that technology complexity leads to higher manufacturing costs, reduced reliability, and longer development cycles. For example, while IS-95 provided the highest spectrum efficiency of second-generation mobile systems, it also incurred higher costs and a longer development time to provide forward error correction, Rake receivers, power control, and soft handoff. Accordingly, it is preferable that a proposed communication system enable simple signal-processing methods and systems for transmission and reception. It is only through a simple, yet elegant signal processing technique that all of the needs discussed herein can be addressed without compromise.

SUMMARY OF THE INVENTION

The present invention is directed to systems and methods for transmitting and receiving Carrier Interferometry (CI) signals, such as CIMA (also known as multicarrier interferometry) signals. The frequency spectrum of an electromagnetic signal illustrates the relative amplitudes of sine waves that, when summed together with the correct phase, reconstruct the signal in the time domain. A time-limited signal may have an infinite number of discreet sinusoidal frequency components. However, modulating the sinusoidal components provides a finite number of continuous-spectrum components. The time-domain representation of an electromagnetic signal can be constructed by generating a plurality of sine waves that implement the relative amplitudes and phases contained in the frequency spectrum of the electromagnetic signal.

CI uses a baseband information signal to redundantly modulate a plurality of carrier signals. A superposition of the carriers produces a baseband-frequency envelope that represents the information signal. Controlling the relative amplitudes, phases, and/or frequencies of individual carrier signals produces a superposition signal having a desired time-domain profile.

In "Quantum theory, the Church-Turing principle and the universal quantum computer," David Deutsch describes Quantum theory as a "theory of parallel interfering universes." CI manipulates fundamental wave components to create constructive and destructive interference zones from which desired communication signals are created. The benefits of CI include unprecedented bandwidth efficiency, superior signal quality, exceptional interference rejection, diversity benefits, reduced power requirements, adaptability to any wireless or waveguide transmission protocol, parallel processing, direct down-conversion, and direct up-conversion.

The reception method of the invention makes use of the diversity and robustness of CI to substantially reduce interference and distortion that occurs in a communication channel. Furthermore, information signals recovered from the superposition of multiple carriers are highly insensitive to phase jitter, frequency distortions, and timing offsets.

The initial market for the Carrier Interferometry Underlying Architecture is communication infrastructure. Applications include mobile wireless systems, fixed-point wireless local loop, smart antennas, voice-over-IP, secure communications, very high-bit-rate digital subscriber line, and communications applications that have traditionally used reprogrammable devices such as digital-signal processing (DSPs) and FPGAs. Objectives of the present invention's methods and systems are summarized by the following description of attributes and embodiments:

A method and system for transmitting electromagnetic signals that is easily adaptable to any wireless transmission protocol.

A method and system for receiving electromagnetic signals that is easily adaptable to any wireless transmission protocol.

A method and system for providing an underlying multicarrier architecture that substantially improves the quality and increases the capacity of any wireless protocol.

A method and system for providing wireless communications with an underlying signal architecture that enables simple designs for transmitters and receivers.

A method and system that uses slow, parallel signal-processing techniques to transmit and receive wideband and ultra-wideband communication signals.

A method and system that enables spatial multiplexing without antenna arrays.

A method and system that exploits multipath effects to enhance spatial multiplexing.

A method and system that provides diversity benefits of a spread-spectrum system to narrowband communication protocols, such as TDMA.

A method and system that provides narrowband-processing benefits, such as enhanced array-processing capabilities, to wideband and ultra-wideband communication protocols.

A method and system that provides an underlying signal architecture that enables sub-spatial overlay procedures (such as spatial interferometry multiplexing) to provide unprecedented bandwidth efficiencies to all communication protocols.

A method and system that exploits dispersive and other nonlinear waveguide characteristics to enhance the capacity of waveguide communications.

A method and system that enables a seamless conversion between waveguide and wireless transmission protocols.

A method and system for directly down converting modulated carrier signals to demodulated baseband signals.

A method and system for improving energy transfer of an under sampling process.

A method and system employing under sampling to down convert modulated carrier signals in which the method and system are substantially insensitive to carrier frequency drifts and offsets, such as Doppler shifts and transmitter-frequency instability.

A method and system for down converting electromagnetic signals that is easily adapted to different frequencies.

A method and system for down converting electromagnetic signals that is adaptable to any transmission protocol.

A method and system for down converting electromagnetic signals using a local-oscillator frequency that is substantially lower than the carrier frequency.

A method and system for down converting electromagnetic signals using a low sampling frequency and a simple anti-aliasing filter.

A method and system for down converting electromagnetic signals that uses fewer filters than conventional down converters.

A method and system for down converting electromagnetic signals that uses less power than conventional down converters.

A method and system for down converting electromagnetic signals that uses fewer components than conventional down converters.

A method and system for down converting electromagnetic signals that can be implemented on an integrated circuit.

Further features and advantages of the invention, as well as the structure and operation of various embodiments of the invention, are described in detail with reference to the accompanying drawings.

BRIEF DESCRIPTION OF THE DRAWINGS

The present invention is described with reference to the accompanying drawings:

FIG. 23A shows an embodiment of a frequency controller.

FIG. 23B shows an embodiment of a frequency controller.

FIG. 24A shows an embodiment of a pulse generator.

FIG. 24B shows an embodiment of a pulse generator.

FIG. 26 shows a generalized method for receiving CI signals.

FIG. 27 shows a generalized structural embodiment of a receiver that performs the operational steps shown in FIG. 26.

FIG. 36D shows a table that illustrates relative times in which samples of an input signal are collected by a plurality of samplers.

FIG. 36E illustrates the first combining method shown in FIG. 36D.

FIG. 40A shows relative time offsets between two modulated coded signals received or transmitted from two spatially separated antennas.

FIG. 40B shows relative time offsets between two modulated noise signals received or transmitted from two spatially separated antennas.

FIG. 41 illustrates effects of a multipath environment on a transmitted signal.

FIG. 42A shows an amplitude-versus-time profile of a received signal in an outdoor multipath environment.

FIG. 53 shows an embodiment of a coherence-interferometry radio receiver.

FIG. 54A shows a pulse-shaped carrier signal and its associated pulse envelope having a predetermined phase.

Figure 54A:
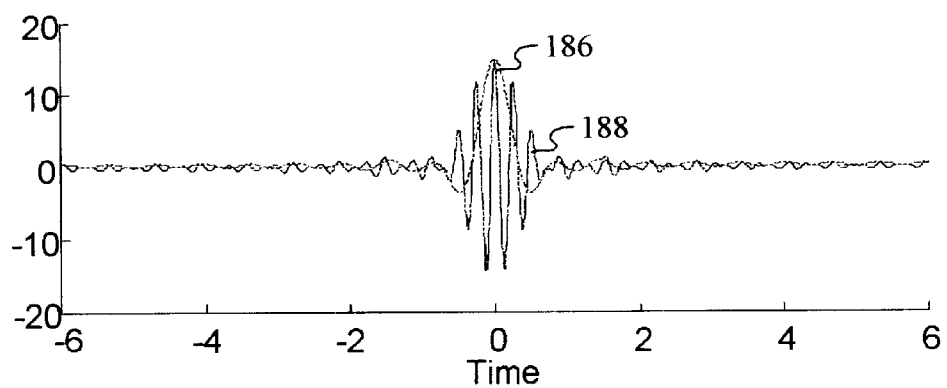
Figure 54B:
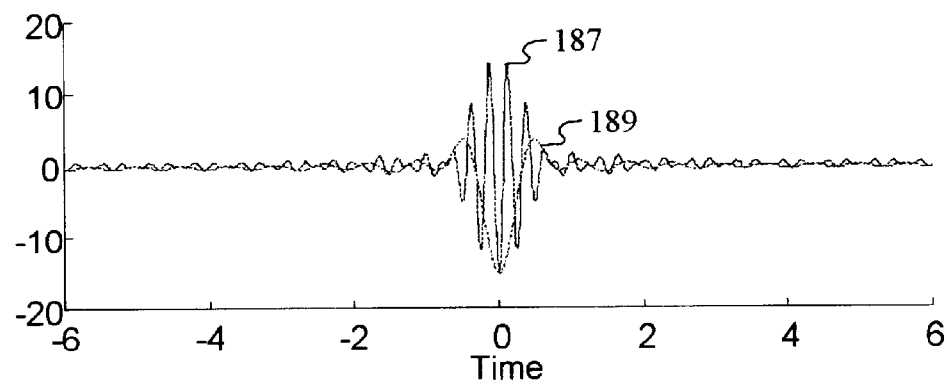

FIG. 54B. shows a pulse-shaped carrier signal and its associated pulse envelope shifted by 180 degrees with respect to the carrier signal and pulse envelope shown in FIG. 54A.

Figure 55A:
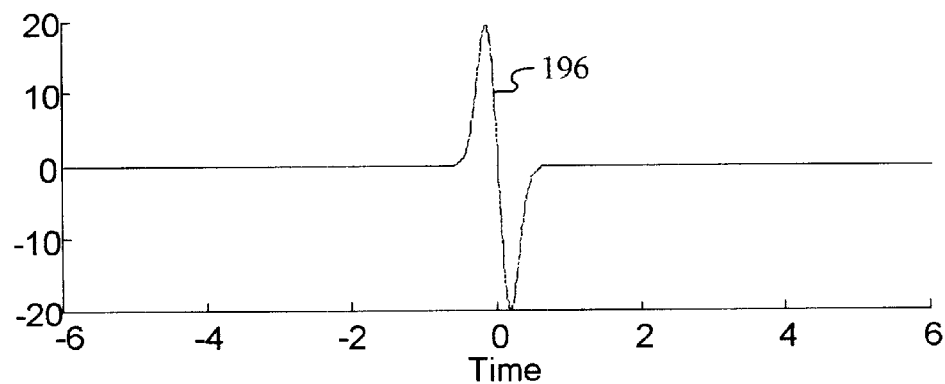

FIG. 55A shows a monocycle pulse.

Figure 55B:
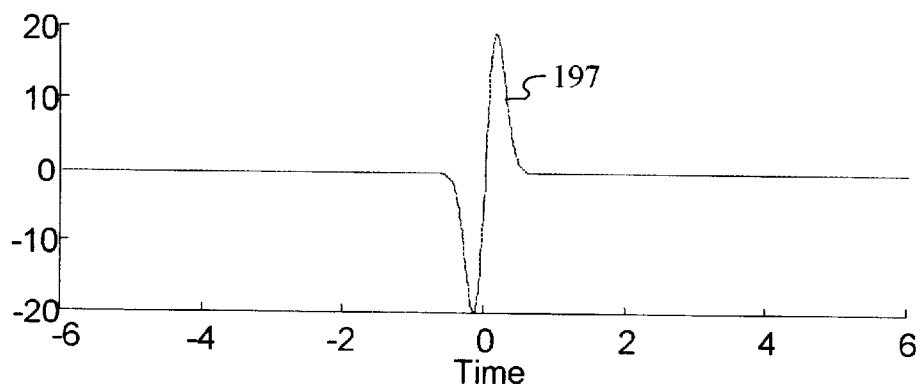

FIG. 55B shows a monocycle pulse having a 180-degree relative phase shift with respect to the monocycle pulse shown in FIG. 55A.

Figure 56A:
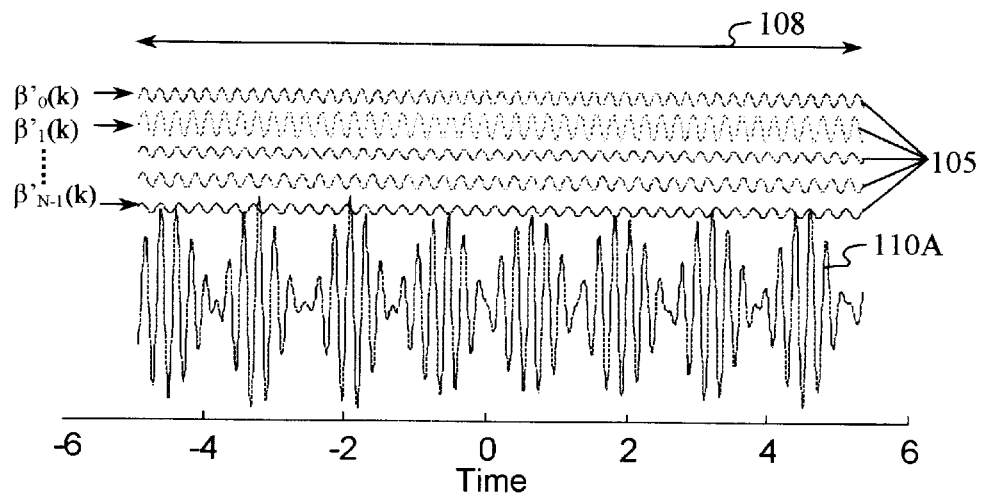

FIG. 56A shows a plurality of weighted carriers that can be combined to form a superposition signal.

Figure 56B:
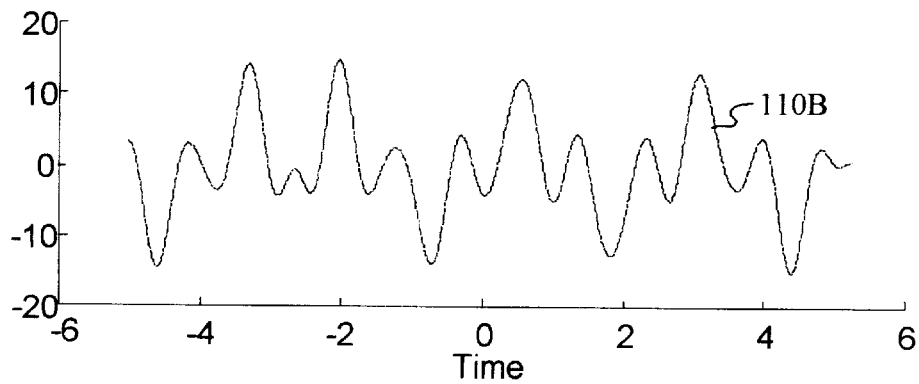

FIG. 56B shows a superposition envelope of the superposition signal shown in FIG. 56A.

Figure 57A:
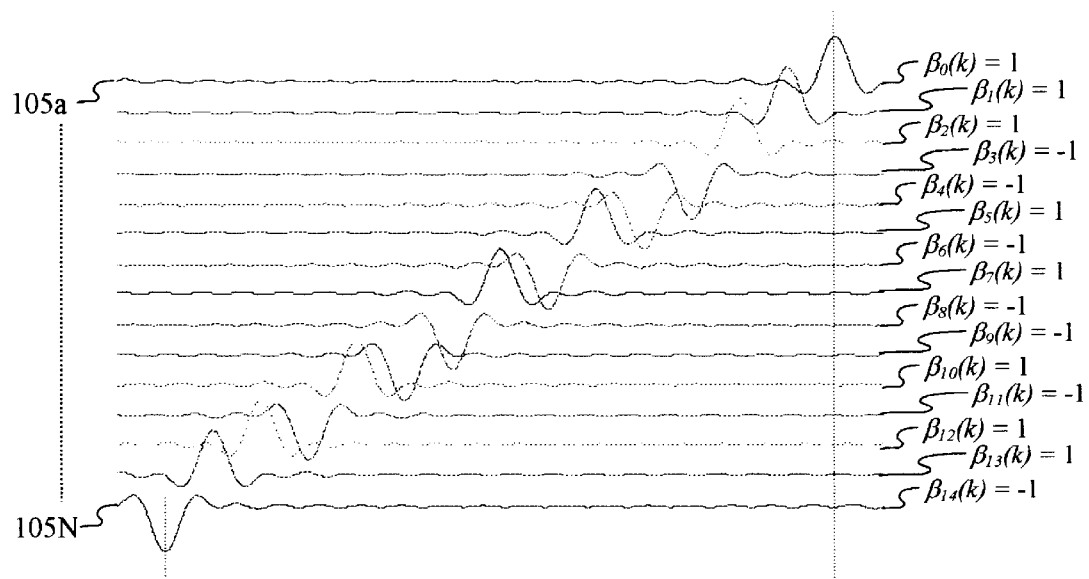

FIG. 57A shows a plurality of weighted carriers that can be combined to form a superposition signal that is a direct-sequence CDMA signal.

Figure 57B:
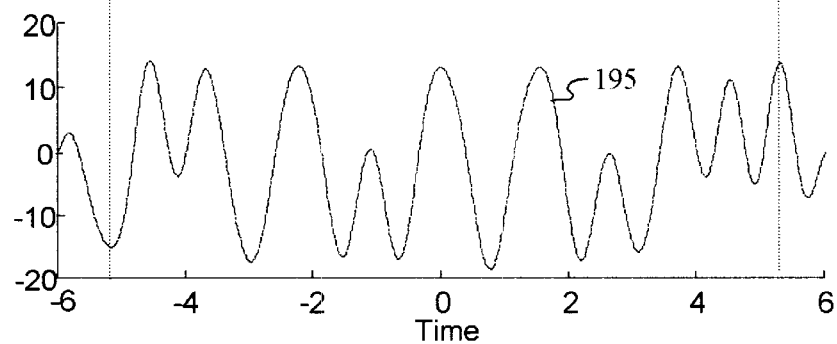

FIG. 57B shows a portion of a superposition signal that is a portion of a direct-sequence CDMA signal.

Figure 58A:
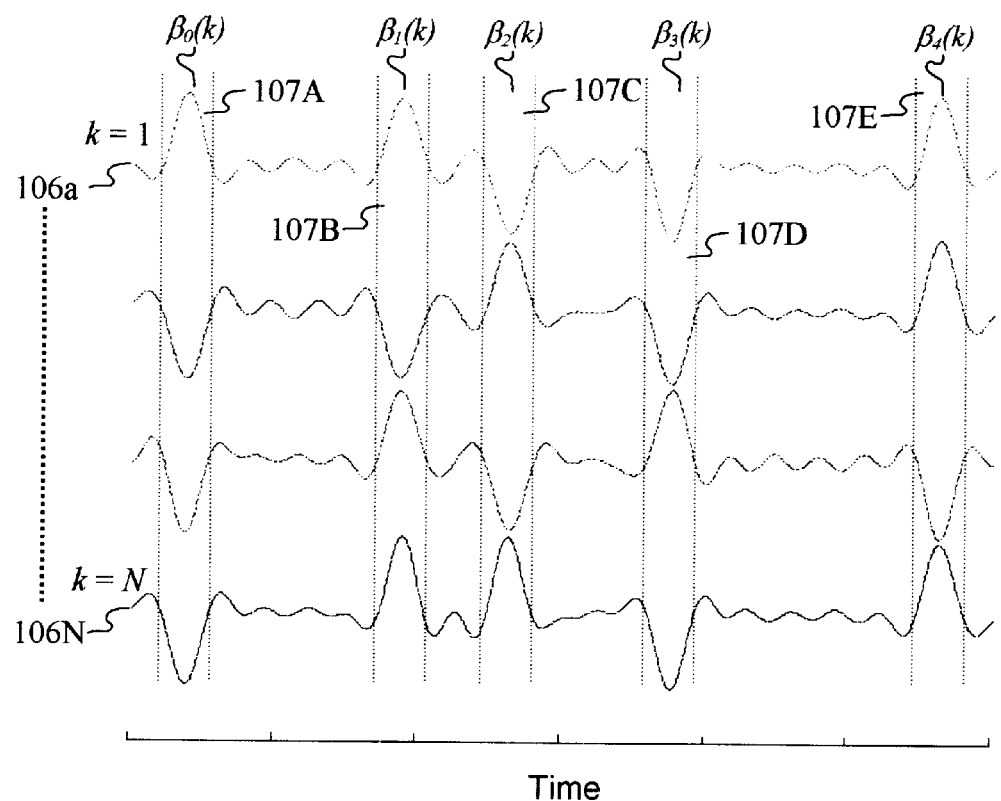

FIG. 58A shows a portion of a plurality of time-offset multiplex code signals having similar time-offset multiplex codes and unique phase-shift modulation codes.

Figure 58B:
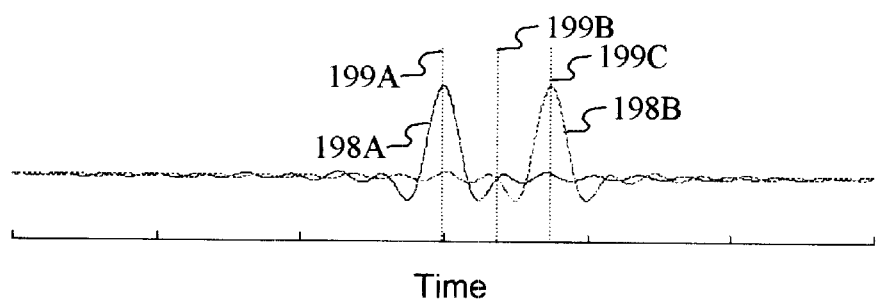

FIG. 58B illustrates a pulse-position modulation protocol, which is a time-offset multiplexing protocol that may be used with the present invention.

FIG. 59 shows a method for generating a CI transmission signal.

FIG. 60 illustrates a CI-CDMA transmitter with respect to how it functions.

FIG. 61A illustrates a method of using low-rate parallel processing to generate a high-rate direct-sequence CDMA (DS-CDMA) signal.

Figure 61B:
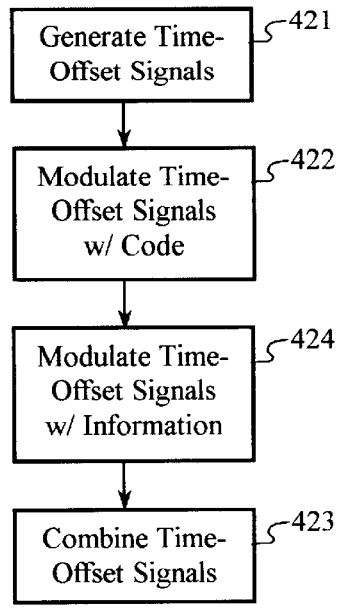

FIG. 61B illustrates an alternative embodiment of a parallel-processing method that produces a high-rate DS-CDMA signal.

Figure 61C:
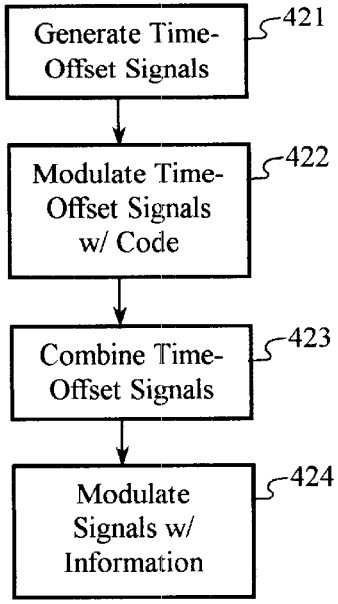

FIG. 61C shows an alternative parallel-processing method that produces a high-rate DS-CDMA signal.

Figure 62A:
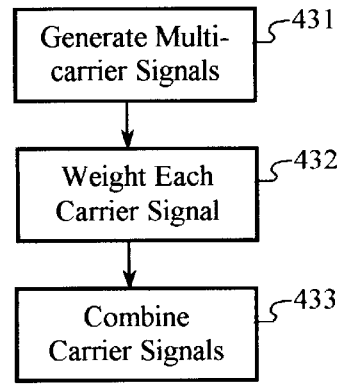

FIG. 62A shows a method of using low-rate parallel processing to generate a high-rate DS-CDMA signal.

Figure 62B:
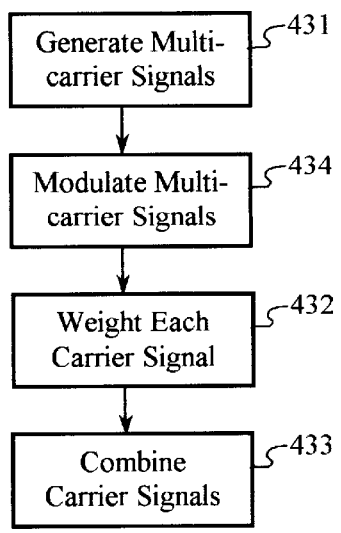

FIG. 62B shows an embodiment of a parallel processing method for generating a high-rate DS-CDMA signal.

Figure 62C:
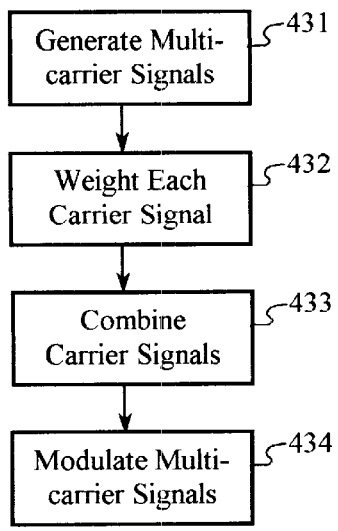

FIG. 62C shows an alternative embodiment of a low-rate parallel-processing method that generates a high-rate spread-spectrum signal, such as a DS-CDMA signal.

Figure 62D:
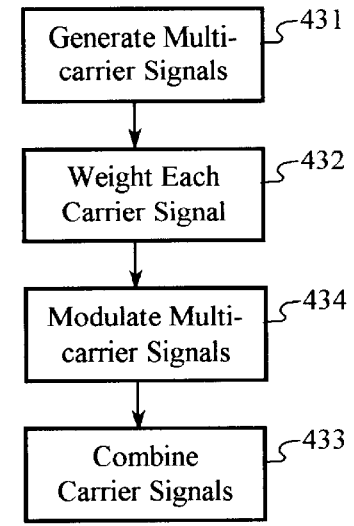

FIG. 62D shows an alternative embodiment of a low-rate parallel-processing method that generates a high-rate spread-spectrum signal, such as a DS-CDMA signal.

Figure 63A:
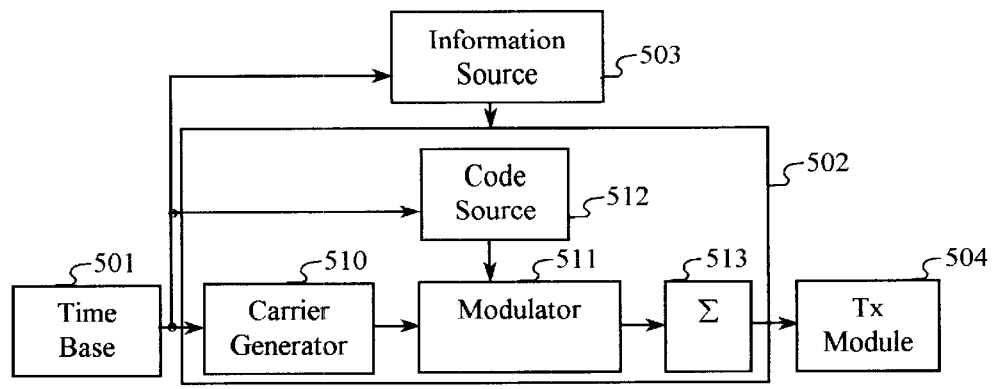

FIG. 63A shows an embodiment of a CI-CDMA transmission system.

Figure 63B:
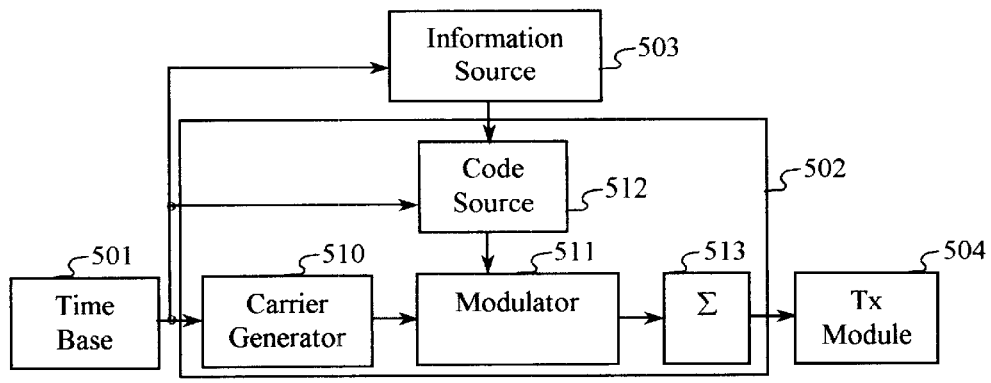

FIG. 63B shows an alternative embodiment of a CI-CDMA transmission system.

Figure 63C:
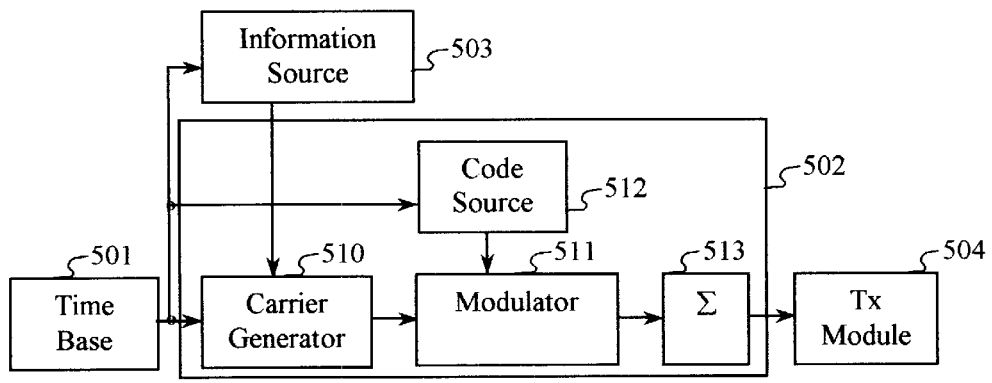

FIG. 63C shows an alternative embodiment of a CI-CDMA transmission system.

Figure 63D:
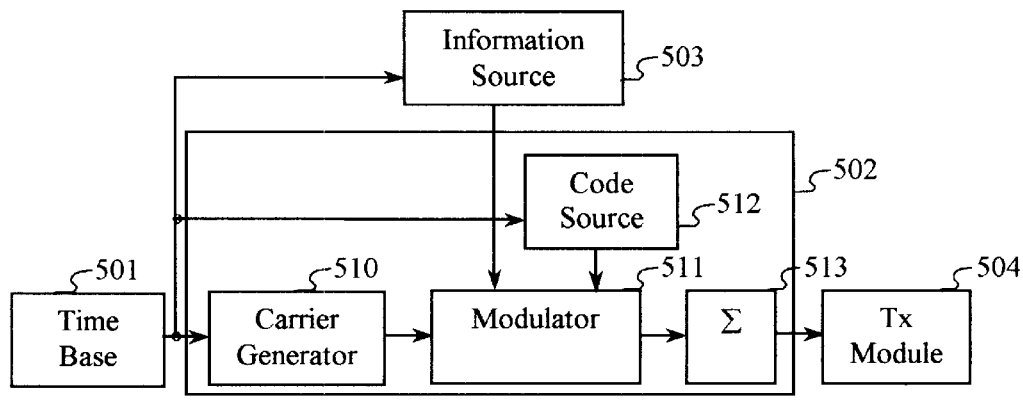

FIG. 63D shows an alternative embodiment of a CI-CDMA transmission system.

Figure 63E:
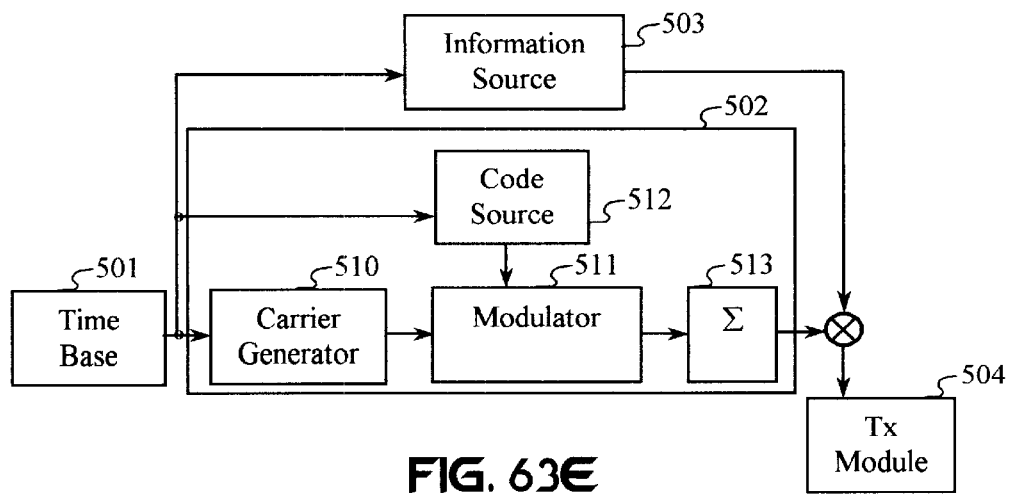

FIG. 63E shows an alternative embodiment of a CI-CDMA transmission system.

Figure 64:
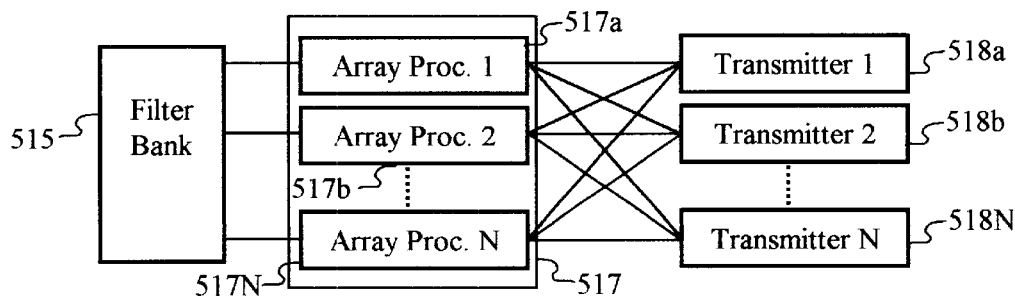

FIG. 64 shows an embodiment of a transmission module that may be used in the invention.

Figure 65A:
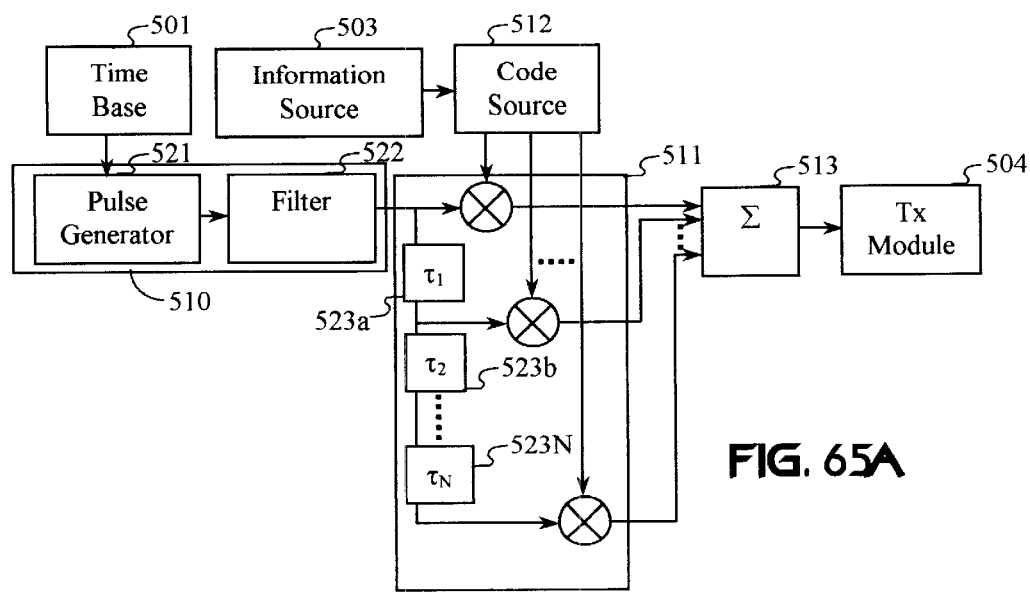

FIG. 65A shows a CI-CDMA transmission system.

Figure 65B:
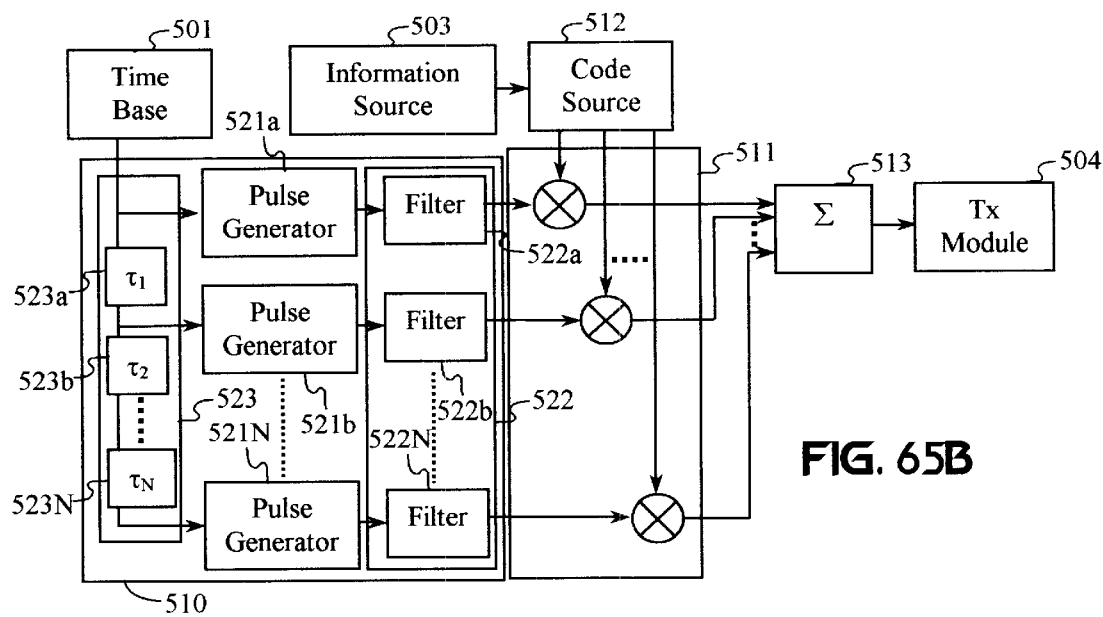

FIG. 65B shows an alternative embodiment of a CI-CDMA transmission system.

Figure 66A:
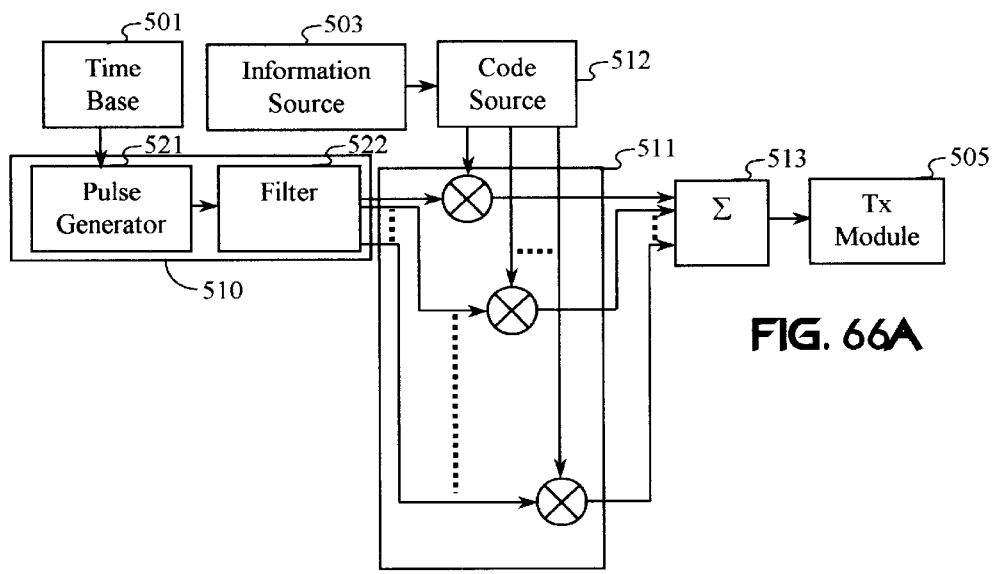

FIG. 66A shows a CI-CDMA transmission system.

Figure 66B:
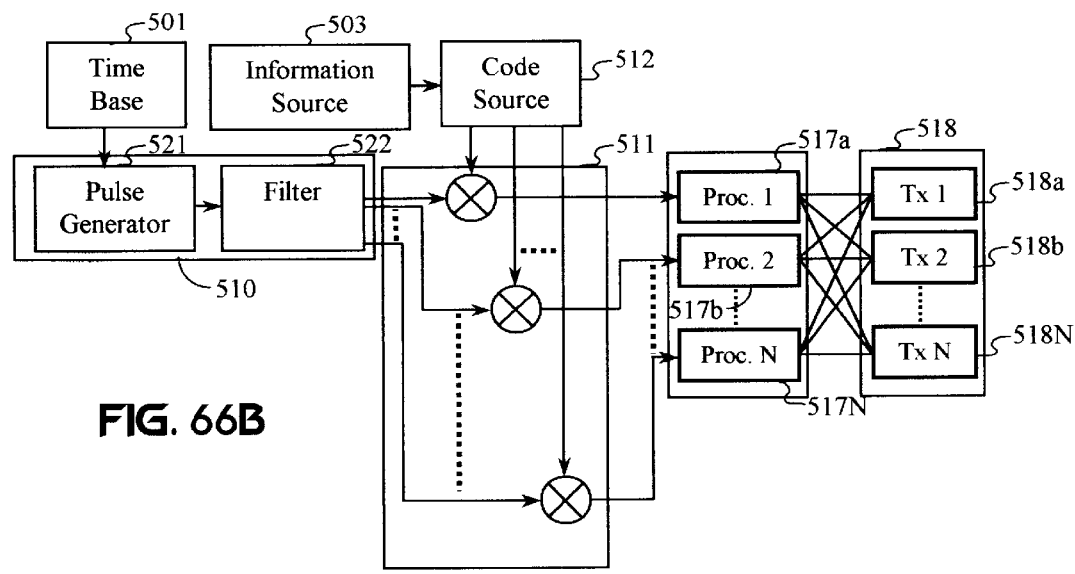

FIG. 66B shows an alternative embodiment of a CI-CDMA transmission system.

Figure 67A:
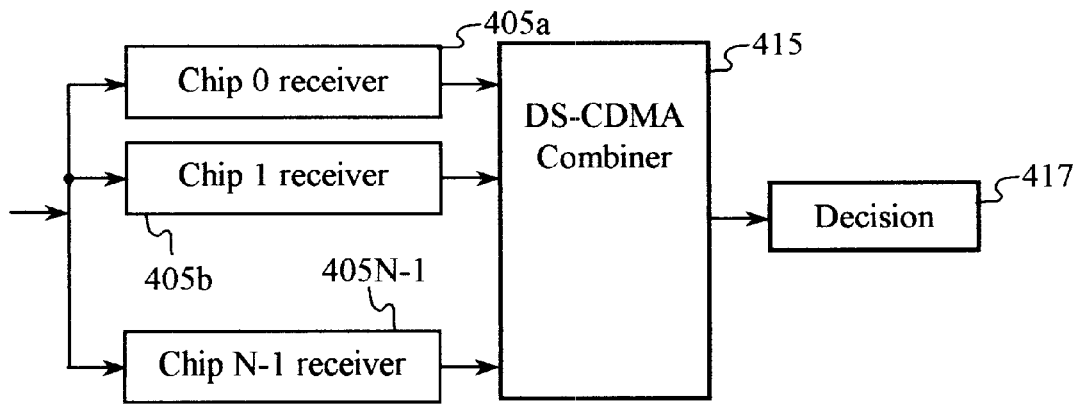

FIG. 67A shows an embodiment of CI receiver configured to operate with a DS-CDMA protocol.

Figure 67B:
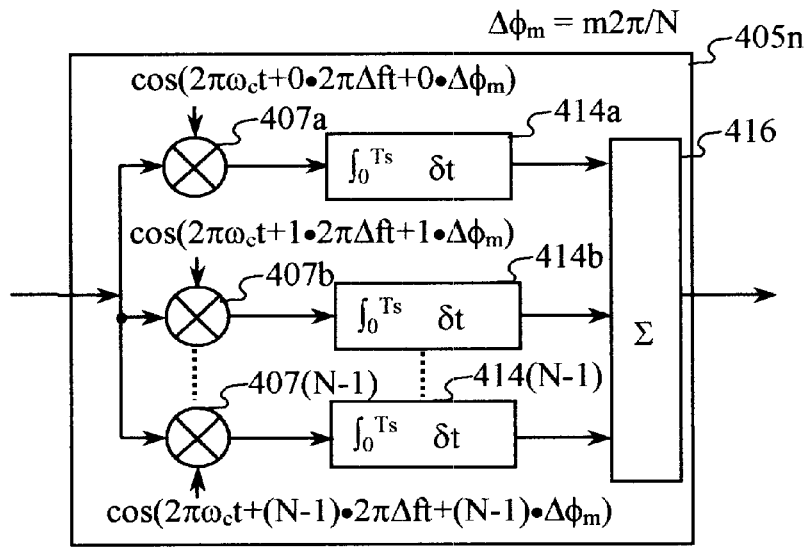

FIG. 67B shows an embodiment of a chip receiver shown in FIG. 67A.

Figure 68:
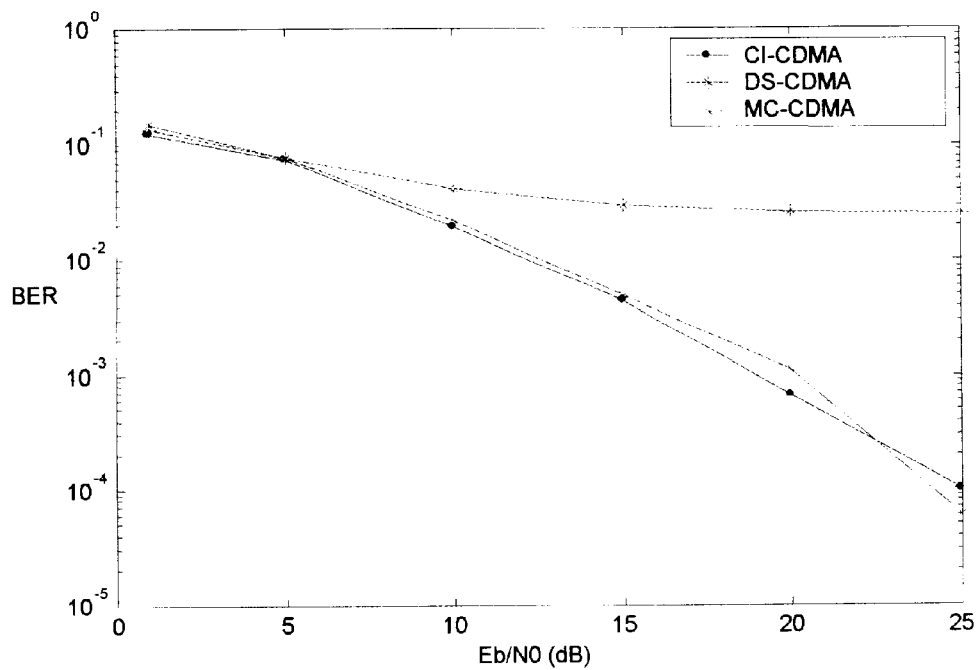

FIG. 68 is a plot of bit-error-rate (BER) versus signal-to-noise ratio (SNR) performance of CI-CDMA, MC-CDMA, and DS-CDMA systems in which CI-CDMA and MC-CDMA systems employ Minimum Mean Square Error Combining.

Figure 69:
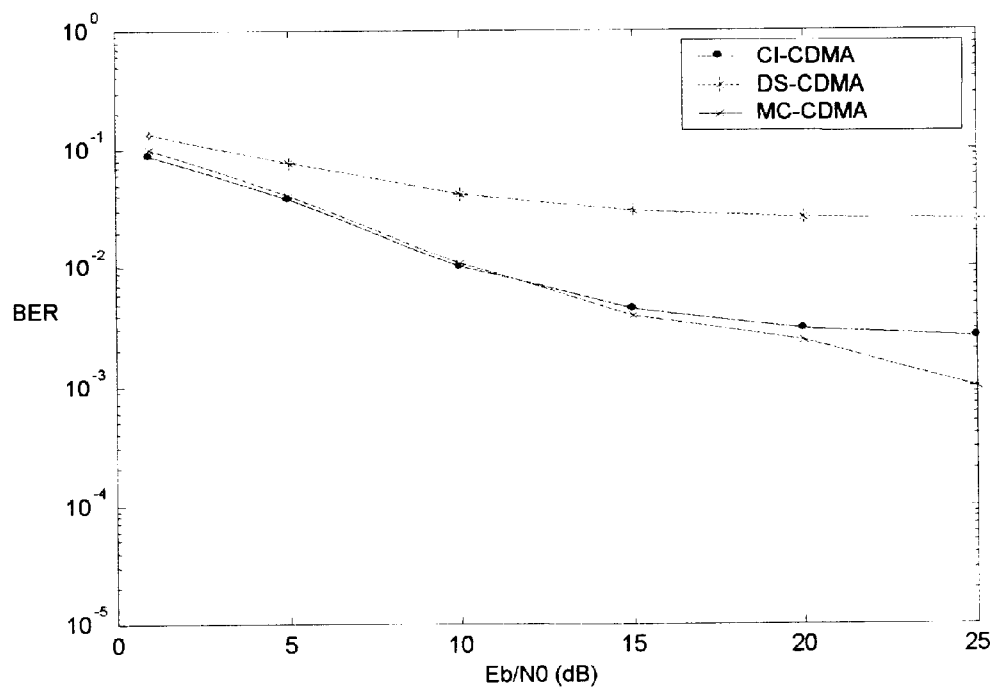

FIG. 69 is a plot of BER versus SNR performance comparisons of CI-CDMA, MC-CDMA, and DS-CDMA systems in which CI-CDMA and MC-CDMA systems employ Equal Gain Combining.

Figure 70:
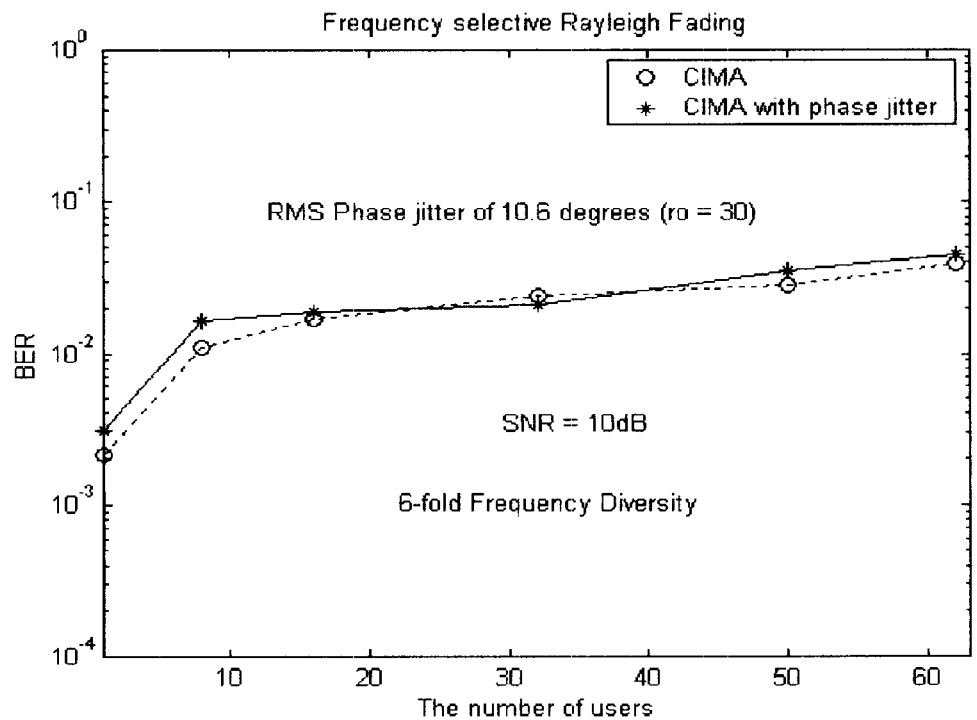

FIG. 70 shows the effects of a 10.6-degree root-mean-square phase jitter on the BER of a CI multiple-access protocol (CIMA).

Figure 71:
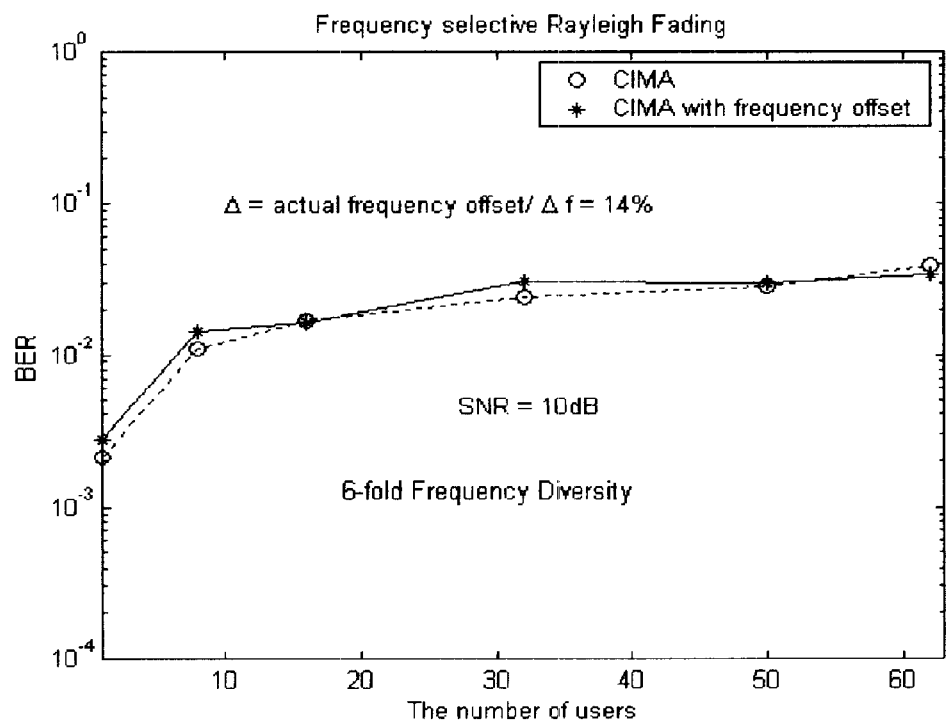

FIG. 71 shows the effects of a 14-percent frequency offset on the BER of a CI multiple-access protocol (CMA).

Figure 72:
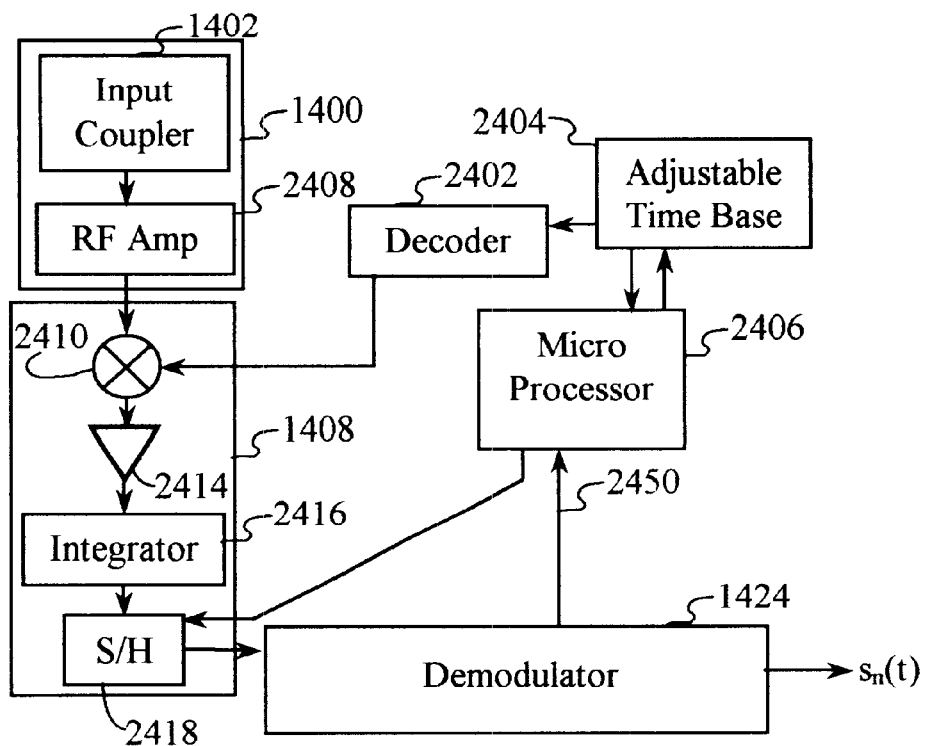

FIG. 72 shows a correlation receiver capable of processing CI-CDMA signals.

Figure 73A:
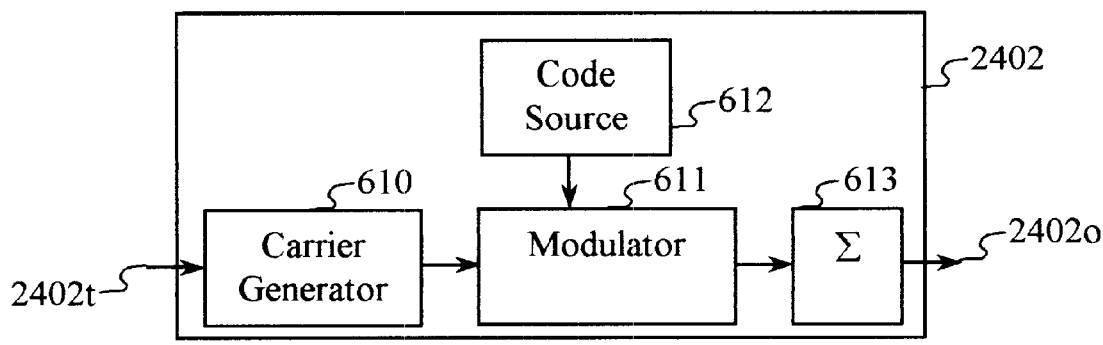

FIG. 73A shows a generalized embodiment of a decode-signal generator.

Figure 73B:
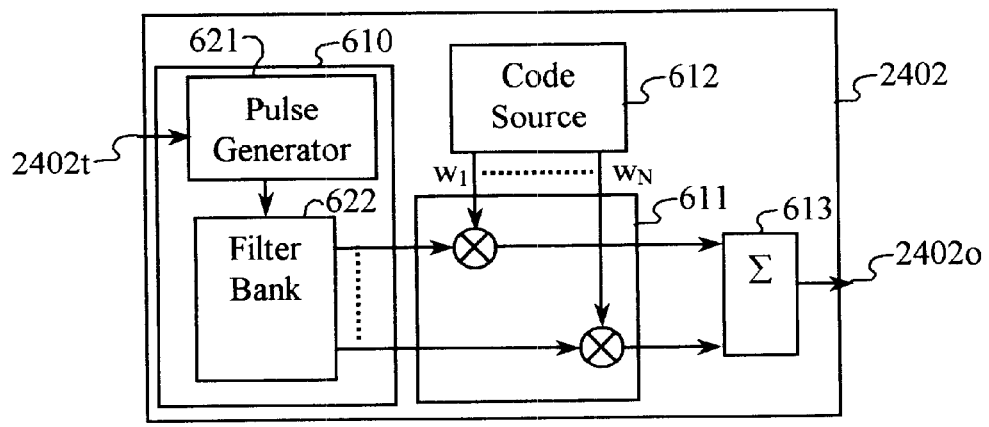

FIG. 73B shows an embodiment of a decode-signal generator.

Figure 73C:
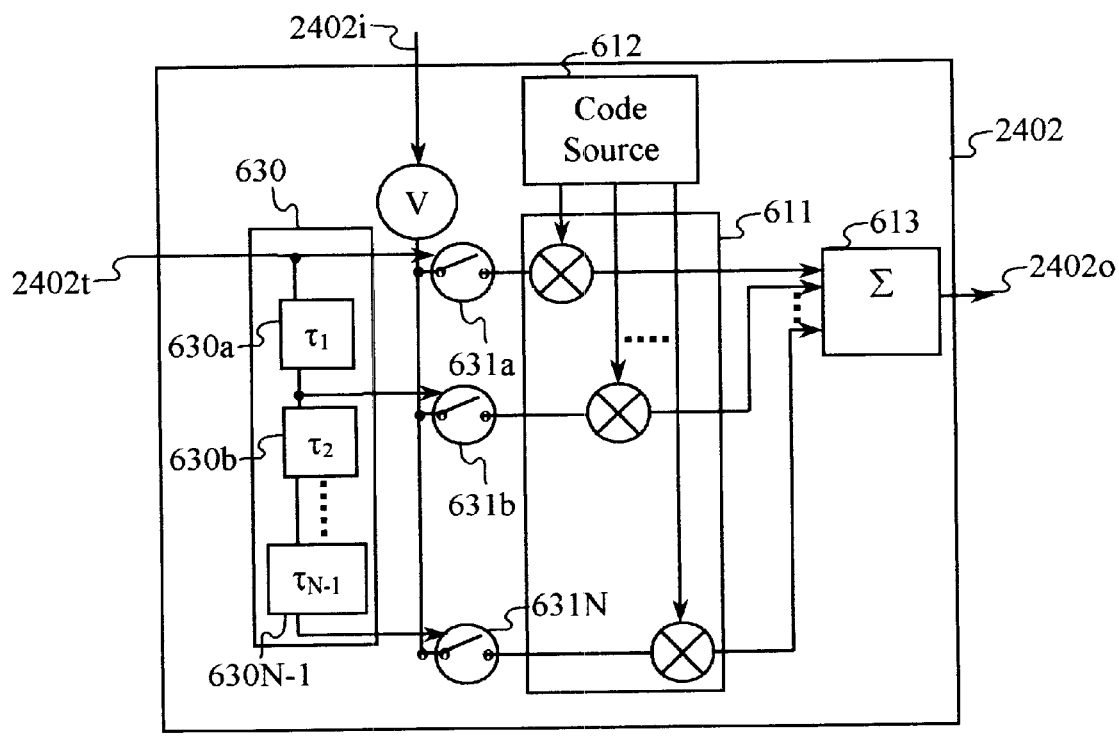

FIG. 73C shows an alternative embodiment of a decode-signal generator.

Figure 73D:
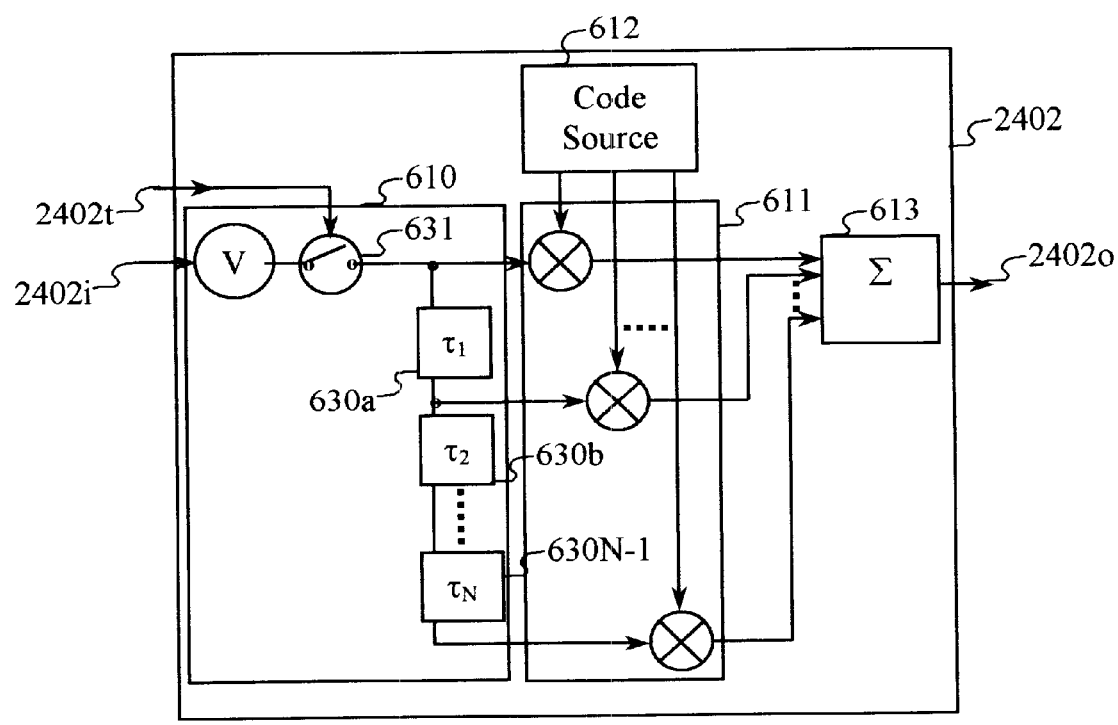

FIG. 73D shows an alternative embodiment of a decode-signal generator.

Figure 74A:
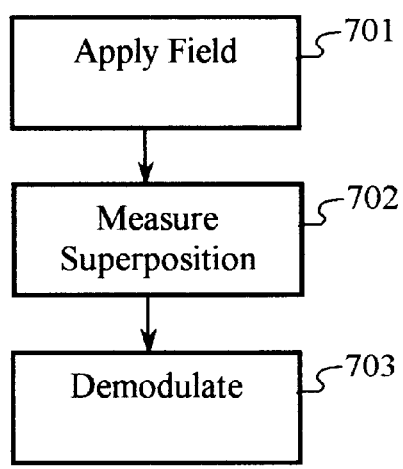

FIG. 74A illustrates a method for receiving and processing an information-modulated multicarrier signal.

Figure 74B:
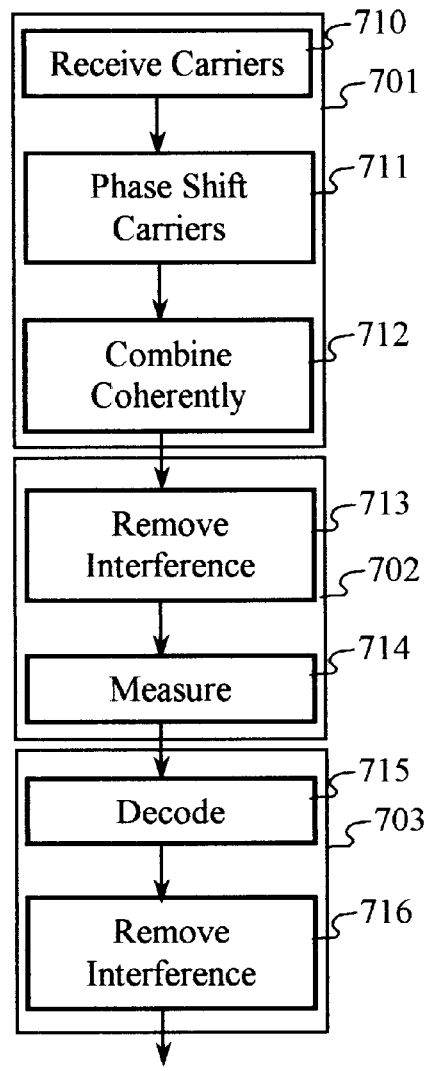

FIG. 74B illustrates a detailed method for receiving and processing an information-modulated multicarrier signal.

Figure 75A:
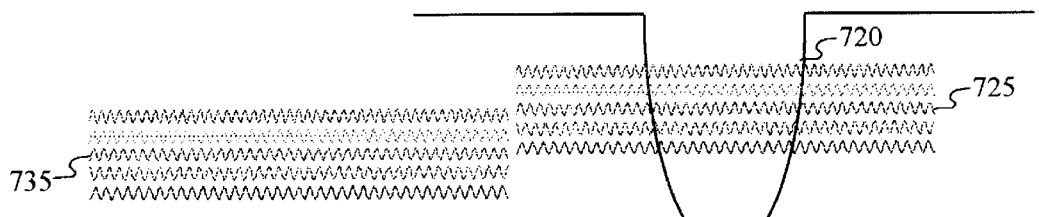

FIG. 75A shows waveforms of a potential well and waveforms of a particle outside the well in which the state of the waveforms of the well does not substantially match the state of the waveforms of the particle.

Figure 75B:
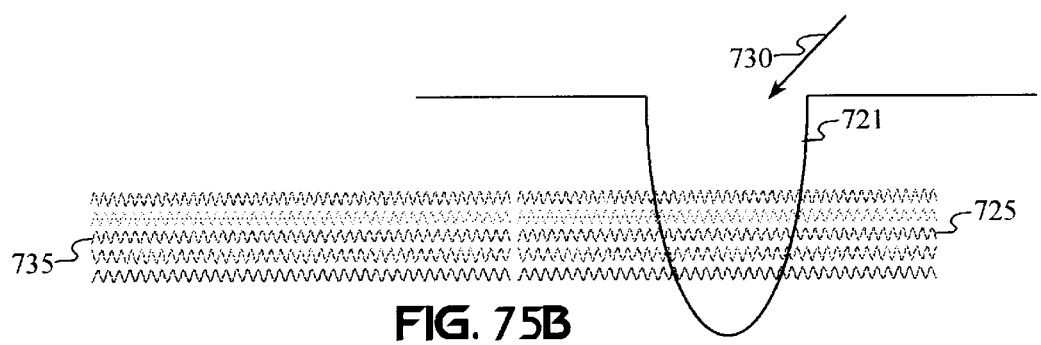

FIG. 75B shows waveforms of a potential well and waveforms of a particle outside the well in which the state of the waveforms of the well matches the state of the waveforms of the particle.

Figure 76:
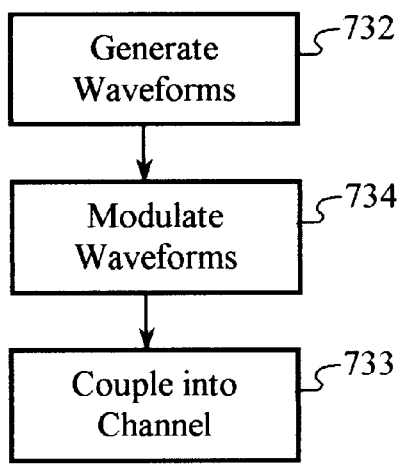

FIG. 76 shows a transmission method of the present invention.

Figure 77:
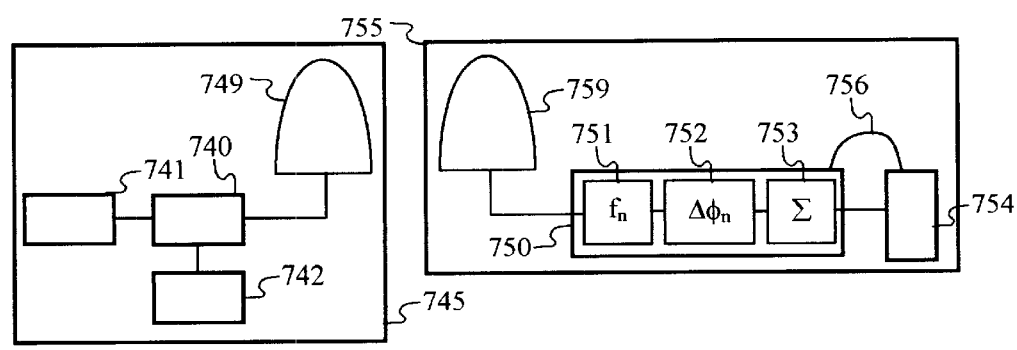

FIG. 77 shows a resonant-tunneling communication system of the present invention.

PREFERRED EMBODIMENTS

Table Of Contents
1. General Terminology
2. Quantum Interferometry
3. Basic CI Methods and Systems
3.1 Overview of CI Transmission
3.2 CI-Transmission Methods
3.3 CI-Transmission Systems
3.4 CI-Reception Overview
3.5 CI-Reception Methods
3.6 CI-Receiver Systems
3.6.1 Conventional Down-Conversion Techniques
3.6.2 The Sampling Theorem
3.6.3 Down-Conversion by Mixing
3.6.4 The Passband Sampling Theorem
3.7 Spatial-Interferometry Filtering
3.7.1 Overview of Spatial-Interferometry Filtering
3.7.2 Spatial-Interferometry Filtering Methods
3.7.3 Spatial-Interferometry Systems
3.8 Time-Offset Sampling
3.8.1 Overview of Time-Offset Sampling
3.8.2 Time-Offset Sampling Methods
3.8.3 Time-Offset Sampling Systems
4. Coherence Multiplexing
4.1 Overview of Coherence Multiplexing
4.2 Coherence-Multiplexing Methods
4.2.1 Coherence-Multiplexing Transmission Methods
4.2.2 Coherence-Multiplexing Reception Methods
4.3 Coherence-Multiplexing Systems
4.3.1 Coherence-Multiplexing Transmitters
4.3.2 Coherence-Multiplexing Receivers
5. CI-CDMA
5.1 Overview of CI-CDMA
5.2 CI-CDMA Signal-Generation Methods
5.3 CI-CDMA Systems
5.3.1 CI-CDMA Transmission Systems
5.3.2 CI-CDMA Receiver Systems
6. Interferometry-assisted Tunneling
7. Scope of the Invention

1. General Terminology

Various terms used in the descriptions of CI methods and systems are generally described in this section. The description in this section is provided for illustrative purposes only, and is not limiting. The meaning of these terms will be apparent to persons skilled in the relevant art(s) based on the entirety of the teachings provided herein. These terms may be discussed throughout the specification with additional detail.

The term carrier signal, when used herein, is at least one electromagnetic wave having at least one characteristic that may be varied by modulation. A carrier signal is capable of carrying information via modulation. A carrier signal may be modulated or unmodulated. Multicarrier signals may include multi-frequency signals, time-domain (discreet-time) signals, and/or any other set of electromagnetic signals having different values of at least one diversity parameter. Carrier signals may include any type of periodic signal.

The term code (or spreading code), when used herein, refers to any type of digital or analog code applied to at least one information signal and/or carrier signal. A code (or spreading code) may include one or more of the following: a spread-spectrum code, an encryption code, an error-correction code, a channel code, and any type of diversity code.

The term communication channel, when used herein, may be natural and/or man-made including, but not limited to, air, space, wire, cable, waveguide, microstrip, strip-line, optical fiber, liquid, etc.

The term control signal, when used herein, refers to any signal used to control a sampler or sampling process. A control signal can control one or more sample characteristics, such as the sample rate, the sample interval, and/or the sample shape.

The term coupler, when used herein, can include one or more of the following: an antenna, an optical coupler, a modem, connector, or any other device that can be used to interface with communications medium. A coupler may include any type of transducer including transducer arrays. A transducer includes transmitters, receivers, and/or any device or system that acts as both a transmitter and a receiver. A coupler may include one or more signal-processing devices including, but not limited to, amplifiers, filters, up converters, down converters, modulation-protocol converters, coding systems, decoding systems, mixers, delay systems, polarizers, phase shifters, delay systems, beam-forming systems, interferometers, multi-user detectors, cancellation systems, switches, routers, local oscillators, and signal combiners.

The term coupling, when used herein with reference to coupling a signal into a communication channel, refers to any method of inserting an electromagnetic signal into a communication channel. Coupling may include one or more processing steps including, but not limited to, up converting, down converting, filtering, weighting, coding, amplifying, mixing, delaying, combining, and polarizing.

The term coupling, when used herein with reference to coupling a signal out of a communication channel, may include one or more processing steps including, but not limited to, demodulating each of the received carriers, weighting one or more of the received carriers, down converting received signals, up converting received signals, converting received signals to a different modulated protocol, canceling interference, filtering, amplifying, decoding, switching, routing, and analyzing the received carriers. Coupling may involve signal-processing methods after a superposition or combining process, such as, but not limited to, error detection, decoding, filtering, windowing, amplification, interference cancellation, optimal combining, and multi-user detection.

The term demodulator, when used herein, may be embodied by any type of device, system, and/or algorithm that is capable of recovering at least one information signal that is modulated or otherwise impressed upon at least one carrier signal. Demodulation includes any techniques that may be used to recover an information signal from one or more carrier signals. Demodulation may be performed using any combination of filtering, envelope detection, sampling, under sampling, time-offset sampling, frequency-offset sampling, spatial-interferometry filtering, matched filtering, envelope detection, and coherence multiplexing.

The term discreet-time signal, as used herein, describes any type of time-domain signal having a finite duration including, but not limited to, a pulse, a monocycle, a rectangle waveform, a step function, a triangle waveform, a gaussian waveform, a sinusoidal waveform, a sinc waveform, an exponential waveform, a parabolic waveform, a hyperbolic waveform, a noise waveform, a chaotic-signal waveform, any type of impulse, and a portion of any type of periodic signal.

The term diversity encode, as used herein, refers to any method of providing each of a plurality of electromagnetic signals with at least one unique value (or set of values) of at least one diversity parameter. Diversity encoding may include modulation.

The term diversity decode, as used herein, refers to any method of demultiplexing a plurality of diversity-encoded signals. Diversity decoding typically involves separating a plurality of signals having different values of at least one diversity parameter. Diversity decoding may include demodulating and/or down converting the separated signals.

The term diversity-parameter distribution, as used herein, defines a distribution of values of at least one electromagnetic signal characteristic relative to a range of values of at least one diversity parameter. A signal characteristic may include amplitude, phase, energy, polarization, mode, frequency, timing, proportions of two or more diversity-parameter values, or any combination thereof. A common diversity parameter, as used herein, is a range of at least one diversity-parameter value into which electromagnetic signals may be mapped.

The term down converter, when used herein, may refer to any type of device, system, and/or algorithm that transforms at least one information-bearing carrier signal to at least one lower-frequency signal, such as an IF signal or a baseband signal. Down conversion may refer to any type of demodulation method. A down converter may include an envelope detector, a sampler, an under sampler, a filter (such as a matched filter, a low-pass filter, and/or an anti-aliasing filter), a mixer, or any other type of device, system or algorithm that extracts an information signal from at least one carrier signal. A down converter may include one or more signal-processing devices and/or algorithms including integrators, decision systems, feedback systems, decoders, correlators, delay, systems, equalizers, filters, microprocessors, timers, local oscillators, pulse shapers, and rectifiers.

The term effective carrier frequency (or effective frequency or effective carrier), when used herein, refers to a signal frequency of a periodic signal (i.e., an effective carrier signal) that occurs inside an envelope signal resulting from a superposition of carrier signals. The envelope signal appears as an amplitude modulation of an effective carrier signal. The effective carrier signal is represented by the term: $\sin 2\pi(f_o+f_s(N-1)/2)t$ in an equation that describes a simple case of superposition. In this case, the effective carrier signal has a frequency of $f_{\mathit{eff}}=(f_o+f_s(N-1)/2)$. However, the effective frequency $f_{\mathit{eff}}$ may differ for other cases corresponding to alternative carrier-signal characteristics, such as different carrier amplitudes, and/or non-uniform carrier spacing.

The term gain distribution, as used herein, describes a distribution of at least one signal magnitude or complex amplitude relative to a range of values of at least one diversity parameter.

The term information signal (or baseband signal), when used herein, is an electromagnetic signal that includes, but is not limited to, video baseband signals, voice baseband signals, computer baseband signals, etc. Baseband signals include analog baseband signals and digital baseband signals. An information signal may be a coded signal that is coded with one or more codes. An information signal may be an information-bearing signal. For example, an information-bearing signal may be an intermediate-frequency, effective-carrier, and/or subcarrier signal modulated with at least one information signal.

The term electromagnetic signal, when used herein, refers to any signal(s) in the electromagnetic spectrum. The electromagnetic spectrum includes all frequencies greater than zero hertz. Electromagnetic waves generally include waves characterized by variations in electric and magnetic fields. Such waves may be propagated in a communication channel.

The term envelope detection, when used herein, refers to any method of recovering modulated information signals from transmitted CI signals. Envelope detection includes any form of low-pass filtering including digital signal processing techniques. Envelope detection may include any type of down-conversion process and may include intermediate down-conversion steps.

The term envelope detector, when used herein, refers to any device, system, or algorithm that performs envelope detection as defined herein.

The term modulation, when used herein, refers to any of a variety of techniques for impressing information from one or more baseband signals onto one or more carrier signals. The resulting signals are referred to as modulated carrier signals. Modulation imparts changes to the carrier signal that represent information in a modulating baseband signal. The baseband signal may be coded. The changes can be in the form of changes to one or more diversity parameters that characterize the carrier signal. A carrier signal can be modulated with a plurality of modulation types. Modulation of the carrier signals can be performed with any type of modulation including but not limited to: phase modulation, amplitude modulation, frequency modulation, time-offset modulation, polarization modulation, or any combinations thereof. A carrier signal may be modulated with a plurality of baseband signals, such as analog baseband signals, digital baseband signals, coded baseband signals, and combinations thereof. Modulation may include multiplexing.

The term modulated carrier (or modulated carrier signal), when used herein, includes any type of carrier signal that is modulated. Modulated carriers are produced by any of several methods including, but not limited to:

1. Weighting the bins of an invertible transform function, such as an inverse fast Fourier transform (IFFT) function.
2. Modulating carriers generated by an array of signal generators, such as local oscillators.
3. Modulating carriers generated by nonlinear processors, such as mixers.
4. Modulating a single carrier with a modulated set of subcarriers.
5. Modulating a signal source that generates a wideband signal that is separated into separate carrier signals.

A modulated carrier may include any modulated carrier that is processed before being coupled into a communications channel. This processing can include various combinations of digital signal processing and RF processing including, but not limited to, filtering, windowing, encoding, frequency up-conversion, digital-to-analog conversion, analog-to-digital conversion, weighting, delaying, beam forming, and amplifying.

A modulator (such as a multicarrier modulator) performs modulation of at least one information signal onto one or more carrier signals. A modulator may include a tuner or filter to control the output frequency band of transmitted signals.

The term multicarrier generator (or carrier-signal generator), as used herein, includes any device that generates a plurality of electromagnetic (or electrical) carrier signals.

The term multicarrier receiver, as used herein, refers to any type of receiver capable of receiving at least one electromagnetic signal and separating it into a plurality of carrier signals. A multicarrier receiver may refer to a receiver adapted to process a multicarrier signal for the purpose of extracting one or more data symbols modulated onto one or more of the carriers. The receiver may couple the electromagnetic signals from a first channel to a second channel. The receiver may change the frequency and/or modulation protocol of the received signal(s). The receiver may provide weights to the received signals. The receiver may sum or otherwise combine received signals. A multicarrier receiver may include one or more of the following: an amplifier, a filter, a mixer, a local oscillator, a feedback loop, a decision system, a sampler, a delay device, an electromagnetic-signal detector, an array of detectors, a coupler, an array of couplers, a beam-forming system, a multi-user detector, an Interferometry system, a weight-and-sum system, an optimal combiner, and an amplifier.

The term phase-shift modulation (or phase modulation), as used herein, includes any type of phase modulation including analog and digital modulation techniques. Digital phase-shift modulation includes binary phase-shift key modulation and differential phase-shift key modulation. Phase modulation may include continuous-phase modulation.

The term sampling system (or sampler), as used herein, includes any type of device, system, and/or algorithm adapted to collect a plurality of samples from a signal. Sampling, as described herein, may include multiple and/or variable sampling rates, multiple and/or variable sample-aperture widths, and one or more sample-aperture shapes. A sampling system may combine signal values collected over one or more sample intervals. A sampling system may include one or more of the following: an integrator, a summer, a peak detector, a sample-and-hold device, a delay network, a variable-delay device, a switch module, a storage module, a combiner, a memory unit, a timer, a local oscillator, a pulse shaper, a rectifier, a filter, a limiter, an analog-to-digital converter, and a microprocessor.

The term subcarrier, as used herein, refers to any type of periodic signal and/or code signal. A subcarrier may include more than one signal and more than one type of signal. A subcarrier may also refer to a carrier, particularly when at least one of a plurality of carriers in a multicarrier signal is described.

The term timer (or time base), as used herein, refers to any device, system, or algorithm that provides a timing signal. A timing signal may include a periodic signal and/or a non-periodic signal. A periodic timing signal may have multiple signal frequencies and may include any type of periodic signal waveform. A timer may include one or more signal generators (such as local oscillators), signal look-up tables, pulse shapers, filters, delay systems, control systems, combiners, microprocessors, and/or memory modules.

The term time-offset system, as used herein, includes any type of device, system, and/or algorithm capable of providing one or more relative time offsets between a set of sampling times and a signal to be sampled. Either or both a sampling time and a signal to be sampled may be delayed by a time-offset system. A time-offset system may provide at least one delay to a timing signal used to trigger a sampler (i.e., define a sampling time).

The term wideband signal, as used herein, includes any type of continuous wideband signal, plurality of narrowband components, plurality of wideband components, multicarrier signal, or any combination of continuous wideband and narrowband components. Wideband signals may include periodic signals, weighted periodic signals, modulated signals, coded signals, chaotic signals, and/or noise signals.

2. Quantum Interferometry

Historically, much of fundamental physics has been concerned with discovering the fundamental particles of nature and the equations that describe their motions and interactions. As new fundamental particles are discovered (e.g., quarks), new theories involving particle interaction are developed to describe the nature of the universe. Particle-based theories even attempt to explain wave-based phenomena. In addition to the particle-like behavior of electromagnetic waves, there is a wave-like nature associated with particles. For example, it is well known that the probability distribution function of a particle can be characterized by solutions to a wave equation. The significance of wave-like phenomena as an underlying architecture of the universe is just being realized. New theories that model wave-like "strings" as a fundamental basis for all matter and energy provide a compelling alternative to the Standard Model of Quantum Field Theory.

Quantum mechanics is the mathematical structure that embraces, in principle, the whole of physics. The significant feature of quantum theory is that it is based on quantum amplitudes, or state vectors in a Hilbert space, rather than classical variables. This allows new types of information and computing. However, the quantum states and their correspondences that are necessary for computation are not easily manipulated and maintained under normal environmental conditions. For example, quantum states easily "decohere" (i.e., they become randomized as a result of entanglement with the environment).

In 1935, Einstein, Podolsky and Rosen argued that the strange behavior of entanglement meant that quantum mechanics was an incomplete theory, and that there must be 'hidden variables' not yet discovered. This produced a famous debate between Einstein and Niels Bohr, who argued that quantum mechanics was complete and that Einstein's problems arose because he tried to interpret the theory too literally.

In 1964, John Bell showed that for certain experiments, classical hidden variable theories made different predictions from quantum mechanics. He published a theorem that quantified just how much more strongly quantum particles were correlated than would be classically expected, even if hidden variables were taken into account. This made it possible to test whether quantum mechanics could be accounted for by hidden variables. A number of experiments were performed, and the result is almost universally accepted to be in favor of quantum mechanics. Thus, hidden variables provided no easy explanation of the entangled correlations. The only kind of hidden variables not ruled out by the Bell tests would be "non-local", meaning they would be able to act instantaneously across a distance.

Figure 1:
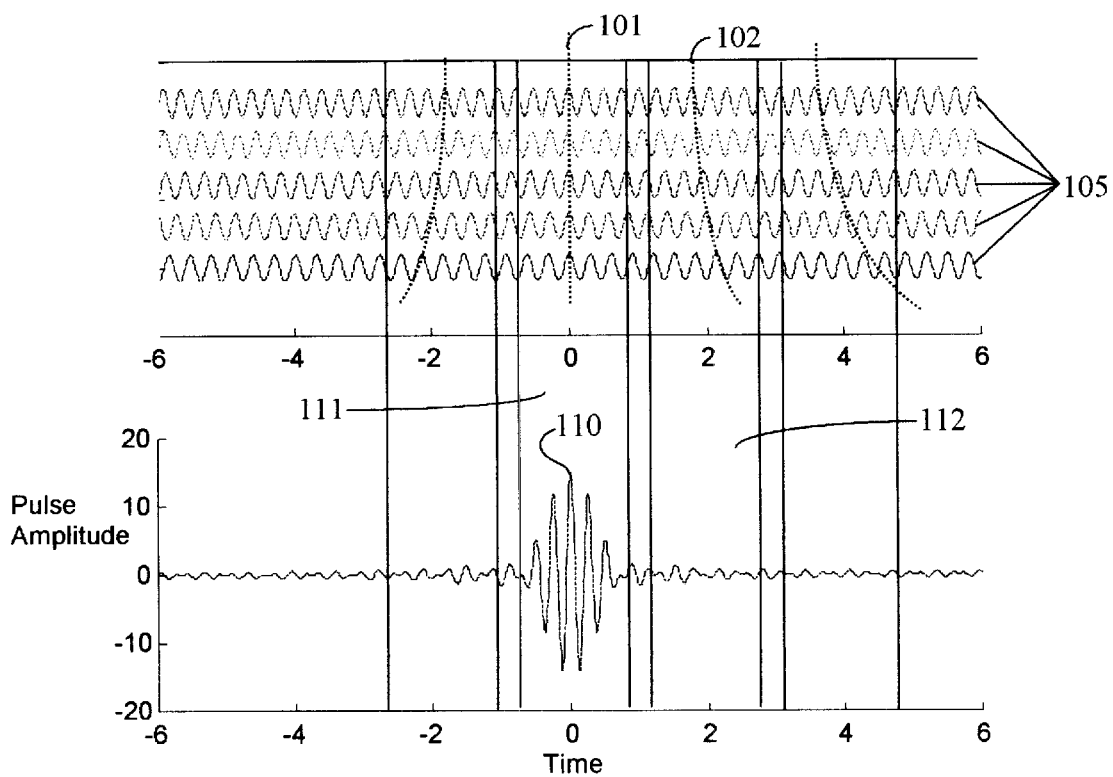
FIG. 1 illustrates the principles of wave superposition.

The spirit of non-local variables is suggested by wave-superposition theory, which is an inspiration of the present invention. FIG. 1 illustrates the principles of wave superposition. According to this theory, a particle (such as a particle of matter or a packet of energy) is a superposition of waves (such as waves 105). The waves 105 combine coherently in a predetermined space-time interval 111 to form a pulse 110 that represents the locality of the particle. In this interval 111, the waves 105 have a substantially zero-phase relationship 111 (referred to herein as zero phase space). In other intervals (such as interval 112), the waves 105 combine non-coherently, and thus cancel. In the interval 112, the waves 105 have a substantially non-zero relative phase 112 (referred to herein as non-zero phase space). Although the particle is not detectable in the other intervals, FIG. 1 shows that the waves 105 that comprise the particle can exist in those intervals.

In order to move the pulse 110 from interval 111 to interval 112, each component wave 105 can be shifted an amount corresponding to a uniform translation in space-time. A uniform translation of distance d is applied to each $n^{th}$ component wave 105 resulting in a differential phase shift $\phi_n$:

$$e^{i\phi_n} = e^{ik_n d}$$

where $k_n$ is the wave number ($k_n = 2\pi/\lambda_n$) corresponding to the wavelength $\lambda_n$ of the $n^{th}$ component wave. This translation corresponds to physically moving a particle from one position to another position.

An alternative way to move the pulse 110 from interval 111 to interval 112 is to shift each of the component waves 105 a relatively small amount to achieve a zero-phase condition 102'. A much smaller non-uniform translation is applied to each no component wave 105 resulting in a differential phase shift $\phi_{nn'}$:

$$e^{i\phi_{nn'}} = e^{i(k_n - k_{n'})d} = e^{i(n-n')f_s d/c}$$

where n' corresponds to an unshifted $n'^{th}$ component wave, $f_s$ is the frequency separation between adjacent component waves 105, c is the velocity of electromagnetic waves 105, and d is the effective translation distance resulting from the differential phase shift. Clearly, the actual translation of the waveforms is substantially smaller than the effective translation d. Thus, the non-uniform translation implies the appearance of faster-than-lightspeed motion of a particle.

Figure 2:
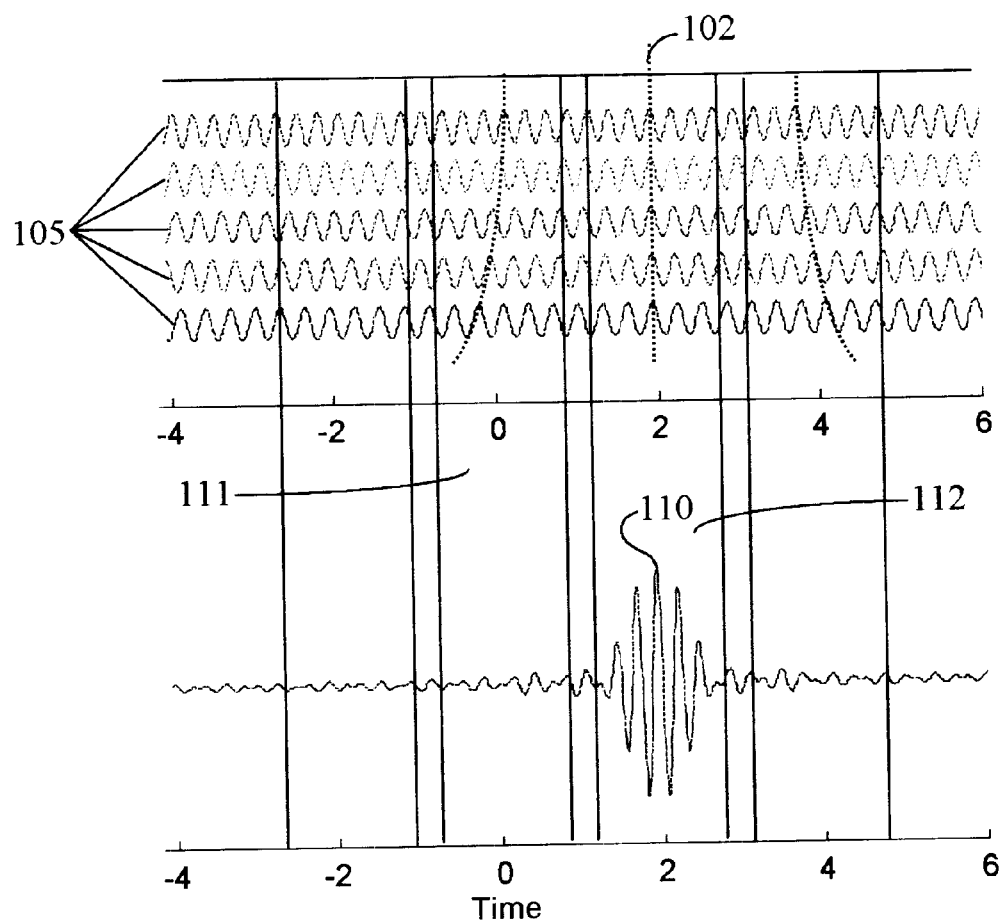
FIG. 2 shows a superposition of waves having a zero-phase condition.

FIG. 2 shows the result of achieving a zero-phase condition in interval 112. One interpretation of the wave-superposition theory is that the movement of a particle from one location to another location may require substantially less energy than moving the particle based on principles of classical physics. This also suggests that moving a particle by applying non-uniform translations to its component waves may provide particle speeds that appear to exceed the velocity of light. The wave-superposition theory also shows that information about the particle (thus, the particle itself) can be expressed in different ways without losing its essential nature.

Figure 3:
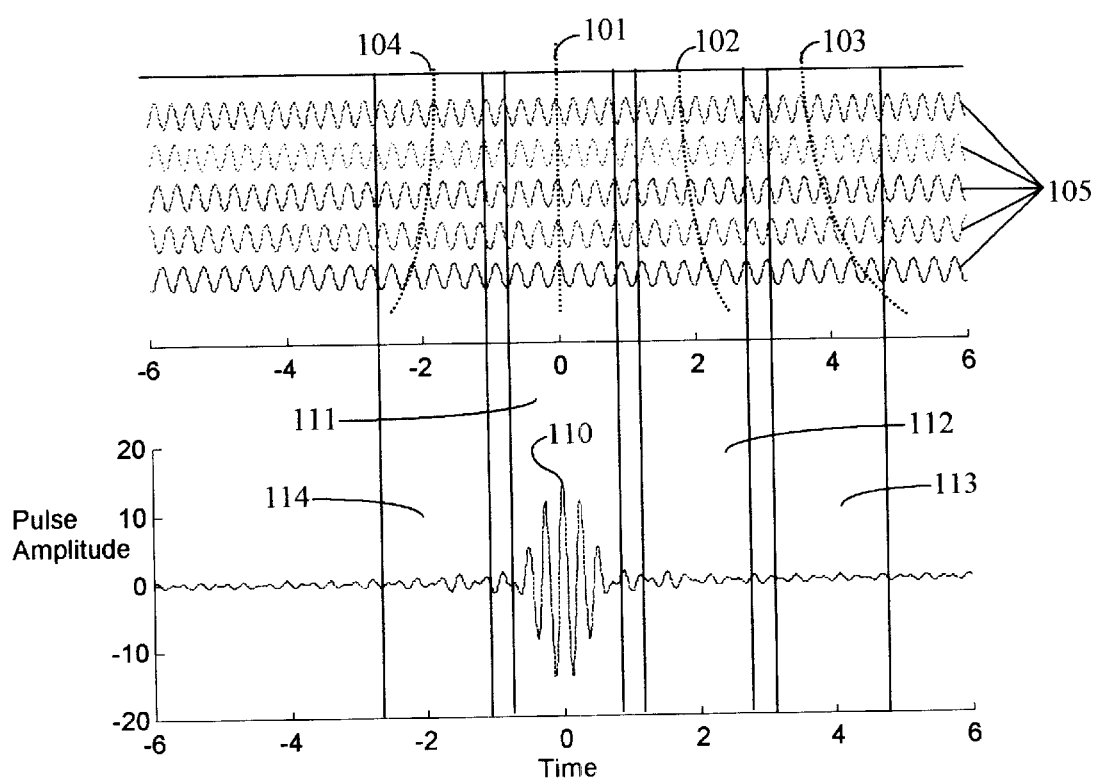
FIG. 3 shows a constructive-interference pulse that characterizes a zero-phase condition.

FIG. 3 shows a pulse 110 in a particular space-time interval 111 characterized by a zero-phase condition 101. The information that defines the pulse 110 includes a relative location $x_i$ (such as the space-time interval 111) and a phase relationship $\Phi_j$ between the component waves (such as the zero phase space 101). The information may include an indication of which component waves 105 comprise the pulse 110 (or other signal), and the information may include a representation of the amplitudes of the component waves 105. In this case, it is assumed that the component waves 105 are known and have the same amplitude. Thus, the information required to construct the pulse 110 is represented by a signal-information function $\psi(x_i, \Phi_j)$.

The pulse 110 is equivalently represented by any of a plurality of non-zero phase spaces (such as the phase spaces 102, 103, and 104) occurring in other space-time intervals (such as space-time intervals 112, 113, and 114). Thus, multiple signal-information functions may be equivalent:

$$\psi(x_i, \Phi_j) = \psi(x_k, \Phi_l), \text{ where } i \neq k \text{ and } j \neq l.$$

The variables of the signal-information function $\psi(x_i, \Phi_j)$, such as variables $x_i$ and $\Phi_j$, may represent continuous or discreet values.

The number of non-zero phase spaces, hence, the number of space-time intervals may be infinite. However, in each phase space (such as non-zero phase spaces 102, 103, and 104) an inverse-phase relationship may be applied to the set of waves 105 to reconstruct (or otherwise detect) the pulse 110. The inverse-phase relationship changes the non-zero phase-space representation of the pulse 110 into a zero-phase representation, resulting in a substantially coherent superposition of the waves 105. Although this discussion describes wave patterns of a particle, the principles described in this discussion also pertain to wave-based communication methods and systems claimed by the invention.

Figure 4A:
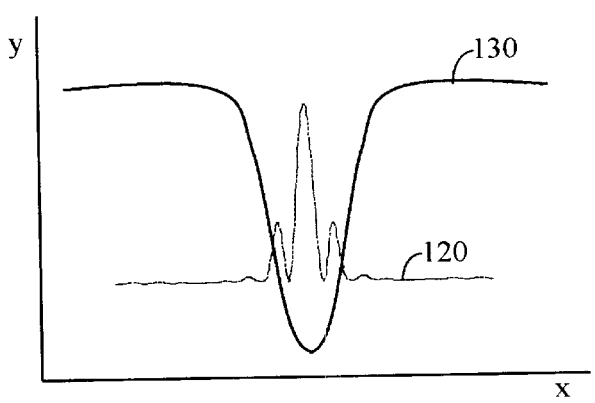
FIG. 4A shows a probability distribution of a particle bound to a potential well.

FIG. 4A shows a probability distribution 120 of a particle bound to a potential well 130. The y-axis represents energy for the well 130 and probability for the distribution 120. The x-axis represents a one-dimensional position variable. The probability distribution 120 is centered within the well 130.

In potential wells that have finite depths $V_o$, where $V_o$ is greater than the total energy E of the particle, the particle can tunnel into the classically forbidden region beyond the boundaries of the well 130. The steps for finding the wave solutions of the bound particle are:

1. Solve Schroedinger's equation for the wave functions in the forbidden regions.
2. Apply boundary conditions at the walls of the well.
3. Solve for the unknown constants to get the wave functions.

Only certain discrete energies give valid solutions. Because the potential is symmetric, the solutions are either even functions of x or odd functions of x. Thus, for any valid state, there is a specific energy quantum number and a specific parity. For the case of a finite potential well, there are a limited number of energy eigenvalues rather than an infinite number of levels that can fit in an infinitely deep well.

According to Fourier's theorem, any arbitrary periodic function (subject to certain conditions that are not very restrictive) can be represented by a series of harmonic terms:

$$f(t) = \frac{1}{2}a_0 + \sum_{n=1}^{\infty}(a_n \cos n\omega t + b_n \sin n\omega t)$$

Thus, an alternative way to look at the potential well is to consider the particle waveform to be a superposition of unbounded component waveforms. This alternative perspective is analogous to defining the potential well by a set of waveforms in the same manner that the potential well defines which waveforms (or energy levels) that it supports. The superposition of sinusoidal waveforms produces a peak or sinusoid waveform within the well and exponential-like declines in the forbidden regions. Thus, the probability-distribution function of a particle in a potential well may be represented by the magnitude of coherent superpositions of its component waveforms.

Nonlinearity of a potential well supports higher harmonics. Perturbation procedures for dealing with nonlinear equations developed by Poisson and Poincare and extended by Kryloff and Bogoliuboff are described by Marion in "Classical Dynamics of Particles and Systems," which is hereby incorporated by reference. Under some conditions, it is even possible to obtain sub-harmonics (frequencies that are rational fractions of the fundamental).

The extent of the component waveforms of a particle or a packet of energy is infinite. This is suggested by the limitless extent of fundamental forces (e.g., electromagnetic, electrostatic, and gravitational forces). This is also suggested by the third law of thermodynamics, which implies that no physical system can be prepared in a state that is uncorrelated with systems outside itself, or else its entropy would be zero. Every physical system interacts with other systems. These interactions may result from interactions between the component waveforms. In fact, it is possible to demonstrate fundamental forces of the universe as interactions of (or on) component waveforms.

Figure 4B:
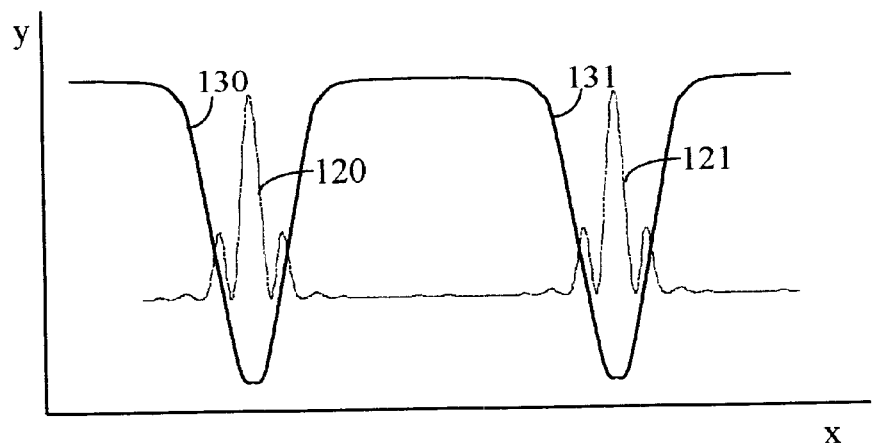
FIG. 4B shows a probability-distribution function at two potential wells that demonstrates the tunneling effect.

FIG. 4B shows a particle (represented by a first probability-distribution function 120 in a first potential well 130) that tunnels to a second potential well 131. The particle in the second well 131 is represented by a second probability-distribution function 121. Wave superposition implies that the particle exists simultaneously in both potential wells 130 and 131. However, the state $\psi(x_i, \Phi_j)$ of the particle is different in each well.

In conventional quantum mechanics, tunneling is considered to be a completely random process. In wave-superposition theory, the process of moving the particle from the first potential well 130 to the second potential well 131 can be explained by an interaction of the potential well 131 (or some other stimulating force or entity) with waveforms that comprise the particle. For example, resonance may stimulate realignment of one or more component waves relative to space-time dimensions and/or relative to other component waves. This type of interaction may shift the non-zero phase space $\Phi_j(f(j) \neq 0)$ of the waveforms to a zero phase space $\Phi_j(0)$ at a particular space-time location $x_i$. The function f(j) is a non-zero expression of relative phase differences between component waves. In this case, the state $\psi(x_i, \Phi_j)$ of the particle is changed (i.e., the particle is moved) in a non-classical sense.

In classical physics, particles do not tunnel through potential wells because translation of the waveforms is not allowed beyond the boundaries of a potential well. Thus, non-classical adjustments to the particle's position may be due to changes of the relative phases $\Phi_j$ between the component waveforms instead of merely translating the waveforms (hence the particle) to a different space-time location $x_i$. This phase-space theory of tunneling and its suggestion of hyper-lightspeed particle velocities are supported by experiment in which tunneling velocities of photons were observed to exceed the speed of light. Furthermore, the phase-space theory is based on fundamental principles of quantum mechanics in its assertion that the state of a potential well can be redefined from the classical binary representation (absence or presence of a particle) to a superposition relationship between the particle's component waveforms.

From a classical point of view, a bit is a two-state system: it can be prepared in one of two distinguishable states representing two logical values, such as 0 or 1. However, quantum computing is based on a principle of quantum mechanics that implies that if a bit can exist in either of two distinguishable states, it can also exist in coherent superpositions of the states. These are additional states in which the bit represents both values, 0 and 1, simultaneously.

Figure 5:
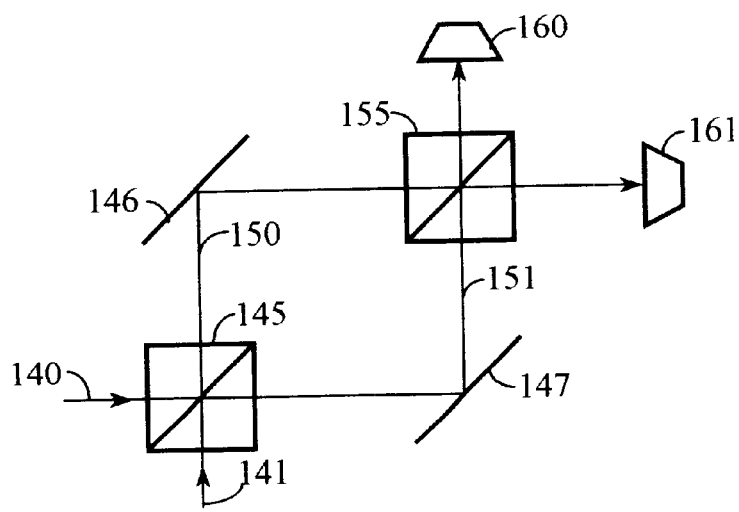
FIG. 5 shows a prior-art interferometer that demonstrates single-particle interference.

FIG. 5 shows a prior-art interferometer that demonstrates single-particle interference. A photon may enter the interferometer by either of two input paths 140 and 141. A beam splitter 145 allows half of the incident light to pass through and half of the incident light to reflect. Thus, there are two paths 150 and 151 out of the beam splitter 145. The interferometer includes two substantially reflecting mirrors 146 and 147. Each of the two paths 150 and 151 enters a second beam splitter 155 that has similar transmission/reflection properties as the first beam splitter 145. A first detector 160 and a second detector 161 detect output beams from the beam splitter 155.

In some configurations (i.e., certain path-length differences between paths 150 and 151), a photon that enters the interferometer always strikes the first detector 160 and never the second detector 161. Any explanation that assumes that the photon takes exactly one path through the interferometer (such as path 150 or path 151) leads to the conclusion that the detectors 160 and 161 should each detect half of the photons in the interferometer. But experiment shows otherwise. The inescapable conclusion is that the photon must, in some sense, have traveled both routes 150 and 151 at once. This conclusion is explained by considering the wave nature of photons.

This property of quantum interference (which makes it appear that invisible counterparts affect the motion of particles that we detect) applies not only to photons, but to all particles and all physical systems. Thus, quantum theory describes an enormously larger reality than the universe we observe around us. It turns out that this reality has the approximate structure of multiple variants of that universe, co-existing and affecting each other only through interference phenomena. The term "parallel universes" in quantum mechanics is sometimes used to explain that what we see as a single particle is actually only one tiny aspect of a tremendously complex entity, the rest of which we cannot detect directly. Quantum computation is all about making use of the invisible aspects of the particle (its counterparts in other universes).

One effect that is especially useful in quantum computation can be demonstrated by delaying the photon on one of the paths 150 or 151. This can be done by inserting an etalon (not shown) into path 150 or 151. Since interference between waves depends on their relative phases, the etalon (not shown) thickness, and thus the delay time, can be selected such that the photon is detected at detector 151 instead of detector 150. Thus, something that happens on only one of the paths affects what is measured at both detectors 150 and 151.

In "Machines, Logic and Quantum Physics," Deutsch and Ekert describe a quantum register composed of multiple quantum bits (qubits) prepared in a superposition of its two logical states 0 and 1. However, the amount of quantum information that qubits hold is substantially larger because the elements of a superposition are present in continuously variable proportions, each with its own phase angle as well. Similarly, the carrier interferometry (CI) architecture of the present invention defines a signal basis for communication that encompasses all carrier phase angles and relative proportions between the carriers.

When a quantum register is prepared in a superposition of many different values, mathematical operations can be performed on all of the values at once. This enables massively parallel computing. A similar effect is realized in the present invention when redundantly modulated optical carrier signals are affected by chromatic dispersion in an optical fiber. Applicant's pending U.S. patent application entitled, "Method and Apparatus for Using Multicarrier Interferometry to Enhance Optical Fiber Communications" (which is hereby incorporated by reference) describes a method of virtual addressing in which the relative phases of transmitted carrier signals are matched to dispersion profiles of the optical fiber over a predetermined distance. Virtual addressing causes coherent superpositions of the carriers to occur at one or more desired nodes in an optical network. The carriers combine non-coherently (and thus, cancel) at other nodes. Thus, dispersion in optical fibers provides virtual switching to multicarrier communication signals and increases the capacity of the fiber far beyond classical limits.

Figure 6:
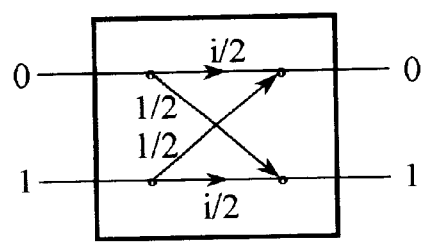
FIG. 6 shows a system having complex probability amplitudes.
Figure 7:
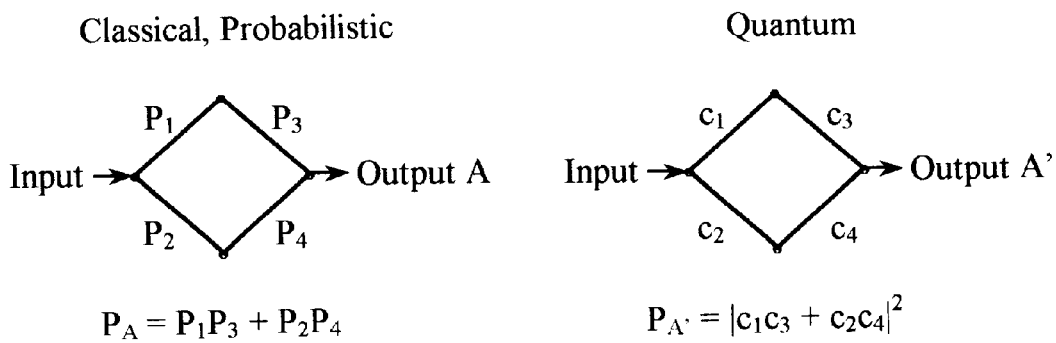
FIG. 7 shows the differences in probability calculations between a classical probabilistic system and a quantum-interferometry system.

FIG. 6 shows a system having complex probability amplitudes. The addition of probability amplitudes, rather than probabilities, is one of the fundamental rules for prediction in quantum mechanics. FIG. 7 shows differences in probability calculations between a classical probabilistic system and a quantum interferometry system. The probability of a particular output (Output A) in a classical system is a sum of the probabilities of all computations leading to the output (Output A). If a quantum system starts in a specific initial configuration (input) and evolves via a sequence of intermediate configurations, the probability that it ends up in a specific final configuration (Output A') is the squared modulus of the sum of all the probability amplitudes of the computational paths that connect the input with the output (Output A'). The amplitudes are complex numbers and may cancel each other (which is referred to as destructive interference) or enhance each other (which is referred to as constructive interference). The basic idea of quantum computation is to use quantum interference to amplify the correct outcomes and to suppress the incorrect outcomes of computations.

If a particular final configuration can be reached via two different paths having probability amplitudes c and −c, then the probability of reaching that configuration is:

$$|c-c|^2=0$$

despite the fact that the probability for the computation to follow either of the two paths separately is $|c|^2$. Furthermore, a single quantum computer can follow many distinct computational paths simultaneously and produce a final output depending on the interference of all of them. This is in contrast to a classical computer model, which follows only a single path.

In quantum mechanics, probabilities of some outcomes can be enhanced (constructive interference) or suppressed (destructive interference) compared with what classical probability theory would permit. In the same way, transmitters and receivers of the present invention provide constructive interference to desired communication signals and destructive interference to interfering signals.

Figure 8:
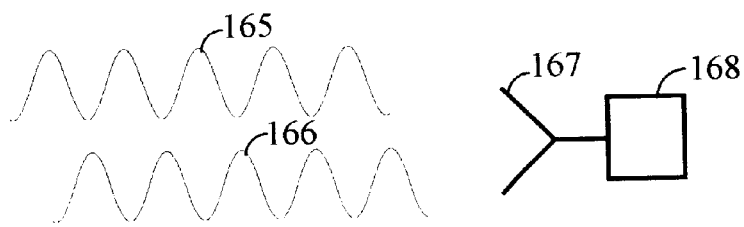
FIG. 8 illustrates an implementation of destructive interference in a communication system.

FIG. 8 illustrates how destructive interference in a communication system cancels an interference signal. A receiver 168 is coupled to an antenna 167 that is responsive to two transmitted signals $T_1$ and $T_2$. The antenna 167 generates two received signals $R_1$ and $R_2$ that are combined in the receiver 168. The transmitted signals $T_1$ and $T_2$ are modulated with identical information streams. The received signals $R_1$ and $R_2$ are adjusted in amplitude and/or phase so they cancel when they are combined in the receiver 168. Methods for providing amplitude adjustment and phase adjustment to transmitted and/or received signals to cancel interference are described in U.S. Pat. Nos. 6,208,135 6,211,671, and 6,008,760 (which are hereby incorporated by reference).

The transmitted signals $T_1$ and $T_2$ are represented by the following equations:

$$T_1(t)=A_1\cos(\omega t+\phi_1) \text{ and } T_2(t)=A_2\cos(\omega t+\phi_2)$$

where $A_1$ and $A_2$ are amplitudes, $\omega$ is the signal frequency, and $\phi 1$ and $\phi 2$ are signal phases. The energy of each transmitted signal $T_1$ and $T_2$ is:

$$E_n(t)=\int_0^{\tau_0}|T_n(t)|^2\delta t=A_n^2\int_0^{\tau_0}|\cos(\omega t+\phi_n)|^2$$

where n=1,2. However, the energy of the received signal is represented by a mathematical equivalent to quantum interference:

$$E_R(t)=\int_0^{\tau_0}|R_1(t)+R_2(t)|^2\delta t=A_o^2\int_0^{\tau_0}|\cos(\omega t+\phi)+\cos(\omega t+\phi+\pi)|^2=0.$$

In the physical sense, the energy of each of the signals $T_1$ and $T_2$ received by the antenna 167 is real. However, at the receiver 168, the combined energy received from signals $T_1$ and $T_2$ is equivalent to a case in which the signals $T_1$ and $T_2$ are not even present.

Figure 9:
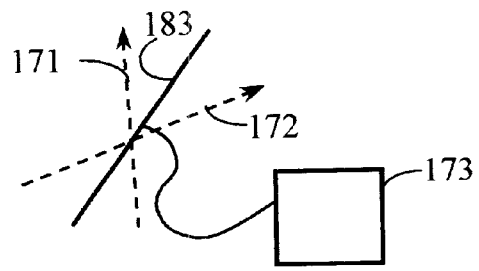
FIG. 9 shows a simple implementation of interferometry in wireless communications.

FIG. 9 shows a simple implementation of interferometry in wireless communications. A vertically polarized signal $T_1(P_v, \omega, \phi)$ 171 and a horizontally polarized signal $T_2(P_h, \omega, \phi+\pi)$ 172 are received by a receiver 173 having a linearly polarized antenna 183 oriented at some angle $\theta$ between vertical and horizontal. The signal received by the receiver is:

$$T_R=T_1(P_v, \omega, \phi)\sin\theta - T_2(P_h\omega, \phi)\cos\theta.$$

If the ratio of amplitudes of $T_2$ to $T_1$ equals $\tan\theta$, then the receiver 173 response is $T_R=0$. The zero response $T_R=0$ represents a destructive superposition of the received signals $T_1$ and $T_2$. The signals $T_1$ and $T_2$ can be referred to as states that are redundantly modulated. The signal received by the receiver 173 is a superposition of the states. These states are combined coherently to retrieve a desired signal. These states are combined non-coherently when the signal is considered to be interference. In this case, the means for controlling how the states are combined involves setting the angle $\theta$ of the antenna 183.

Methods of combining received signals non-coherently to separate interfering channels are described in Applicant's U.S. Pat. Nos. 6,008,760, 6,208,135, and 6,211,671, which are hereby incorporated by reference.

Figure 10:
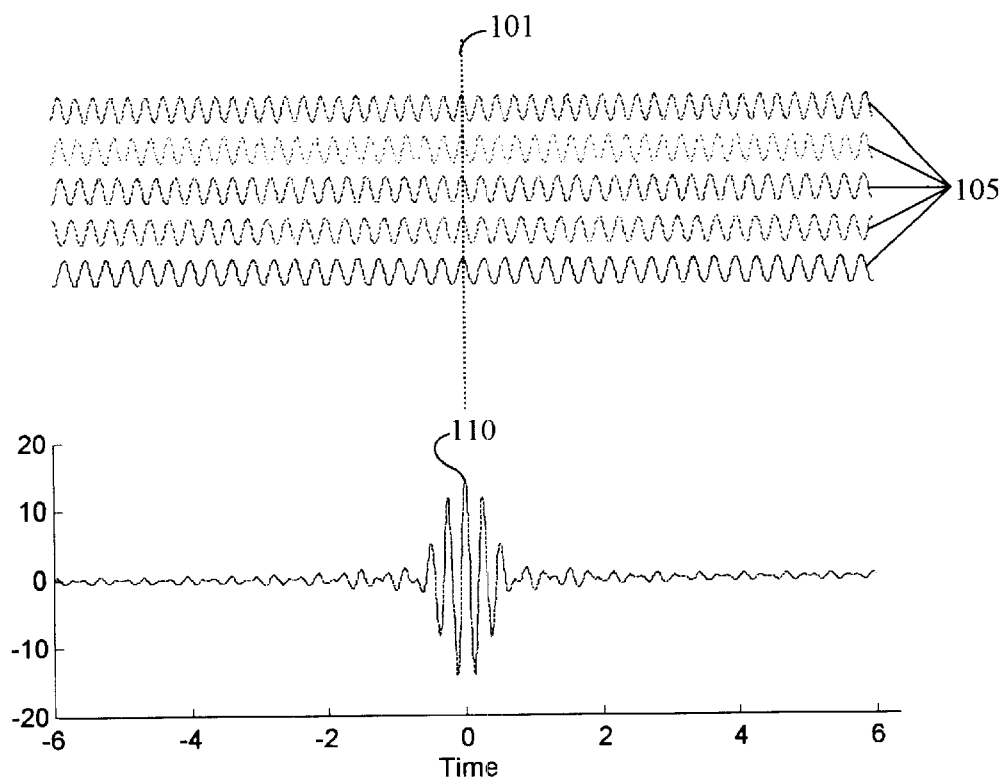
FIG. 10 shows a plurality of component waveforms and a pulse resulting from a coherent superposition of the waveforms as described in methods and systems of the invention.

FIG. 10 shows a plurality of component waveforms 105 and a pulse 110 resulting from a coherent superposition of the waveforms 105, as characterized by methods and systems of the present invention. The pulse 110 represents a pulse shape employed by the present invention in transmission protocols, such as TDMA and CDMA. The pulse 110 shape h(t) is created by superpositioning N carriers equally spaced in frequency by $f_s=1/T_s$:

$$h(t)=\sum_{n=0}^{N-1}A_n\cos2\pi(f_o+nf_s)t,$$

where $A_n$ represents an amplitude of each component waveform 105, $T_s$ is the duration of an information symbol, and $f_o$ is a carrier frequency. The pulse shape h(t), which may be implemented using a Fourier transform operation, can be reduced to:

$$h(t) = \frac{\sin \pi f_s N t}{\sin \pi f_s t} \sin 2\pi (f_o + f_s(N-1)/2)t$$

Figure 11A:
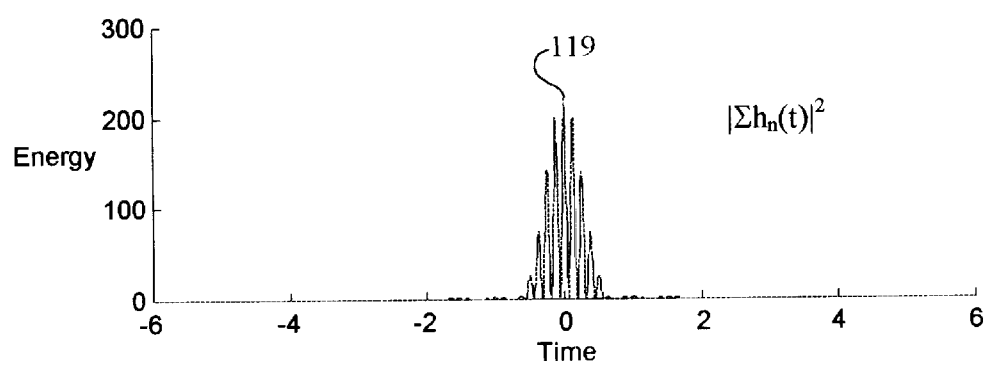
FIG. 11A is a plot of energy distribution for a pulse produced by a superposition of waveforms.
Figure 11B:
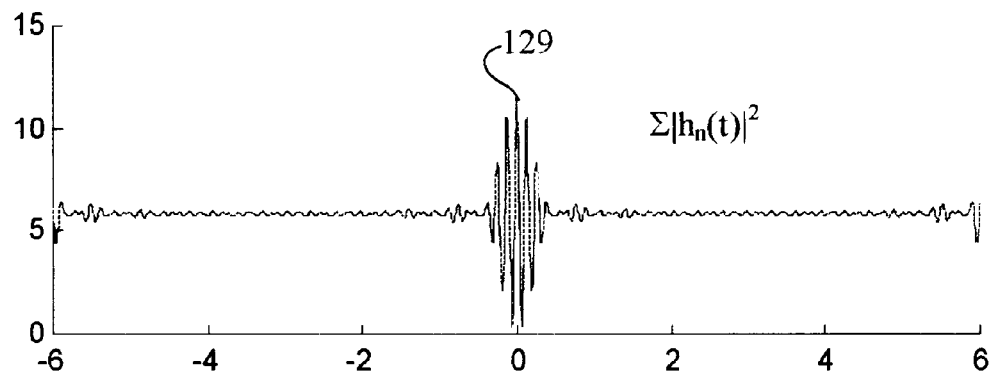
FIG. 11B is a plot of a sum of waveform energy distributions.

The energy distribution of the pulse h(t) relative to time is related to:

$$|h(t)|^2 = \left| A \cdot \frac{\sin\left(\frac{1}{2} N 2\pi f_s t\right)}{\sin\left(\frac{1}{2} 2\pi f_s t\right)} \right|^2,$$

which is illustrated as a pulse energy distribution 119 in FIG. 11A. Thus, the energy distribution of the pulse is concentrated in a narrow time interval: $\tau \approx f_s/N$
whereas the energy distribution of each of the component carriers is distributed substantially uniformly over a time interval that is equal to, or greater than, the information-symbol duration $T_s$. These uniform energy distributions are related to: $|h_n(t)|^2 = |\cos 2\pi (f_o + nf_s)t|^2$.
A sum 129 of these carrier energy distributions is shown in FIG. 11B.

In non-zero phase spaces, the energy of the sum of the component waveforms is substantially less than the sum of the energies of the component waveforms. In zero phase space, the energy of the coherent superposition of the component waveforms is the sum of the energies of the waveforms. There are many unusual consequences of this property that provide benefits to communications, and in particular, wireless communications. Many of these benefits are described in Applicant's co-pending patent applications. For example, in a spread-spectrum communication system, a substantially non-coherent superposition of component waveforms is transmitted in a communication channel. The energy of the transmitted superposition is substantially less than the sum of the energies of the waveforms. The received waveforms are separated using a multi-user detection scheme, shifted in phase, and summed to create a received superposition signal having an energy that is substantially greater than the energy of the transmitted superposition.

3. Basic CI Methods and Systems
   3.1. CI Transmission Overview

A primary benefit of CI in communications is that both diversity (resulting from redundancy in at least one diversity parameter) and bandwidth efficiency (due to orthogonality in at least one diversity parameter) are achieved. A multicarrier signal is defined as a plurality of carrier signals having different orthogonalizing properties (also referred to as diversity parameters), such as time, differential power, location, mode, subspace, frequency, polarization, phase space, directivity, orthogonal or quasi-orthogonal codes, or any combination of orthogonalizing properties. Values of a particular diversity parameter, such as polarization, may not be completely orthogonal. For example, polarized signals having less than 90-degrees separation between them have cross-polarization (interference) terms. However, a plurality of polarization subspaces can be orthogonal. A multicarrier signal may be defined by any signal property that affects propagation characteristics, such as velocity, reflections, and refraction. Thus, each multicarrier signal may be defined by a different propagation mode. Although the components of a CI signal are redundantly modulated in at least one diversity parameter, a superposition of the components results in orthogonality (or quasi-orthogonality) in at least one other diversity parameter.

Figure 12:
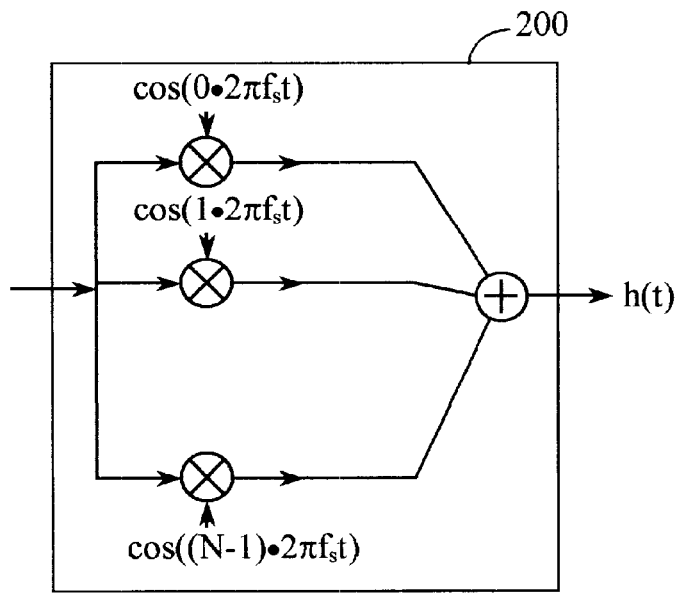
FIG. 12 is a functional diagram of a carrier-interferometry (CI) transmitter that generates a multicarrier superposition signal shown in FIG. 13.
Figure 13:
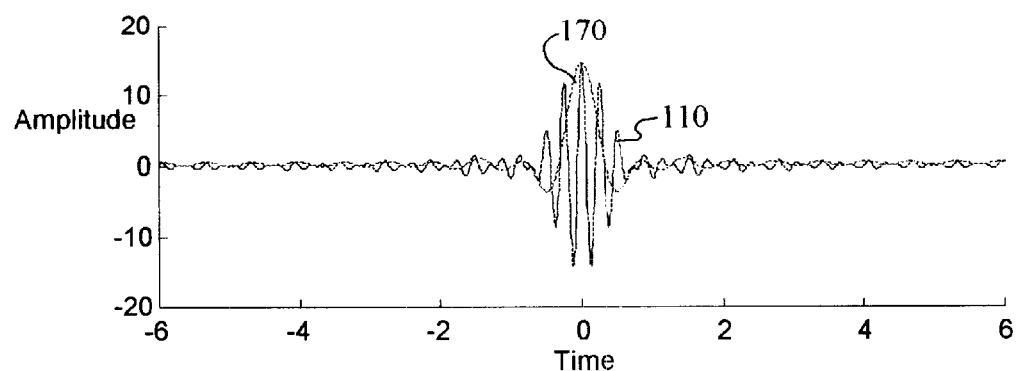
FIG. 13 shows a superposition of sinusoids having incremental values of frequency.

FIG. 12 is a functional diagram of a carrier-interferometry (CI) transmitter 200 that generates a multicarrier superposition signal shown in FIG. 13. FIG. 13 shows a superposition 110 of N sinusoids having incremental values of frequency $f_s$.

The superposition of N carriers that are uniformly spaced in frequency by $f_s$ has a waveform envelope 170 according the equation:

$$E(t) = \left| \frac{\sin(N\pi f_s t)}{\sin(\pi f_s t)} \right|$$

The envelope E(t) is periodic with a period of $1/f_s$. The mainlobe of the envelope E(t) has a width of $2/Nf_s$, and the N−1 sidelobe widths are $2/Nf_s$. Applying a phase shift of $n\Delta\phi k$ to each $n^{th}$ carrier shifts the CI envelope E(t) in time by $\Delta t = \Delta \phi_k / 2\pi f_s$. Therefore, N signals can be positioned orthogonally in time. The phase shifts provide the necessary phase relationships to create the desired timing of the information signal received by at least one receiver (not shown).

The cross correlation between users of a CI system is:

$$R_{cc}(\tau) = \frac{1}{2f_s} \frac{\sin(N 2\pi f_s \tau / 2)}{\sin(2\pi f_s \tau / 2)} \cos((N-1) 2\pi f_s \tau / 2)$$

where τ is the time shift between envelopes. Zeros occur at $k/Nf_s$, and $(2k-1)/2(N-1)f_s$, where k=1,2, . . . , N−1. CI can support N orthogonal users. If additional users or signals need to be accommodated, CI provides N additional positions to place signals.

Figure 14A:
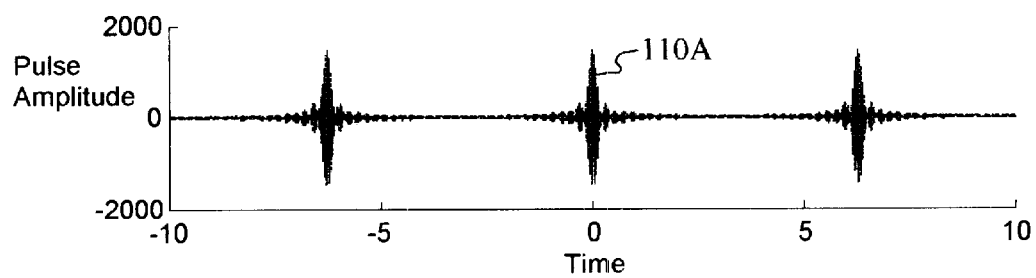
FIG. 14A is a plot of a superposition of waveforms having equally spaced carrier frequencies.
Figure 14B:
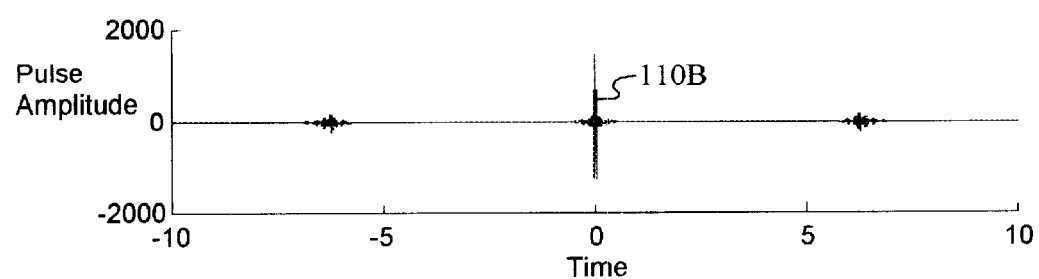
FIG. 14B is a plot of a superposition of waveforms having unequally spaced carrier frequencies.

FIG. 14A and FIG. 14B show composite signals resulting from superpositions of equally spaced carrier frequencies and unequally spaced carrier frequencies, respectively. Equally spaced carrier frequencies produce a superposition signal 110A that has periodic pulses. Unequally spaced-in-frequency carriers produce a non-periodic superposition signal 110B that has reduced sidelobe levels.

Unequally spaced carrier signals refer to any type of sparse or ultra-sparse spacing, such as referred to in array processing, but applied to frequency spacing of the carriers. Unequal spacing includes random spacing, chaotic spacing, non-redundant spacing, or any type of spacing determined by a non-redundant mathematical relation, such as prime numbers, $2^n$ relationships, or Fibonocci series.

Figure 15A:
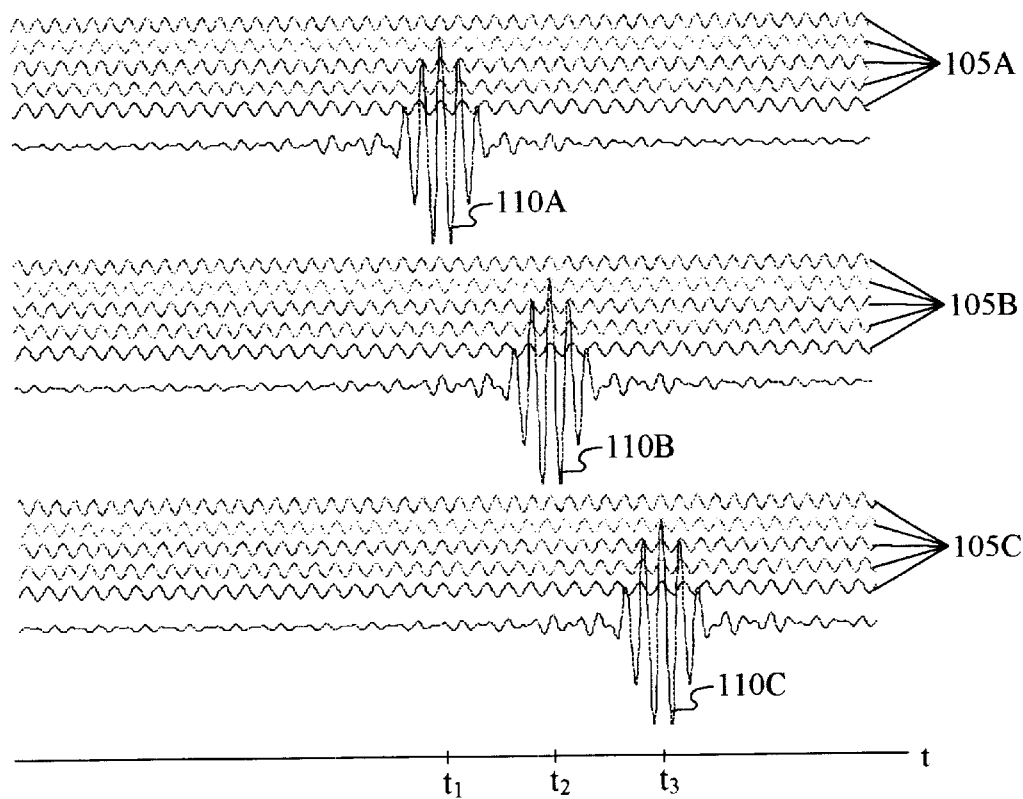
FIG. 15A illustrates a superposition of redundantly modulated carriers.

FIG. 15A illustrates a superposition of redundantly modulated carriers. A first group 105A of carrier signals $c_n(f_n, \phi_1)$ includes a plurality N of carrier signals that each have a unique frequency $f_n$(n=1,2, . . . , N). The carriers have a first phase relationship $\phi_1$ that results in a superposition 111 of the carriers having a predetermined timing characteristic $t_1$. The timing characteristic $t_1$ of the superposition signal 110A may be regarded as a state $S_1$ Furthermore, the set of absolute carrier phases (which is related to the frequency $f_n$ of each carrier and the phase relationship $\phi_1$) may be regarded as a state $S_{n1}$. Thus, the state $S_1$ is a superposition of states $S_{nl}$. Similarly, a carrier signal, as referred to in the description of the invention, may be a superposition of component carrier signals.

A second group 105B of carrier signals $c_n(f_n, \phi_2)$ and a third a third group 105C of carriers $c_n(f_n, \phi_3)$ each include a plurality N of carrier signals having frequencies of $f_n$(n= 1,2, . . . , N). A superposition signal 110B occurring at a time $t_2$ (state $S_2$) results from a superposition of the second group 105B, which has a second phase relationship $\phi_2$. Similarly a superposition signal 110C. occurring at a time $t_3$ (state $S_3$) results from a superposition of the third group 105C, which has a third phase relationship $\phi_3$. The superposition signals shown are substantially orthogonal with respect to each other relative to time. However, the superpositions may be quasi-orthogonal. Non-orthogonal superpositions may be processed in a multi-user or multi-channel detector.

Figure 15B:
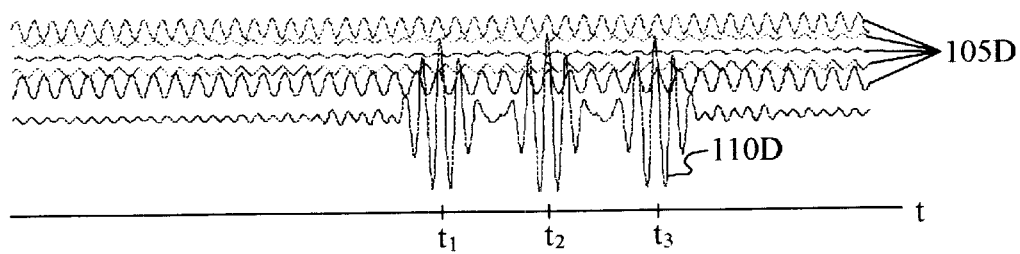
FIG. 15B illustrates a superposition of time-offset pulses.

FIG. 15B illustrates a superposition signal 110D resulting from a superposition of signals 110A, 110B, and 110C (i.e., states $S_1$, $S_2$, and $S_3$). A group 105D of N carriers $c_n(f_n, \phi_4)$ representing the superposition of the carriers $c_n(f_n, \phi_m)$, where m=1,2,3 is represented by:

$$c_1(f_1, \phi_4) = c_1(f_1, \phi_1) + c_1(f_1, \phi_2) + c_1(f_1, \phi_3)$$

$$c_2(f_2, \phi_4) = c_2(f_2, \phi_1) + c_2(f_2, \phi_2) + c_2(f_2, \phi_3)$$

$$\vdots$$

$$c_N(f_N, \phi_4) = c_N(f_N, \phi_1) + c_N(f_N, \phi_2) + c_N(f_N, \phi_3).$$

Thus, a set of complex weights applied to the N carriers generates a superposition of the states $S_1$, $S_2$, and $S_3$. If the time-domain signals 110A, 110B, and 110C represented by states $S_1$, $S_2$, and $S_3$ are used as a fundamental basis (underlying signal architecture) for other signals, a set of weights applied to the time-domain signals 110A, 110B, and 110C provides an equivalent result to applying a particular set of weights to the N carriers.

Figure 16A:
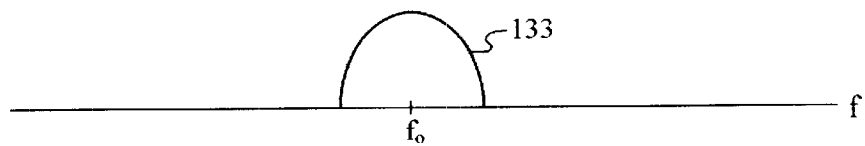
FIG. 16A shows the frequency spectrum of a conventional narrowband protocol.
Figure 16B:
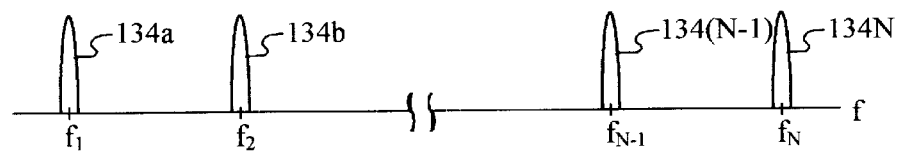
FIG. 16B shows the frequency spectrum of a conventional narrowband protocol implemented as a multicarrier protocol.

CI can provide the underlying architecture for any type of transmission protocol. For example, a conventional narrowband protocol (such as a TDMA protocol illustrated by a narrow frequency spectrum 133 in FIG. 16A) can be implemented as a multicarrier protocol having a plurality N of carriers 134a to 134N having an effectively wideband frequency spectrum, as shown in FIG. 16B.

Figure 17A:
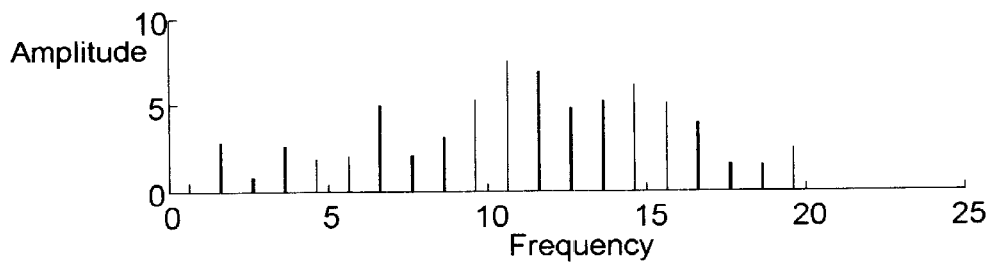
FIG. 17A is a time-domain representation of a direct-sequence signal.
Figure 17B:
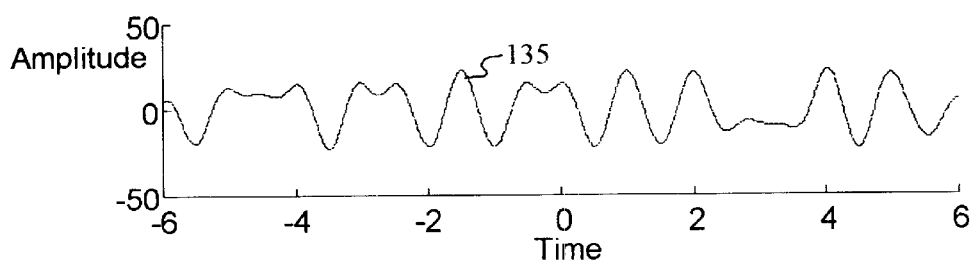
FIG. 17B is a plot of relative magnitudes of a plurality of carrier signals whose superposition results in the direct-sequence signal shown in FIG. 17A.
Figure 17C:
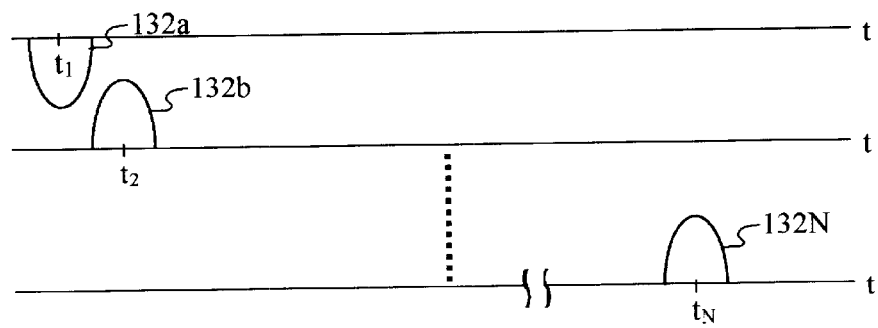
FIG. 17C illustrates a plurality of time-domain pulses that can be combined to produce the direct-sequence signal shown in FIG. 17A.

The granularity of carrier components allows a wideband protocol to be implemented in more than one way. A time-domain representation 135 of a direct sequence signal is shown in FIG. 17A. FIG. 17B shows a plot of relative magnitudes of each frequency component of a plurality of carrier signals whose superposition results in the direct-sequence signal 135. Similarly, a superposition of N time-domain pulses 132a to 132N shown in FIG. 17C produces the direct-sequence signal 135. Multicarrier signal architectures may also be provided to conventional multicarrier transmission protocols, such as orthogonal frequency division multiplexing (OFDM), wavelength division multiplexing (WDM), and MC-CDMA.

Figure 18A:
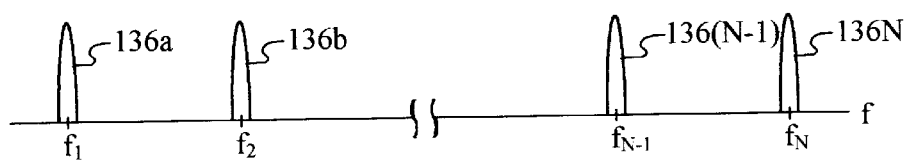
FIG. 18A shows a frequency-domain representation of a multicarrier signal consisting of a plurality of carriers.
Figure 18B:
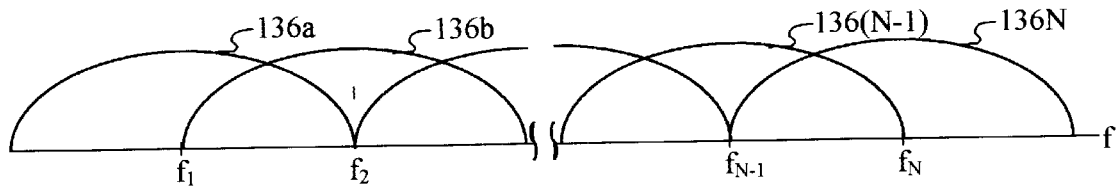
FIG. 18B shows a frequency-domain representation of a modulated multicarrier signal.

FIG. 18A shows a frequency-domain representation of a multicarrier signal consisting of a plurality N of carriers 136a to 136N. FIG. 18B shows a frequency-domain representation of the multicarrier signal when each carrier 136a to 136N is modulated with an information signal, a code signal, or a coded information signal.

An analysis of the energy of a superposition signal relative to the sum of energies of its component waveforms can be simplified by considering only two waveforms:

$$h(t) = \sum_{n=0}^{1} \cos 2\pi(f_o + nf_s)t.$$

The sum of the component-waveform energies is:

$$E(t) = \int_0^T \cos^2(2\pi f_o t)\delta t + \int_0^T \cos^2(2\pi(f_o + f_s)t)\delta t$$

and the energy of the superposition of the waveforms is:

$$E(t) = \int_0^T \cos^2(2\pi f_o t)\delta t + \int_0^T \cos^2(2\pi(f_o + f_s)t)\delta t + \int_0^T \cos(2\pi(f_o + f_s)t)\cos(2\pi f_o t)\delta t.$$

The energy difference between the sum of component-waveform energies and the superposition energy results from the nature of interference between the waveform. This energy difference is expressed by:

$$\Delta E(t) = 2\left(\frac{\sin(2\pi f_s T)}{4\pi f_s} + \frac{\sin(2\pi(2f_o + f_s)T)}{4\pi(2f_o + f_s)}\right).$$

The time T may represent a symbol duration. Thus, the symbol duration affects the amount of the energy difference $\Delta E(t)$.

If a small portion of the pulse period $1/f_s$ is pulse-amplitude modulated with an information signal (i.e., the symbol duration T is less than $1/f_s$), the frequency spectra of the modulated carriers (such as the frequency spectra shown in FIG. 18B) overlap the centers of adjacent carriers. This overlap, which can result from non-zero phase-space modulation (and other modulation techniques in which $T<1/f_s$), can be processed in a receiver that uses multi-user detection or some equivalent form of interference removal such as used to separate modulated carriers.

If $T=1/f_s$, then $\Delta E(t)$ is expressed as:

$$\Delta E(t) = \frac{\sin(4\pi(f_o + f_s)/f_s)}{2\pi(2(f_o + f_s) + f_s)}.$$

Thus, different proportions of $(f_o+f_s)/f_s$ can determine the amount of the energy difference $\Delta E(t)$.

CI components may be characterized by more complicated parameters. For example, the carrier signals may have sparsely distributed frequencies and/or phases (e.g., non-uniformly spaced frequencies and/or phases). CI components may overlap in at least one diversity parameter and may require interference cancellation or some other type of multi-user detection method to separate the components.

3.2. CI-Transmission Methods

Figure 19:
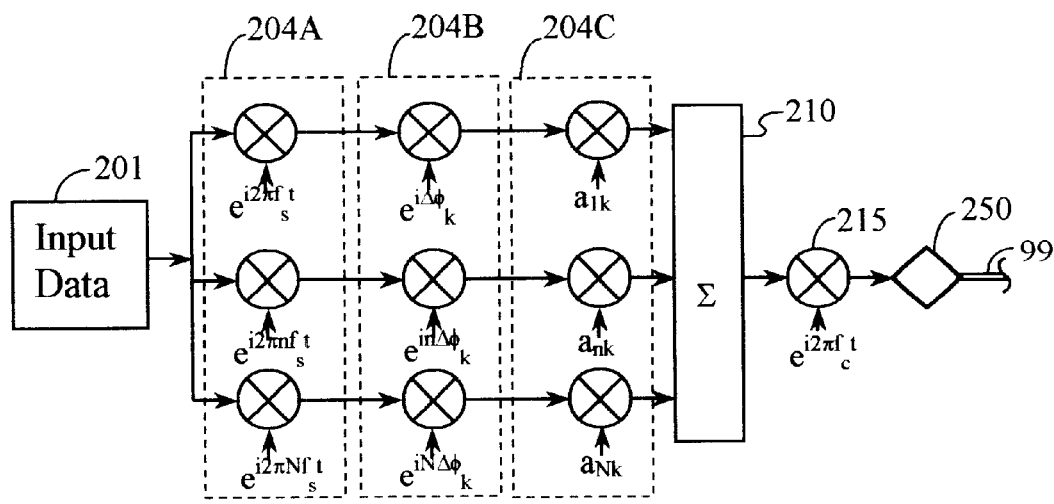
FIG. 19 illustrates a method for generating CI signals.

FIG. 19 shows a method for generating CI signals. An information signal $s_k(t)$ (from an input data source 101) intended for a $k^{th}$ user is modulated onto N carriers in a first modulation step 204A. In a second modulation step 204B, complex weights are applied to the modulated carriers. The complex weights may include phase shifts (or delays). Unlike a chip sequence in MC-CDMA (which uses binary values, such as ±1), CI signals use incremental (n) phase-shift values, such as $e^{in\Delta\phi}{}_k$. The process of providing a uniform delay to each of the carriers applies incremental phase-shift values (such as $e^{in\Delta\phi}{}_k$) to the carriers. In an optional third modulation step 204C, additional weights $a_{nk}$ are applied to the carriers. The weights $a_{nk}$ may include windowing weights, channel-compensation values, code values, and/or weight values that facilitate signal separation by cancellation or constellation methods at a receiver (not shown). The weights $a_{nk}$ may include a diversity operation P(q). The modulation steps 204A, 204B, and 204C may be performed in any order and may be combined. The carriers are combined 210, optionally up converted 215, and coupled 250 into a communication channel 99.

Figure 20:
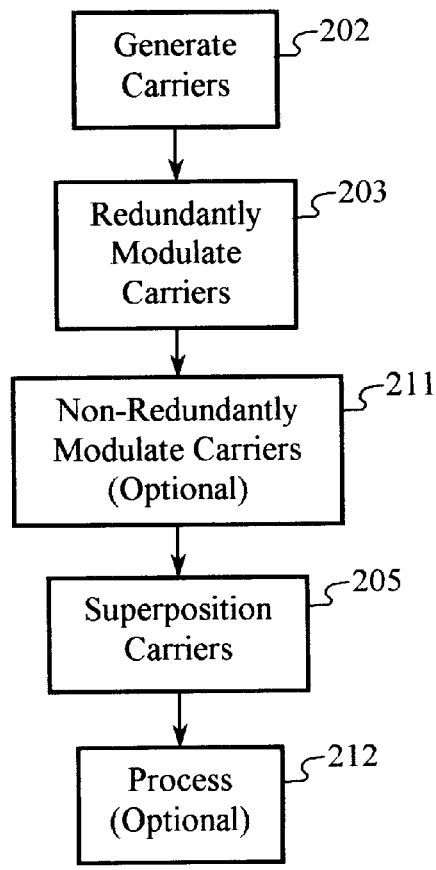
FIG. 20 shows a method of generating a CI signal.

FIG. 20 shows a method of generating a CI signal. A multicarrier signal is generated in a generation step 202. The multicarrier signal is modulated with at least one information signal in a modulation step 203. An optional modulation step 211 may provide non-redundant modulation (such as coding, windowing, filtering, etc.) to the carriers. The modulated carriers are combined in a superposition step 205 to provide a superposition signal having substantial orthogonality in at least one diversity parameter.

The order of the steps 202, 203, and 205 may be changed. Two or more of the steps 202, 203, 205, and 211 may be combined. In one embodiment of the invention, the generation step 202 may be combined with either or both modulation steps 203 and 211. For example, a timing signal used to generate a multicarrier signal may be modulated with an information signal.

In one embodiment, the carriers are processed in an optional processing step 212 before being transmitted over a communication channel. The processing step 212 may include selecting a subset of the carriers. The processing step 212 may include attenuating and/or amplifying any of the carriers to compensate for channel distortions and/or interference. Processing 212 may include adjusting one or more carrier frequencies (or other diversity parameters, such as phase) to avoid interference or compensate for nonlinear or multipath distortions. Processing 212 may include frequency up-conversion and amplification prior to coupling (transmitting) the carriers into a communication channel (not shown).

Each transmitted carrier is provided with an appropriate frequency, phase, and amplitude such that when all of the carriers are combined, the resulting superposition includes an envelope signal that is indicative of an information signal modulated (or otherwise impressed) on the carriers. Although the same information signal is modulated onto the carriers, signal characteristics (such as frequency, phase, and/or amplitude) of the information signal may vary between carriers. Thus, each of the carriers may transport a component of the information signal rather than simply being redundantly modulated.

3.3. CI-Transmission Systems

Figure 21:
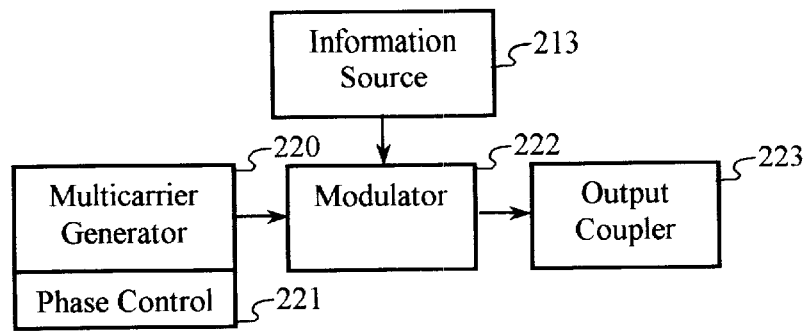
FIG. 21 is a diagram of a CI transmission system.

A CI transmission system shown in FIG. 21 includes a multicarrier generator 220, an information source 213, a modulator 222, a superposition controller (such as a phase controller 221), and an output coupler 223. The multicarrier generator 220 produces a multicarrier signal that is modulated with at least one information signal from the information source 213. Alternatively, the information source 213 may provide the information signal to the multicarrier generator 220, which impresses the information signal onto the multicarrier signal. The superposition controller 221 provides a predetermined relationship (such as a particular relative phase relationship) to the multicarrier signal that causes a superposition of the carriers to have a related relationship (such as a particular time offset). The superposition controller 221 may be integrated into the multicarrier generator 220 such that the multicarrier signals are generated with the predetermined relationship. In another embodiment, the superposition controller 221 may be integrated into the modulator 222. In a further embodiment, the function of the superposition controller 221 may be enhanced by dispersion characteristics of a communication channel (not shown).

The multicarrier generator 220 may include any type of system that generates a plurality of carrier signals characterized by different values of at least one diversity parameter. For example, a multi-frequency carrier generator may include one or more of the following: a pulse generator (such as a switching system), a plurality of local oscillators (LOs), a modelocked system, a frequency-shifted feedback system, an FFT circuit, an IFFT circuit, a nonlinear system capable of generating a harmonic and/or intermodulation products, and any type of wideband generator coupled to a filter bank.

Figure 22A:
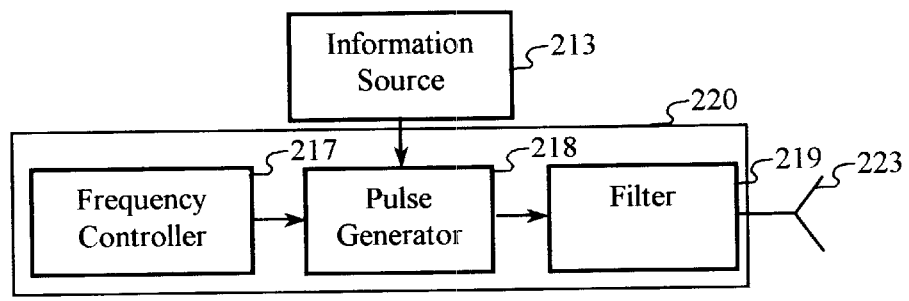
FIG. 22A shows an embodiment of CI transmission system.
Figure 22B:
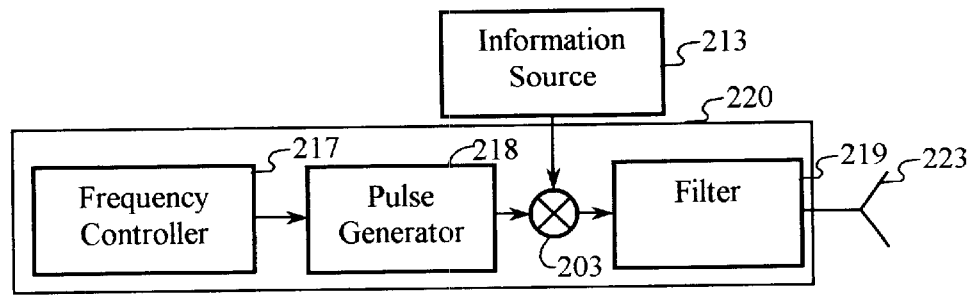
FIG. 22B shows an embodiment of CI transmission system.
Figure 22C:
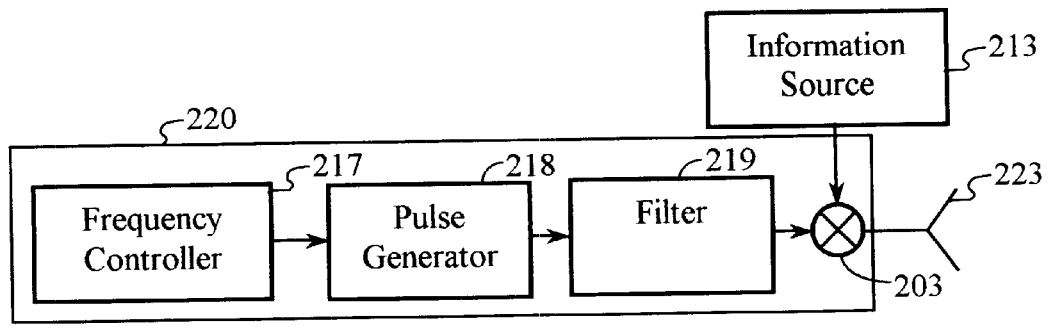
FIG. 22C shows an embodiment of CI transmission system.
Figure 22D:
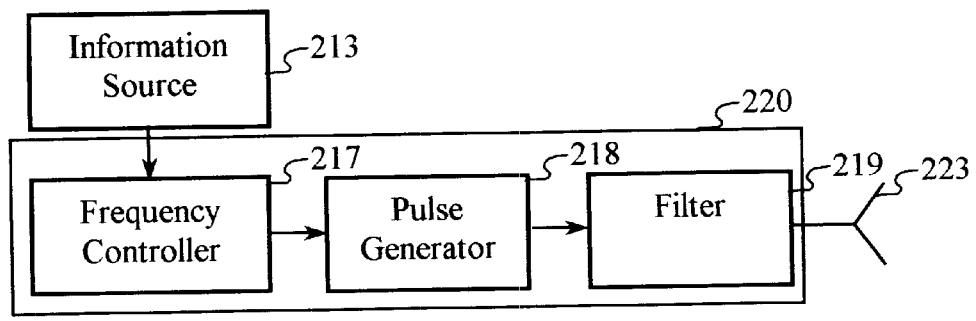
FIG. 22D shows an embodiment of CI transmission system.
Figure 22E:
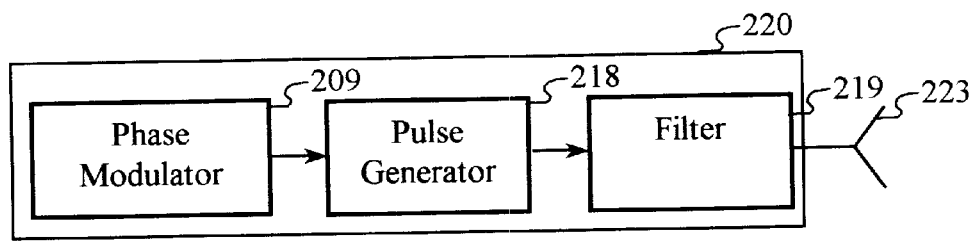
FIG. 22E shows an embodiment of CI transmission system.

Various embodiments of CI transmission systems are shown in FIG. 22A, FIG. 22B, FIG. 22C, FIG. 22D, and FIG. 22E. A multicarrier generator 220 may include a frequency controller 217 for generating a timing signal that controls the frequency of pulses generated by a pulse generator 218. A periodic timing signal results in the pulse-generator 218 output having uniformly spaced-in-frequency carriers. In FIG. 22D, the timing signal may be impressed with one or more information signals to adjust the pulse-generator's 218 output. An optional filter 214 may select a plurality of the carriers for transmission before or after being modulated with at least one information signal generated by an information-signal source 213. In FIG. 22D, an information signal is input to a phase modulator 209 that controls the phase of the multicarrier signal.

FIG. 23A and FIG. 23B show possible embodiments of a frequency controller 217. An LO 224 generates a periodic signal that maybe shaped by a pulse-shaping circuit 226. A replication system 228 receives a periodic timing signal and increases the frequency of the timing signal by splitting the signal into a plurality of paths, providing differential delays to the paths, and then recombining the delayed signals.

Figure 24C:
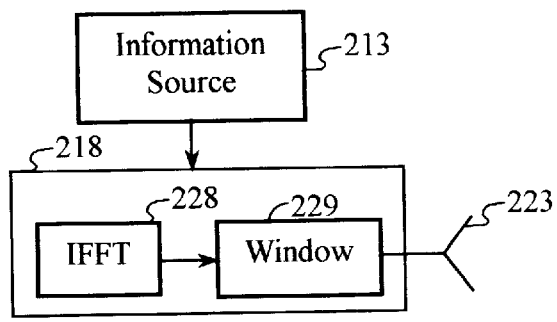
FIG. 24C shows an embodiment of a pulse generator.
Figure 24D:
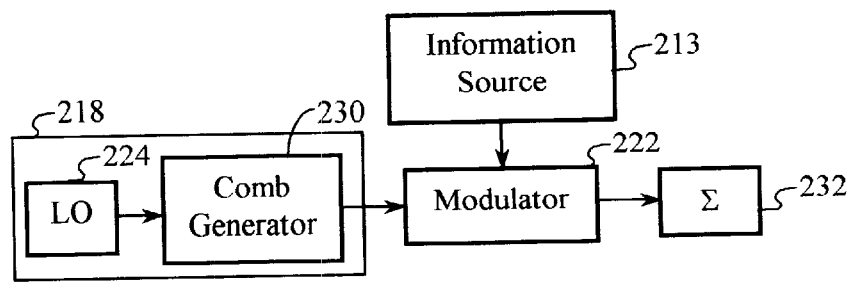
FIG. 24D shows an embodiment of a pulse generator.

FIG. 24A shows an embodiment of a pulse generator 218 that includes a switch 227 and a timer 225 that controls the opening and closing of the switch 227. In FIG. 24B, a switch 227 is implemented as one or more field effect transistors (FETs). FIG. 24C shows a pulse generator 218 that includes an inverse Fourier transformation (e.g., an IFFT) circuit 228 that generates $2^N$ carrier signals and an optional window system 229 that passes a plurality of the carriers. Alternatively, a microprocessor (not shown) may be implemented that is capable of performing IFFT and windowing functions. In FIG. 24D, a pulse generator 218 is implemented with a LO 224 coupled to a comb generator 230 that generates a number N of equal-amplitude, equally spaced sinusoids and matching cosinusoids.

Figure 25:
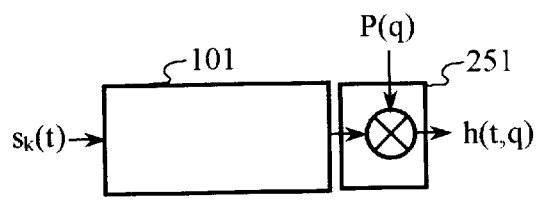
FIG. 25 shows a functional diagram of a CI transmitter that includes a diversity-operation system.

FIG. 25 shows a functional diagram of a CI transmitter 101 that includes a diversity-operation system 251. The diversity-operation system 251 represents any method in which a diversity operation P(q) affecting at least one diversity parameter (indicated by an arbitrary diversity parameter q) operates upon a superposition signal h(t). The operation P(q) may be performed on components of h(t) before superposition and/or the signal h(t) resulting from superposition. For example, the operation P(q) may provide a delay to the superposition signal h(t) to place it in a particular time interval. The operation P(q) may include pulse-amplitude modulation to select one or more phase spaces, or range of phase spaces within h(t).

3.4. CI-Reception Overview

One embodiment for recovering information signals from a received multicarrier signal includes combining the carriers to produce a superposition signal having an envelope signal that is indicative of the information signal. The pulse 110 shape h(t) of a basic CI signal is created by superpositioning N carriers that are equally spaced in frequency by $f_s = 1/T_s$:

$$h(t) = \sum_{n=0}^{N-1} A_n \cos 2\pi (f_o + nf_s)t,$$

After applying well-known mathematical identities, the basic pulse shape is represented by:

$$h(t) = \frac{\sin \pi f_s N t}{\sin \pi f_s t} \sin 2\pi (f_o + f_s(N-1)/2) t$$

The envelope signal is represented by the energy distribution function of h(t), which contains the term: $\sin \pi f_s N t / \sin \pi f_s t$. The envelope signal appears as an amplitude modulation of an effective carrier signal represented by the term: $\sin 2\pi(f_o + f_{s(N-1)}/2)t$. The effective carrier signal has a frequency $f_{eff} = (f_o + f_s(N-1)/2)$. The expression for the effective carrier frequency $f_{eff}$ is valid for all signals that are superpositions of the basic pulse shape. The effective carrier frequency $f_{eff}$ is affected by relative amplitudes of the carrier signals.

3.5. CI-Reception Methods

FIG. 26 shows a generalized method for receiving CI signals. At a receive location, transmitted carrier signals are coupled from a communication channel (not shown) in a coupling step 301. The received signals may be processed in an optional post-coupling processing step 311. In one embodiment, the received carriers are translated to a lower frequency, such as an intermediate or baseband frequency. The processing step 311 may provide signal processing to the received signals, such as filtering, equalizing, amplifying, attenuating, phase shifting, delaying, mixing, sampling, frequency shifting, translating to a different modulation format, interference cancellation, analog-to-digital conversion, integration, rectification, averaging, and/or decoding.

The received signals are separated into component carrier signals in a diversity-decoding step 302. The diversity-decoding step 302 separates the received signals into carrier signals with respect to a plurality of values (or ranges of values) of at least one diversity parameter. An optional post-decoding processing step 312 may process one or more of the individual carrier signals. The processing step 312 may provide signal processing to one or more of the decoded signals, such as filtering, equalizing, delaying, mixing, sampling, applying complex weights, frequency shifting, translating to a different modulation format, interference cancellation, analog-to-digital conversion, integration, rectification, averaging, and/or decoding.

The carrier signals are combined in a combining step 303 to produce an envelope signal that is substantially similar to at least one transmitted information signal. The combining step 303 may include summing, correlating, canceling, or otherwise combining a plurality of the carrier signals. An optional post-combining step 313 may be used to process the combined signals. The processing step 313 may provide signal processing to the combined signal including, but not limited to, filtering, equalizing, delaying, mixing, sampling, applying complex weights, frequency shifting, translating to a different modulation format, interference cancellation, analog-to-digital conversion, integration, rectification, averaging, generating a feedback signal, comparing, evaluating, and decoding.

The received carriers may be received separately (or otherwise separated after reception) and processed before combining 303. Processing (such as steps 311, 312, and/or 313) of the received signals may include compensating for channel distortion and/or interference imparted to one or more of the carrier signals. Post-combining processing 313 may include detecting errors in the recovered information signal, which may include cyclic redundancy check (CRC), parity check, check sum, or any other error detection scheme.

3.6. CI-Receiver Systems

FIG. 27 shows a receiver module that is a generalized structural embodiment for performing the operational steps shown in FIG. 26. However, it should be understood that the scope and spirit of the of the present invention includes other structural embodiments for performing the steps of FIG. 26.

A coupler 306 couples information-bearing transmitted signals from a communication channel (not shown) to produce one or more received signals. The received signal(s) may be processed by an optional processor 316 according to the method set forth in step 311. A diversity decoder 307 separates the received signal(s) with respect to at least one diversity parameter into a plurality of carrier signals. The carrier signals may be processed by an optional processor 317, as indicated by step 312. The carrier signals are combined by a combiner 308 that produces a superposition signal that is indicative of at least one information signal modulated (or otherwise impressed) upon the carrier signals. An optional processor 318 may process the combined signal in a manner consistent with the method described with respect to step 313.

Figure 28A:
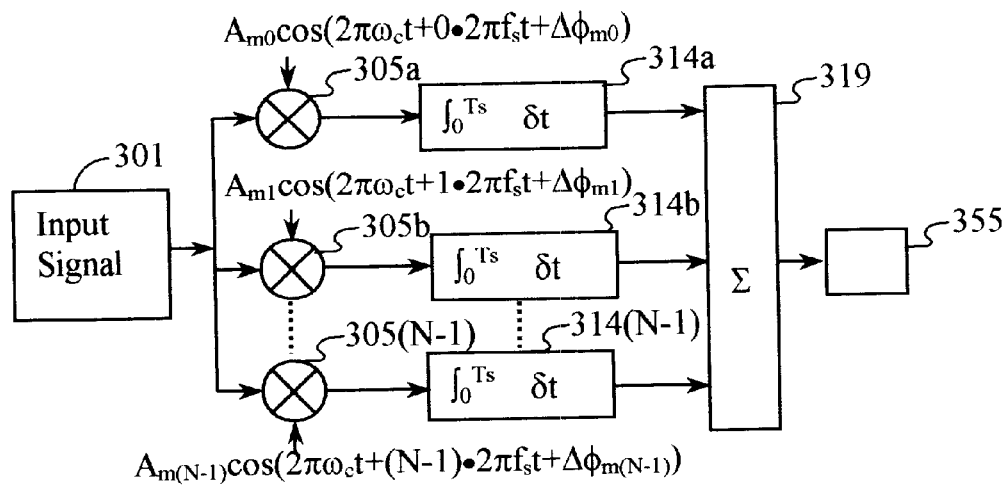
FIG. 28A shows a basic CI receiver for an $m^{th}$ user.

A basic CI receiver for an $m^{th}$ user is shown in FIG. 28A. Signal components received from a communication channel (not shown) have various values of amplitude $A_{mn}$ and phase $\phi_{mn}$. These values may differ between received signal components due to amplitude and phase profiles of the transmitted signals, effects of the communication channel on the amplitudes $A_{mn}$ and the relative phases $\phi_{mn}$ of the transmitted signals, and any effects caused by reception. Transmission and/or reception may be controlled to provide predetermined relative amplitudes $A_{mn}$ and/or phases $\phi_{mn}$ to the received signals. The relative values of amplitude $A_{mn}$ and phase $\phi_{mn}$ of each received component are taken into consideration when providing a cross-correlation signal to each component. For example, relative values $A'_{mn}$ and $\phi'_{mn}$ of the cross-correlation signal components may be matched to the relative values $A_{mn}$ and $\phi'_{mn}$ of the received signal components.

Signal components received from the communication channel (not shown) may have sparsely distributed values of frequency $f_{mn}$ and/or and phase $\phi_{mn}$ The term sparsely distributed, as used herein, refers to carrier frequencies $f_{mn}$ and/or phases $\phi_{mn}$ that have a plurality N of values where N>2. The carrier frequencies $f_{mn}$ and/or phases $\phi_{mn}$ may be uniformly spaced or non-uniformly spaced. The values may be characterized by a random or chaotic distribution. The values may be characterized by any type of mathematical distribution.

Figure 28B:
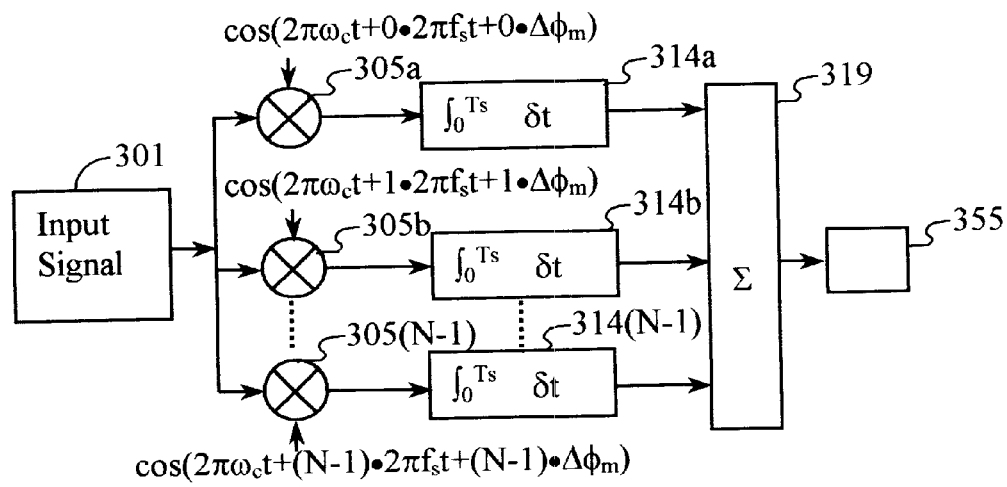
FIG. 28B shows a basic CI receiver for an $m^{th}$ user.

A CI receiver for an $m^{th}$ user is shown in FIG. 28B. CI signals are coupled out of a communication channel (not shown) by a coupler 301. Information signals are extracted from each carrier by a plurality N of correlators 305a to 305N. The correlators 305a to 305N may include a filter bank (not shown). In this case, the correlators 305a to 305N project the received signals onto the orthonormal basis of the transmitted signals. The constant-phase value $\Delta\phi_m$ for an $m^{th}$ user equals $2\pi m/N$. Correlators (such as the correlators 305a to 305N) may compensate for channel distortion and/or addressing. The correlators 305a to 305N may apply windowing and/or other filtering processes to the received signals.

Correlation signals output from the correlators 305a to 305N may be integrated by a plurality of integrators 314a to 314N over a symbol interval $T_s$ before being combined in a combiner 319. A decision device 355 detects the combined signals. The decision device 355 may be part of the combiner 319. The decision device 355 may perform multi-user detection or multi-channel detection and may perform any combination of cancellation and constellation processes to determine the value(s) of received signal(s).

Figure 29:
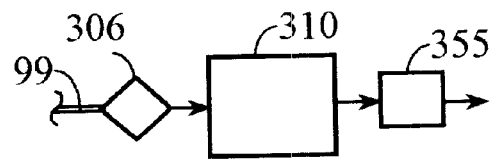
FIG. 29 shows a CI receiver modeled as a matched filter.

FIG. 29 shows a CI receiver modeled as a matched filter 310. The matched filter 310 may optionally provide time limiting (gating) to the received signals before being processed by a decision device 355.

Because interference between the carriers results in an envelope function representing a baseband information signal, a CI receiver can be much simpler to implement than a conventional receiver because a CI receiver does not require a demodulation system. The high-frequency components of the superposition signal may be filtered out or otherwise removed to leave only the envelope signal.

Methods and systems of extracting a baseband information signal are described in the following sections. Various techniques may be used to recover the baseband signal including filtering, envelope detection, sampling, under sampling, time-offset sampling, frequency-offset sampling, spatial-interferometry filtering, matched filtering, and/or coherence multiplexing. The received carriers may be processed separately or together before being combined. The front end of a receiving system of the invention may include one or more filters to select the received frequency band and/or individual carrier signals. Post-combining processing, in addition to detecting the envelope signal, may be performed.

3.6.1. Overview of Conventional Down-conversion Techniques

There are many different techniques for down converting a modulated carrier signal to an intermediate-frequency or baseband signal. Any of these techniques may be incorporated into the present invention.

Synchronous detection involves multiplying an amplitude-modulated carrier signal by a sine wave whose frequency is equal to the carrier frequency, and then filtering the resulting product voltage. Coherent Demodulation is accomplished by remodulating using an LO that is at the same frequency and in phase with the received carrier signal. Envelope detection is a form of non-coherent demodulation (i.e., it does not require a coherent carrier reference). This method is based on the fact that the information is contained in the envelope of an amplitude-modulated (AM) waveform. The AM signal is half-wave rectified (usually by a diode) and then the high-frequency carrier component is filtered out leaving the desired information signal. Additional down-conversion techniques are described in the following sections.

3.6.2. The Sampling Theorem

The Sampling Theorem states that $f_{SR}/2$ is the highest frequency in an analog signal that can be unambiguously reconstructed when the signal is sampled at a rate $f_{SR}=1/T_{SR}$. Any frequency above $f_{SR}/2$ (or below $-f_{SR}/2$) results in samples that are identical with a corresponding frequency in the range $-f_{SR}/2 \leq f \leq f_{SR}/2$. Thus, to avoid ambiguities resulting from aliasing, the Sampling Theorem requires that the sampling rate be sufficiently high such that $f_{SR}/2 > f_{max}$, where $f_{max}$ is the highest frequency of the desired analog signal.

If $f_{max}=B$ (where B is the bandwidth of an analog signal $x_a(t)$) and the signal is sampled at a sampling rate $f_{SR}>2f_{max}$ ($=2B$), then the analog signal $x_a(t)$ can be recovered from its sample values using the interpolation function:

$$g(t) = \frac{\sin 2\pi B t}{2\pi B t}$$

The analog signal $x_a(t)$ may be expressed as:

$$x_a(t) = \sum_{n=-\infty}^{\infty} x_a\left(\frac{n}{f_{SR}}\right) g\left(t - \frac{n}{f_{SR}}\right)$$

where $x_a(n/f_s) = x_a(nT) \equiv x(n)$ represents the samples of $x_a(t)$.

When $x_a(t)$ is sampled at the minimum sampling rate $f_{SR}=2B$, the reconstruction of $x_a(t)$ is given by:

$$x_a(t) = \sum_{n=-\infty}^{\infty} x_a\left(\frac{n}{2B}\right) \frac{\sin 2\pi B(t - n/2B)}{2\pi B(t - n/2B)}$$

The reconstruction of $x_a(t)$ from the sequence $x(n)$ can be a complicated process involving a weighted sum of the interpolation function $g(t)$ and its time-shifted versions $g(t-nT)$ for $-\infty < n < \infty$, where the weighting factors are the samples $x(n)$. Practical interpolation methods for reconstructing $x_a(t)$ are well known in the art.

3.6.3. Down-conversion by Mixing

If the signal of interest is a bandpass signal having frequency components in the band $B_1 \leq f \leq B_2$, a blind application of the Sampling Theorem would require an extremely high sampling rate $f_{SR}$. A frequency shift can be achieved by multiplying the passband signal by quadrature carriers $\cos(2\pi f_c t)$ and $\sin(2\pi f_c t)$, and then low-pass filtering the products to remove the signal components having frequencies of $2f_c$. This multiplication and filtering is usually performed in the analog domain, and then the filter outputs are sampled. The resulting low-pass signal has a bandwidth $B/2$, where $B=B_2-B_1$. Thus, the low-pass signal can be represented uniquely by samples taken at the rate of B for each of the quadrature components. The resulting sampling rate is $2B$ samples per second.

3.6.4. The Passband Sampling Theorem

Although the Sampling Theorem teaches to avoid aliasing, there are several systems (such as the stroboscope and the sampling oscilloscope) that exploit the aliasing effect. These systems process a signal having high-frequency components confined to a given frequency band $B_1 < f < B_2$, where $B_2 - B_1 = B$ is the signal bandwidth. In this case, the frequency components in the signal are much larger than the bandwidth B of the signal (i.e., $B << B_1 < B_2$). Such signals are usually referred to as passband or narrowband signals. If a passband signal is sampled at a rate $f_{SR} \geq 2B$, but $f_{SR} << B_1$, then all the frequency components contained in the signal will be aliases of frequencies in the range $0 < f < f_{SR}/2$. Consequently, if the frequency content of the signal is observed in the fundamental range $0 < f < f_{SR}/2$, the frequency content of the analog signal is known because the frequency band $B_1 < f < B_2$ is known. The passband form of the Sampling Theorem states that if a signal is a narrowband (passband) signal, the original signal can be reconstructed from the samples, provided that the signal is sampled at a rate $f_{SR} > 2B$, where B is the bandwidth.

Figure 30:
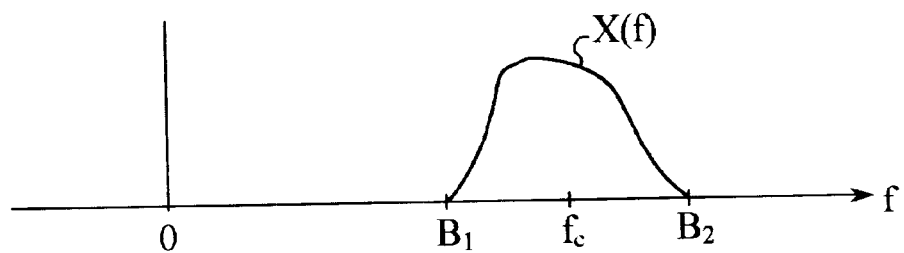
FIG. 30 shows a bandpass signal.

FIG. 30 shows a bandpass signal X(f) with frequency components in the range of $B_1 \leq f \leq B_2$. The upper frequency $f_c + B/2$ is a multiple of the bandwidth B (i.e., $f_c + B/2 = kB$ where k is a positive integer and $f_c$ is the center frequency of the bandpass signal). If the time-domain bandpass signal x(t) is sampled at a rate of $2B = 1/T$, samples of the bandpass signal are represented by:

$$x(nT) = u_c(nT)\cos 2\pi f_c nT - u_s(nT)\sin 2\pi f_c nT$$

$$= u_c(nT)\cos\frac{\pi n(2k-1)}{2} - u_s(nT)\sin\frac{\pi n(2k-1)}{2}$$

For even n (n=2m), the equation for x(nT) reduces to:

$$x(2mT) \equiv x(mT_1) = u_c(mT_1)\cos\pi m(2k-1) = (-1)^m u_c(mT_1)$$

where $T_1 = 2T = 1/B$. For odd n (n=2m-1), the equation for x(nT) is:

$$x(2mT - T) \equiv x\left(mT_1 - \frac{T_1}{2}\right) = u_s\left(mT_1 - \frac{T_1}{2}\right)(-1)^{m+k+1}$$

The even-numbered samples of x(t), which occur at the rate of B samples per second, produce samples of the low-pass signal component $u_c(t)$. The odd-numbered samples of x(t), which also occur at the rate of B samples per second, produce samples of the low-pass signal component $u_s(t)$.

The samples $u_c(mT_1)$ and $u_s(mT_1 - T_1/2)$ can be used to reconstruct the equivalent low-pass signals $u_c(t)$ and $u_s(t)$ according to the Sampling Theorem:

$$u_c(t) = \sum_{m=-\infty}^{\infty} u_c(mT_1)\frac{\sin(\pi/T_1)(t-mT_1)}{(\pi/T_1)(t-mT_1)}$$

$$u_s(t) = \sum_{m=-\infty}^{\infty} u_s\left(mT_1 - \frac{T_1}{2}\right)\frac{\sin(\pi/T_1)(t-mT_1+T_1/2)}{(\pi/T_1)(t-mT_1+T_1/2)}$$

These terms can be used to produce the reconstruction formula for the bandpass signal, x(t) where samples are taken at a rate of 2B:

$$x(t) = \sum_{m=-\infty}^{\infty} x(mT)\frac{\sin(\pi/2T)(t-mT)}{(\pi/2T)(t-mT)}\cos 2\pi f_c(t-mT)$$

where T=1/2B. This formula holds for the special case in which the upper band frequency $f_c+B/2$ is a multiple of the signal bandwidth B.

In the general case where $f_c \geq B/2$, but the upper band frequency $f_c+B/2$ is not necessarily a multiple of the signal bandwidth B, a reconstruction formula can be created for the bandpass signal x(t). In the case where $f_c+B/2$ is not a multiple of the signal bandwidth B, the bandwidth B is increased to B' while holding the upper cutoff frequency $f_c+B/2$ constant such that:

$$\frac{f_c + B/2}{B'} = r$$

where r is an integer. A new center frequency $f_c'$ is defined for the increased bandwidth:

$$f_c' = f_c + B/2 - B'/2$$

Because the upper cutoff frequency $f_c+B/2$ is a multiple of B', the signal reconstruction formula can be written as:

$$x(t) = \sum_{m=-\infty}^{\infty} x(mT')\frac{\sin(\pi/2T')(t-mT')}{(\pi/2T')(t-mT')}\cos 2\pi f_c'(t-mT')$$

where T'=1/2B'. Thus, x(t) can be represented by samples taken at the uniform rate 1/T'=2Br'/r, where r' is the ratio:

$$r' = \frac{f_c + B/2}{B} = \frac{f_c}{B} + \frac{1}{2}$$

When the upper cutoff frequency $f_c+B/2$ is not an integer multiple of the bandwidth B, the sampling rate for the bandpass signal must be increased by the factor r'/r. However, as $f_c/B$ increases, the ratio r'/r approaches unity. Consequently, the percent increase in sampling rate approaches zero.

The low-pass signal components $u_c(t)$ and $u_s(t)$ can be expressed in terms of samples of the bandpass signal:

$$u_c(t) = \sum_{n=-\infty}^{\infty} (-1)^n x(2nT')\frac{\sin(\pi/2T')(t-2nT')}{(\pi/2T')(t-2nT')}$$

and $$u_s(t) = \sum_{n=-\infty}^{\infty} (-1)^{n-r+1}(2nT' - T')\frac{\sin(\pi/2T')(t-2nT'+T')}{(\pi/2T')(t-2nT'+T')}$$

The bandpass signal x(t) can be represented uniquely by samples taken at a rate:

$$2B \leq f_s < 4B$$

where B is the bandwidth of signal x(t). The lower limit (which is the Nyquist rate) applies when the upper frequency $f_c+B/2$ is a multiple of B. The upper limit of $f_{SR}$ is obtained under worst case conditions when r=1 and r'≈2.

3.7. Spatial Interferometry Filtering

3.7.1. Overview of Spatial Interferometry Filtering

The consequences of sampling a signal at a rate below its highest frequency component results in aliasing. Aliasing causes a measured signal frequency to be mapped into a different frequency. When sampled, many signals may be found to have the same set of data points. These signals are aliases of each other. Sampling, as described herein, may include multiple and/or variable sampling rates, multiple and/or various sample-aperture widths, and one or more sample-aperture shapes.

Under sampling is a down-conversion technique that can serve the same purpose as mixing. A signal that is under sampled can have its frequency components aliased into the baseband (or the first Nyquist zone) as if they were originally in the baseband. Under sampling is preferably applied with respect to the carrier frequency upon which an information signal is modulated or otherwise impressed. In order to prevent aliasing in the samples of the information signal, the sampling frequency should be greater than twice the highest frequency component of the desired information.

The spectrum of a sampled signal results from the convolution of the input signal with the spectrum of the sampling waveform. The frequency spectrum of a rectangular time-domain pulse is given by:

$$F(\omega) = AT\frac{\sin(\omega T/2)}{(\omega T/2)}$$

A wide pulse width (sample aperture window) acts as a low-pass filtering function. The effects of a sampler's spectral phase and main-lobe (aperture) width should be considered when designing a sampling system so that no undesired aliasing occurs from the convolution of the sampling waveform with the input signal.

Figure 31A:
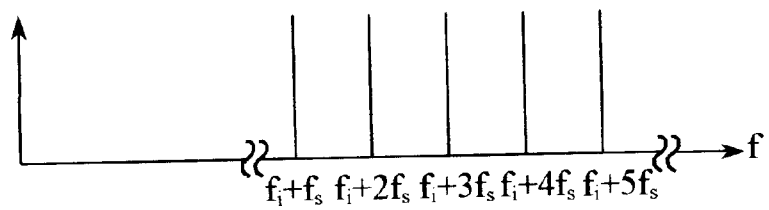
FIG. 31A illustrates aliasing in the frequency domain resulting from under sampling.

For a particular sampling rate $f_{SR}$ that down converts a desired signal having a carrier frequency $f_c$ to an intermediate frequency $f_i$, additional carrier signals having frequencies $f_c'$ can be down converted to the same intermediate frequency $f_i$ according to the following relation:

$$f_c' = nf_{SR} \pm f_i$$

where n is an integer or fractional value equal to an inverse integer. Aliasing in this case is shown in FIG. 31A. The intermediate frequency $f_i$ occurs when the sampling rate is offset from a harmonic or sub-harmonic of the carrier frequency $f_c'$.

Figure 31B:
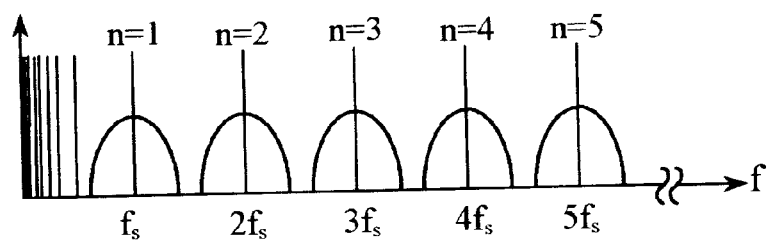
FIG. 31B illustrates aliasing in the frequency domain resulting from under sampling a passband signal.

The case where $f_i=0$ (baseband) is shown in FIG. 31B. Carrier frequencies that are mapped into the baseband occur at interval frequencies equal to the sampling frequency $f_{SR}$. As the sampling rate $f_{SR}$ gets smaller, more carrier signals within a given frequency band are mapped into the baseband. Preconditioning (filtering) the input signal so that only one carrier frequency $f_c'$ is mapped into the baseband is more difficult for low sampling rates $f_{SR}$. Thus, the complexity/performance of an anti-aliasing filter needs to be considered with respect to the benefits of implementing a low sampling rate $f_{SR}$.

An input signal may be preconditioned to band-limit or otherwise filter the signal prior to sampling. An anti-aliasing filter is an analog, digital, or impedance-matching filter that ensures that the bandwidth of the signal to be sampled is limited to a desired frequency range. The anti-aliasing filter also limits the additive-noise spectrum and other interference. Additive noise is usually wideband and exceeds the bandwidth of the desired signal. Prefiltering the received signals reduces the additive noise power to the noise spectrum that coincides with the bandwidth of the desired signal.

An ideal filter has a steep cutoff frequency response with little delay distortion within the passband. However, stringent filter specifications, such as a narrow transition region, typically require complex filter designs. Some embodiments of the invention may sample the received information signals well above the Nyquist rate of the information signal, thus enabling less stringent design specifications for the anti-aliasing filter.

Performance requirements of the anti-aliasing filter are relaxed when interference cancellation is implemented to separate one or more signals that are aliased into the same frequency band. Consequently, the sampling rate $f_{SR}$ can be greatly reduced without causing distortion that results from aliasing.

Figure 32A:
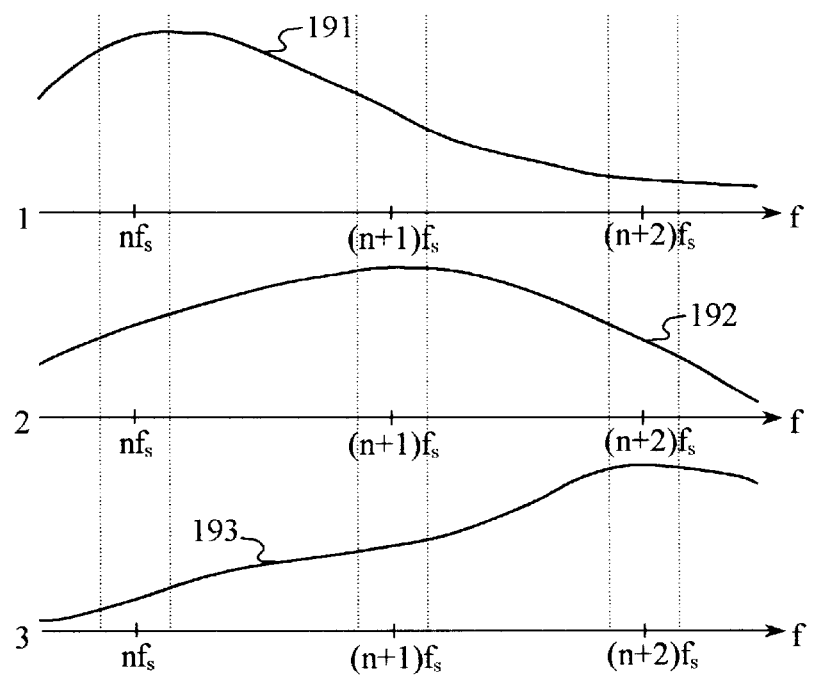
FIG. 32A is a plot of three different complex gain distribution magnitudes corresponding to each of three different versions of a received multi-frequency signal plotted over a frequency band that includes three carrier frequencies.

In order to separate signals aliased into a down-converted signal, the relative proportions of the signals with respect to each other may be used in a weight-and-sum operation to cancel undesired signals. FIG. 32A shows the magnitude of three different complex gain distributions 191, 192, and 193 corresponding to each of three different versions of a received signal plotted over a frequency band that includes N=3 carrier frequencies. An input signal may be separated into multiple signals having different gain distributions before being mapped into a common intermediate-frequency band (or baseband). If each of the carrier signals is modulated with a baseband information signal (or otherwise interfering baseband signal), $s_n(f_n, t)$, where n=1,2,3, then each of the M=3 filtered outputs $R_m(t)$ of the diversity receiver includes an algebraically unique combination of the information signals $s_n(f_n, t)$:

$$R_m(t) = \sum_{m=1}^{M} \beta_{mn} s_n(f_n, t),$$

where $\beta_{mn}$ are complex scaling factors related to the gain distributions of the filters. The outputs $R_m$ represent M equations of N unknowns. Values of one or more of the unknown signals can be determined explicitly if M≧N. If M<N, additional information about one or more of the signals $s_n(f_n, t)$ is required to determine the unknown values. For example, the signals $s_n(f_n, t)$ may be mapped into a predetermined constellation of values. The values of $\beta_{mn}$ form a transfer matrix that can be diagonalized by any type of diagonalizing procedure. Diagonalization of the matrix enables the determination of the signal values $s_n(f_n, t)$.

Figure 32B:
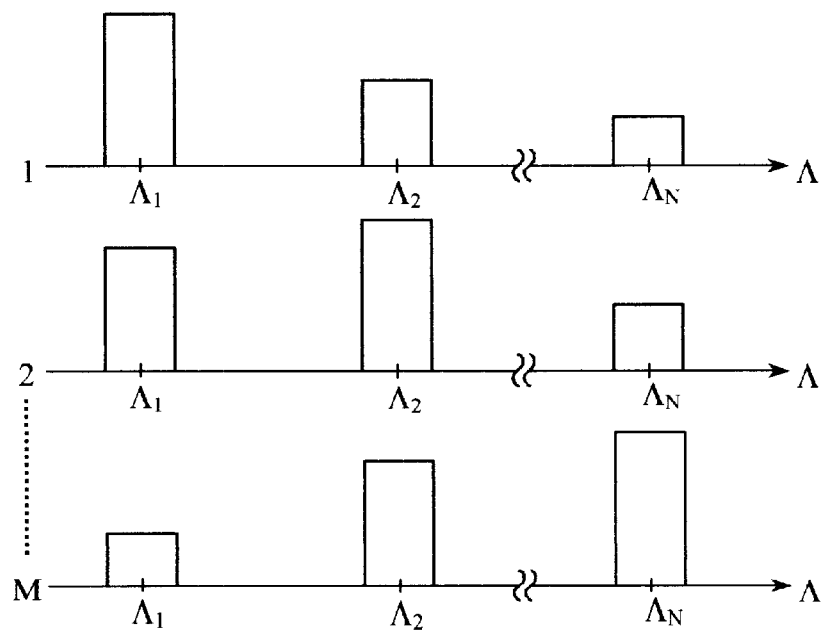
FIG. 32B shows a magnitude distribution of a plurality of composite signals relative to a plurality of values of at least one diversity parameter.

FIG. 32B shows a magnitude distribution of a plurality M of composite signals $R_m(t)$ relative to a plurality N of values of at least one diversity parameter $\Lambda_n$. At least one desired and/or interfering signal $s_n(t)$ is transmitted with respect to each of a plurality of the diversity-parameter values $\Lambda_n$. A transmitted signal $s_n(t)$ may be mapped into a single diversity-parameter $\Lambda_n$ value. Reception of the transmitted signals $s_n(t)$ results in inseparability of the values of the diversity parameter(s) $\Lambda_n$ (e.g., the diversity parameters values $\Lambda_n$ are mapped into a common diversity parameter value $\Lambda_c$), resulting in a composite signal $R_m(t)$ comprised of interfering transmitted signals $s_n(t)$.

In order to separate the interfering transmitted signals $s_n(t)$, or at least separate a desired signal $s_n(t)$ from one or more interfering signals $s_n(t)$, a plurality of composite signals $R_m(t)$ are generated having algebraically unique proportions $\beta_{mn}$ of the transmitted signals $s_n(t)$. The proportions $\beta_{mn}$ of the composite signals $R_m(t)$ are determined and the composite signals are processed (such as in any type of diagonalizing process) to extract one or more desired signals $s_n(t)$ from at least one interfering signal $s_n(t)$.

3.7.2. Spatial Interferometry Filtering Methods

Figure 33A:
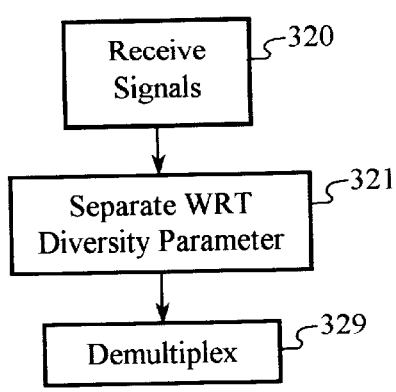
FIG. 33A shows a method of spatial interferometry multiplexing.

FIG. 33A shows a method of spatial interferometry multiplexing. Transmitted signals $s_n(t)$ are received in a reception step 320. For example, transmitted signals $s_n(t)$ may be coupled out of a communication channel (not shown). The received signal R(t) includes at least one desired signal $s_i(t)$ and at least one interfering signal $s_n(t)$. A separation step 321 separates the received signal R(t) into a plurality M of composite signals $R_m(t)$. Separation may be accomplished with respect to at least one diversity parameter $\Lambda_n$. For example, a filter bank (not shown) may separate the received signal R(t) into a plurality different-frequency composite signals $R_m(t)$. The composite signals $R_m(t)$ preferably have algebraically unique proportions $\beta_{mn}$ of the desired and interfering signal(s) $s_n(t)$. The separation step 321 may include mapping the composite signals $R_m(t)$ into one or more common diversity parameters $\Lambda_c$. The transmitted signals $s_n(t)$ are separated in a demultiplexing step 329.

Figure 33B:
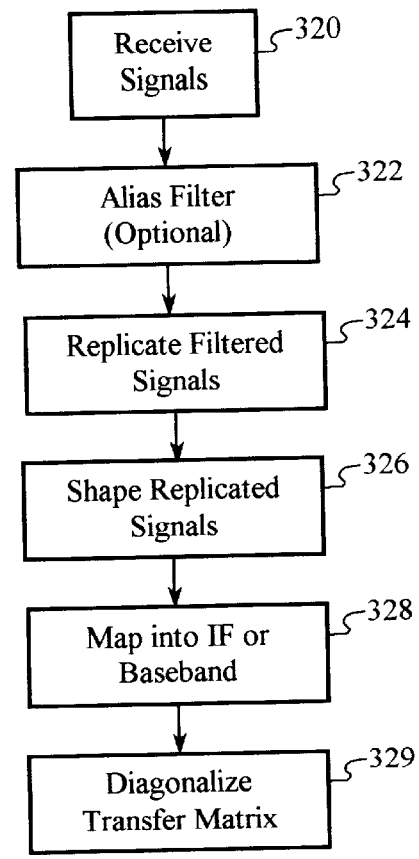
FIG. 33B illustrates steps of separating one or more of a plurality of signals mapped into an intermediate or baseband frequency.

FIG. 33B illustrates steps of separating one or more of a plurality of signals $s_n(t)$ mapped into an intermediate or baseband frequency $f_{ibb}$. Transmitted signals $s_n(t)$ are coupled out of a communication channel (not shown) in a reception step 320. The received signals R(t) are filtered by an anti-aliasing filter (not shown) in an optional filter step 322. The filtered signals R(t) include at least two signal frequencies $f_n$ that are mapped onto the same intermediate or baseband frequency $f_{ibb}$ when they are sampled at a predetermined sampling rate $f_{SR}$. The filtered signals R(t) are split or otherwise replicated in a replication step 324 into a plurality of replicated signals $R_m(t)$. The replicated signals $R_m(t)$ are shaped with respect to at least one diversity parameter $\Lambda_n$ in a shaping step 326. The shaped, replicated signals $R_{m''}(t)$ are mapped into an intermediate or baseband frequency $f_{ibb}$ in a mapping step 328 to produce a plurality of composite signals $R_m(t)$. The mapping step 328 may include sampling at the predetermined sampling rate $f_{SR}$. The mapping step 328 may include additional filtering steps (not shown). At least one desired signal component $s_n(t)$ of the mapped signals $R_m(t)$ is separated from at least one interfering signal component $s_n(t)$ in a diagonalizing step 329.

In conventional down-conversion systems, a tradeoff is made between minimum complexity of the anti-aliasing filter and a low sampling rate $f_{SR}$. Low sampling rates $f_{SR}$ require narrower, thus more complex, bandpass filters to remove unwanted signals that would otherwise be mapped onto the desired down-converted signal. The present invention allows lower sampling rates $f_{SR}$ and simpler anti-aliasing filters than conventional down-conversion systems. The benefits of the present invention are realized because an algebraic relationship is established between desired and interfering signals that allows interfering signals to be removed or cancelled from desired signals. It will be appreciated that shaping and/or replicating steps may be performed by the communication channel, and thus, may be performed before the reception step. Consequently, various steps of the methods described in FIG. 33B (as well as in other figures shown) may be performed in an alternate order without departing from the scope of the invention.

Figure 33C:
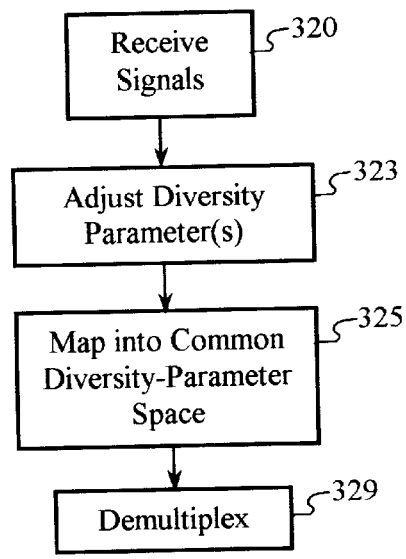
FIG. 33C shows steps for implementing an interferometry method of the invention.

FIG. 33C shows steps for implementing an interferometry method of the invention. Transmitted signals $s_{nT}(t)$ are coupled out of a communication channel (not shown) in a reception step 320. The transmitted signals $S_{nT}(t)$ include information signals $s_n(t)$ modulated onto one or more carrier signals. The carrier signals have different values of at least one diversity parameter $\Lambda_n$. Received signals R(t) may include one or more interfering signals $s_n(t)$.

A diversity-processing step 323 provides algebraic uniqueness to the received signals R(t) relative to at least one diversity parameter $\Lambda_n$. The diversity-processing step 323 may be performed following the reception step 320. The diversity-processing step 323 may be performed by at least one transmitter (not shown) prior to transmitting signals that are received in the reception step 320. The diversity-processing step 323 may be performed as a natural result of the transmitted signals $s_{nT}(t)$ propagating through the communication channel (not shown). The diversity-processing step 323 may be performed in an integrated manner with the reception step 320 (i.e., the way that the reception step 320 is performed results in diversity processing of the received signals R(t)). For example, a plurality of receive signals $R_m(t)$ having algebraically unique ratios of interfering signals $s_n(t)$ may be created by the receiving the transmitted signals $s_n(t)$ with spatially separated receivers (not shown). Diversity processing may be performed in more than one step.

A mapping step 325 maps the received signals $R_m(t)$ having a plurality of values of at least one diversity parameter $\Lambda_n$ into at least one common diversity-parameter space. For example, received signals $R_m(t)$ having different frequencies $f_n$ can be mapped into a single frequency space. Similarly, received signals $R_m(t)$ having different polarizations $P_n$ can be mapped into a single polarization space. Received signals $R_m(t)$ having different polarizations $P_n$ and frequencies $f_n$ may be mapped into a single space defined by polarization and/or frequency.

A demultiplexing step 329 separates the desired signal(s) $s_n(t)$ from the interfering signal(s) $s_n(t)$. The demultiplexing step 329 may include any type of cancellation step (not shown), such as, but not limited to, weight-and-sum and matrix-diagonalization methods (not shown).

Figure 33D:
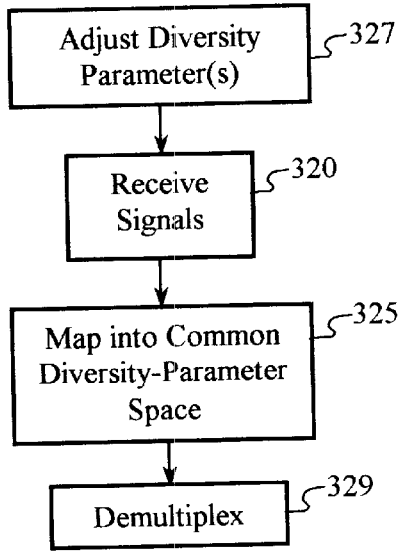
FIG. 33D shows steps for implementing an interferometry method of the invention in which a diversity-processing step is performed prior to a reception step.

FIG. 33D shows steps for implementing an interferometry method of the invention in which a diversity-processing step 327 is performed prior to a reception step 320. The diversity processing step 327 may be performed by one or more transmission systems (not shown) and/or a communication channel (not shown).

3.7.3. Spatial Interferometry Filtering Systems

Figure 34A:
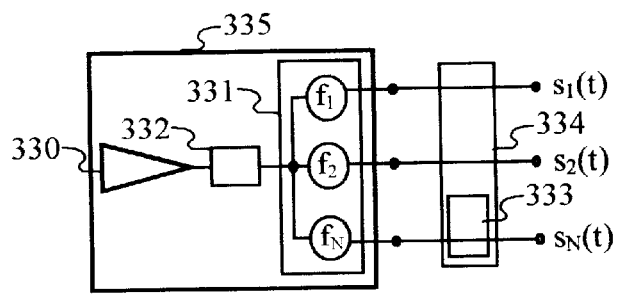
FIG. 34A shows a frequency diversity interferometry system that filters an input signal with a filter bank.

FIG. 34A shows a frequency-diversity interferometry system that filters an input spectrum with a filter bank 331. An input coupler 330 coupled to a communication channel (not shown), an optional anti-aliasing filter 332, and the filter bank 331 comprise a diversity receiver 335. In this case, the diversity receiver 335 is characterized by the diversity parameter, frequency.

The input coupler 330 may use the (optional) anti-aliasing filter 332 to restrict the received signals to a predetermined frequency band. The average impedance of a digital filter, such as the anti-aliasing filter 332, and the filter's frequency selectivity (due to both impedance matching and frequency-domain consequences of windowing in the time domain) are functions of the sample aperture width and the sample frequency. A filter (such as filter 332) may include an impedance-matching circuit (not shown) to enhance frequency-dependent energy-transfer characteristics of the input signals. Thus, impedance matching and mismatching may be used to shape the gain distribution of received signals. The impedance of the filter 332 can be adjusted by adjusting the sample aperture and/or the sample rate. A circuit (no shown) that is capable of adjusting the sample aperture and/or the sampling rate allows a filter (such as filter 332) to be dynamically configurable to different frequency bands. A filter (such as filter 332) may include a bypass network (not shown) to increase the efficiency of energy transfer at one or more predetermined frequencies or frequency ranges. Tank circuits (not shown) and resonant circuits (not shown) may be used to further optimize energy-transfer characteristics of a filter, such as filter 332.

The purpose of the filter bank 331 is to shape the gain distribution of the received signals. The filter bank 331 may be implemented as a plurality of impedance-matching circuits (not shown) wherein each of the matching circuits (not shown) is optimally matched to a different frequency. A filter (such as the filter bank 331) may include an impedance-matching circuit (not shown) to provide frequency-dependent energy-transfer characteristics to the received signals. Thus, impedance matching and mismatching may be used to shape the gain distribution of the received signals. Tank and resonant circuits (not shown) may be used to further optimize energy-transfer characteristics of a filter. Outputs of the diversity receiver 335 are processed by a spatial demultiplexer 334 that separates interfering components of the received signals in frequency space. The spatial demultiplexer 334 may include an optional ADC 333 that maps the received signals to baseband.

Figure 34B:
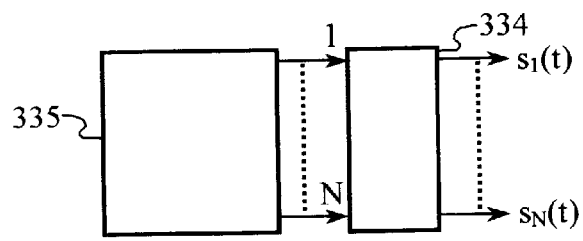
FIG. 34B shows a spatial-demultiplexing receiver that separates at least one desired signal from one or more interfering signals.

FIG. 34B shows a spatial-demultiplexing receiver that separates at least one desired signal from one or more interfering signals. A diversity receiver 335 generates a plurality M of received signals distinguished by differences in values of one or more diversity parameters. However, the value(s) of the at least one desired signal is distributed throughout a plurality of diversity parameter values. The output of the diversity receiver 335 may be mapped into at least one single-valued diversity parameter. A spatial demultiplexer separates the at least one desired signal from one or more of the interfering signals either explicitly (e.g., by using a diagonalizing procedure) or by a constellation method.

Figure 34C:
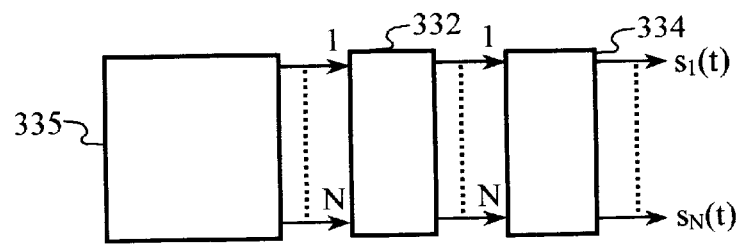
FIG. 34C shows a spatial-demultiplexing receiver that separates at least one desired signal from one or more interfering signals.

FIG. 34C shows a spatial-demultiplexing receiver that separates at least one desired signal from one or more interfering signals. A diversity receiver 335 coupled to a communication channel (not shown) receives transmitted signals $s_n(t)$. The diversity receiver 335 may perform diversity processing or it may augment diversity processing performed on the transmitted signals $s_n(t)$ by either or both a transmission system (not shown) that transmits the signals and the communication channel (not shown). Component signals $R_m(t)$ output by the diversity receiver 335 have algebraically unique values of at least one diversity parameter. A mapping system 332 receives the diversity-processed signals and maps all the transmitted signal component $s_n(t)$ (defined by the value of at least one diversity parameter $\Lambda_n$) of each component signal $R_m(t)$ into a common diversity-parameter space. A plurality of mapped signals $R_m(t)$ are output to a spatial interferometry demultiplexer that separates at least one desired signal $s_n(t)$ from at least one interfering signal $s_n(t)$. The demultiplexer may use additional information about one or more of the interfering signals $s_n(t)$ (particularly, if the number of interfering signals $s_n(t)$ exceeds the number of inputs to the demultiplexer) to separate one or more desired signals $s_n(t)$ from interfering signals $s_n(t)$ or otherwise determine the value of at least one desired signal $s_n(t)$.

Figure 34D:
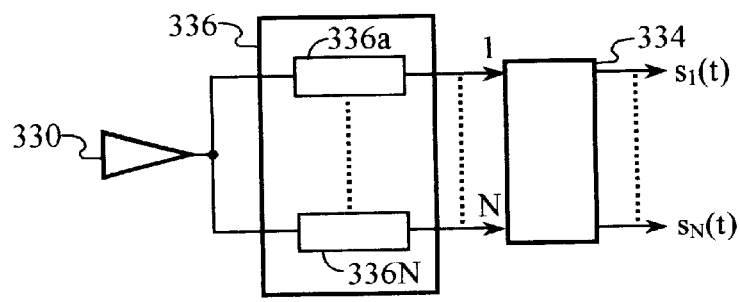
FIG. 34D shows a spatial interferometry sampling system.
Figure 34E:
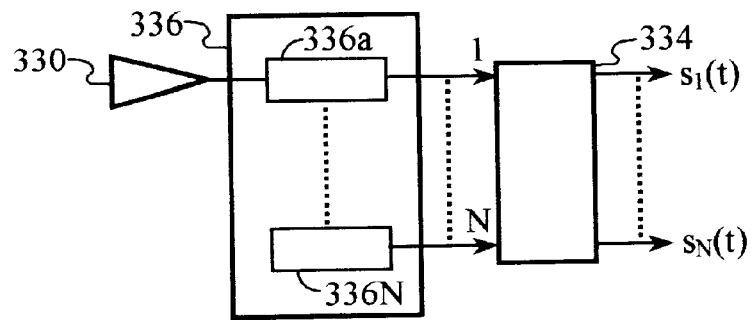
FIG. 34E shows a spatial interferometry sampling system.

FIG. 34D shows a spatial interferometry sampling system that includes an input coupler (such as an antenna 330), a sampling system 336 that includes a plurality N of samplers 336a to 336N, and a spatial demultiplexer 334. Transmitted signal $s_n(t)$ are input to the samplers 336a to 336N, which generate a plurality N of sampled signals $R_n(t)$ characterized by different values of at least one diversity parameter $\Lambda_n$. Samplers (such as the samplers 336a to 336N) may include additional systems, such as, but not limited to, filters, timers, controllers, rectifiers, amplifiers, and delay systems. Operating parameters (e.g., sample frequency, sample aperture, aperture shape, relative phase) may be controlled by a controller (not shown) and/or may include preset values in each of the samplers (336a to 336N). The sampled signals $R_n(t)$ are processed by a spatial demultiplexer 334 that separates at least one desired signal $s_n(t)$ from at least one interfering signal $s_n(t)$. FIG. 34E shows an alternative embodiment of a spatial interferometry sampling system.

Figure 34F:
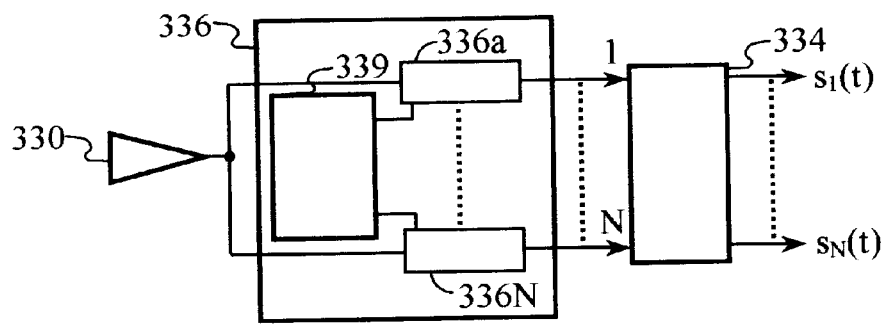
FIG. 34F shows a spatial interferometry sampling system.

FIG. 34F shows an embodiment of a spatial interferometry sampling system that has similar components to those shown in FIG. 34D. Consequently, some of the components in both FIG. 34F and FIG. 34D share the same reference numbers. The system in FIG. 34F includes a controller 339 coupled to samplers 336a to 336N. The controller 339 controls one or more of the sampling system's 336 operating parameters (e.g., sample frequency, sample aperture, aperture shape, relative phase, etc.). The controller 339 may be coupled to the demultiplexer 334 to control one or more of the sampling system's 336 operating parameters with respect to some measure of signal quality, such as separation of the desired signal(s) from the interfering signal(s).

Figure 34G:
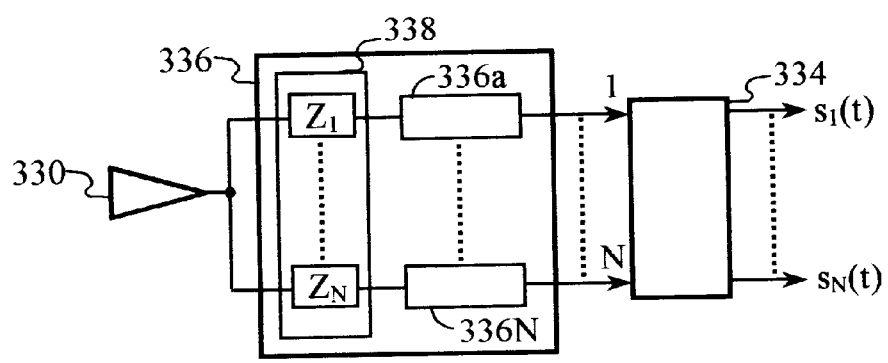
FIG. 34G shows a spatial interferometry sampling system.

FIG. 34G shows an embodiment of a spatial interferometry sampling system that has similar components to those shown in FIG. 34D, as indicated by identical reference numbers. The sampling system 336 includes an impedance-matching system 338 that provides differing energy-transfer characteristics to signals received by the sampling system 336. The impedance-matching system may be controlled by a controller (not shown).

3.8. Time-offset Sampling 3.8.1. Overview of Time-offset Sampling

Conventional under-sampling methods and systems transfer small amounts of energy (relative to normal sampling) from an input signal to a sampled signal. Consequently, conventional under-sampling methods may not provide sufficient energy to a sampled signal to distinguish desired signals from noise or to drive a low-impedance load. Several embodiments of the invention solve this problem. Down-converted signals are provided with sufficient energy to drive low-impedance circuits without buffering. Although methods and systems of the invention are described herein with respect to under sampling, the novel features of the designs and methods of the invention may be applied to any type of sampling.

Figure 35A:
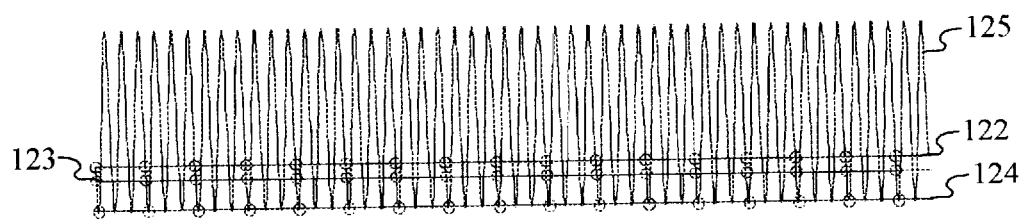
FIG. 35A illustrates a modulated carrier signal that is sampled at a plurality of time-offset instances at a single sampling frequency.

FIG. 35A illustrates a modulated carrier signal 125 that is sampled at a plurality of time-offset instances at a single sampling frequency. The modulated carrier signal 125 is sampled at a rate that is lower than the Nyquist rate for the carrier signal 125, but higher than the Nyquist rate for a modulating information signal. Sampling, as described herein, may include multiple and/or variable sampling rates, multiple and/or various sample-aperture widths, and one or more sample-aperture shapes. Sampling is performed at a rate that is equal to a harmonic or sub-harmonic of the carrier frequency such that the modulated carrier signal is converted to a baseband information signal. In this case, the sampling frequency of each instance is a sub-harmonic of the carrier frequency. Three time-offset sample instances are shown resulting in three down-converted signals 122, 123, and 124 representing instances of the baseband information signal.

When the sampling rate is substantially equal to the frequency of the carrier signal 125, or substantially equal to a harmonic or sub-harmonic thereof, the carrier signal 125 is down converted to a demodulated baseband signal. This is because, without modulation, the samples occur at the same point of subsequent cycles of the carrier signal 125. As a result, the samples form a constant output baseband signal. If the carrier signal 125 is modulated (such as amplitude modulated, frequency modulated, phase modulated, etc., or any combination thereof) with a lower frequency information signal, the charge (or energy) stored during each sample reflects the lower frequency changes, resulting in similar changes on the demodulated baseband signal.

Depending on the relative phase between the sampling frequency and the carrier frequency, samples of each instance may occur at various points throughout the carrier waveform 125. Samples at or near a zero-crossing provide very little signal energy or information. Thus, sampling with a single sampler at a sub-harmonic of the carrier frequency makes the sampled signal susceptible to small variations in phase offsets and frequency offsets. These small variations can cause substantial distortions, such as parity flips and deep fades.

A carrier signal that is amplitude modulated (such as an analog amplitude-modulated carrier, an amplitude-shift keyed carrier, or a differential amplitude-shift keyed carrier) has its samples occurring at different points of subsequent cycles of the carrier signal relative to the amplitude-modulated signal. A carrier signal that is phase modulated (such as an analog phase-modulated carrier, phase-shift keyed carrier, or differential phase-shift keyed carrier) has its samples occurring at different points of subsequent cycles of the carrier signal relative to the phase-modulated signal. A binary phase-shift keyed carrier will cause the sampled signal to change polarity with respect to 180-degree phase changes in the modulation signal. Smaller phase changes result in the down-converted signal being an amplitude-modulated representation of the phase-modulated carrier.

FIG. 35A shows some of the benefits of sampling the carrier signal 125 with a plurality of time-offset samplers (not shown). In this case, the samplers (not shown) operate at similar sampling frequencies and down convert the carrier signal 125 to a baseband signal. The problem of deep signal fades resulting from picking up a zero-crossing signal is mitigated. More energy from the received signal is collected, reducing amplification requirements and the effects of noise and interference. Using multiple time-offset samplers (not shown) enables a high effective sampling rate to be achieved using a slow clock speed.

In each of the sampling methods and systems of the invention, the value of the sample may be held until the next sample is collected. This results in a stair-step output that may undergo smoothing and/or filtering. The samples may be analyzed and used to control a feedback network (not shown) that controls the sampling rate(s) and/or relative phase(s) of the sampling rate(s). Control of the sampling rate(s) and/or relative phase(s) may be performed to optimize an amplitude and/or phase of the down-converted signal. Wide sample widths may be employed.

In one embodiment, a plurality of time-offset samples generated at identical sampling frequencies provides a plurality of down-converted signals. The down-converted signals are combined to provide a combined down-converted signal having the benefits of combined parallel down-conversion processes. In another embodiment, a plurality of time-offset samples generated at identical sampling frequencies are combined to provide a high effective sampling rate. Wide sample widths may be employed. Parallel samplers generate signals that are combined serially. Thus, the clock rate of each sampling process can be relatively low.

Figure 35B:
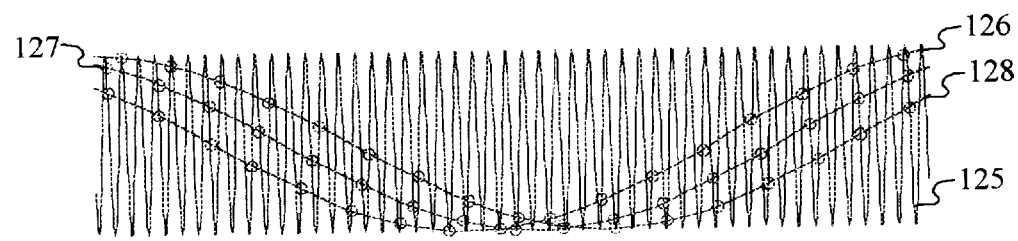
FIG. 35B shows a modulated carrier signal that is sampled at a plurality of time-offset instances at a single sampling frequency.

FIG. 35B shows a modulated carrier signal 125 that is sampled at a plurality of time-offset instances at a single sampling frequency. Each of three time-offset sampling instances shown results in a modulated intermediate-frequency signal 126, 127, and 128. The sampling frequency of each instance is a sub-harmonic of the sum or difference of the carrier frequency and the frequency of the down-converted signal. Each sampling instance generates samples that occur at different positions along the carrier waveform 125, resulting in the periodic signals 126, 127, and 128 at an intermediate frequency. Since the sample points occur at different locations on subsequent cycles of the carrier signal 125, the sample points capture varying amplitudes of the carrier signal 125. Thus, the intermediate frequency is a beat frequency between the carrier frequency and the sampling frequency. The relative phase of each intermediate signal 126, 127, and 128 depends on the time-offset of the corresponding sample instances.

If the carrier signal 125 is modulated (such as amplitude modulated, frequency modulated, phase modulated, etc., or any combination thereof) with a lower-frequency information signal, charge (or energy) stored during each sample reflects the lower frequency changes, resulting in similar changes in the down-converted IF signal.

When each sample is collected, the value of the sample may be held until the next sample is collected. This results in a stair-step output (not shown) that may undergo smoothing and/or filtering. The samples may be analyzed and used to control a feedback network (not shown) that controls the sampling rate(s) and/or relative phase(s) of the sampling rate(s). Control of the sampling rate(s) and/or relative phase(s) may be performed to optimize amplitude and/or phase of the down-converted signal.

There are several advantages to using multiple sampling instances at a sampling rate that down converts a modulated carrier signal to an intermediate-frequency signal. Multiple sampling instances increase the amount of energy recovered from the received signal, thus reducing amplification requirements and the effects of noise and interference. Multiple time-offset sampling instances also enable a high effective sampling rate to be achieved using a slow clock speed.

In one embodiment, a plurality of time-offset samples generated at identical sampling frequencies provides a plurality of down-converted signals. The down-converted signals are combined to provide a combined down-converted signal having the benefits of combined parallel down-conversion processes. In another embodiment, a plurality of time-offset samples generated at identical sampling frequencies are combined to provide a high effective sampling rate. Parallel samplers generate signals that are combined serially. Thus, the clock rate of each sampling process can be relatively low.

Figure 35C:
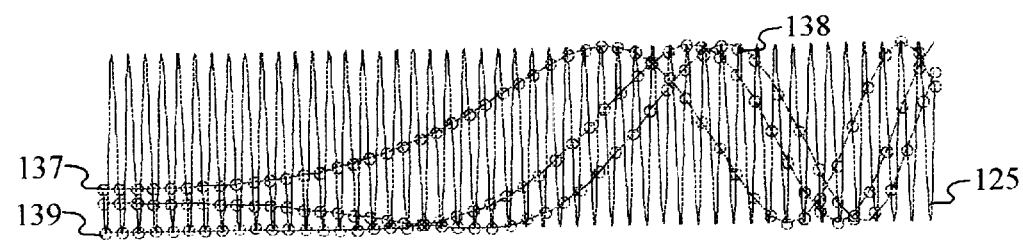
FIG. 35C is a plot of a plurality of down-converted frequency-modulated signals resulting from under sampling a frequency-modulated carrier signal at multiple time offsets.

FIG. 35C illustrates how under sampling a frequency-modulated carrier signal 125 at multiple time offsets results in a plurality of down-converted frequency-modulated signals 137, 138, and 139. Frequency-modulated carrier signals 125 may also be down converted to phase-modulated signals and amplitude-modulated signals. When the sampling rate is based on the midpoint of the frequency-modulated carrier signal 125, the carrier signal 125 is down converted to a phase-modulated signal. When the sampling rate is based on the upper frequency or lower frequency of the frequency-modulated carrier signal 125, the carrier signal 125 is down converted to an amplitude-modulated signal.

In one embodiment, a plurality of time-offset samples generated at identical sampling frequencies provides a plurality of down-converted signals. The down-converted signals are combined to provide a combined down-converted signal having the benefits of combined parallel down-conversion processes. In another embodiment, a plurality of time-offset samples generated at identical sampling frequencies are combined to provide a high effective sampling rate. Parallel samplers generate signals that are combined serially. Thus, the clock rate of each sampling process can be relatively low.

Figure 35D:
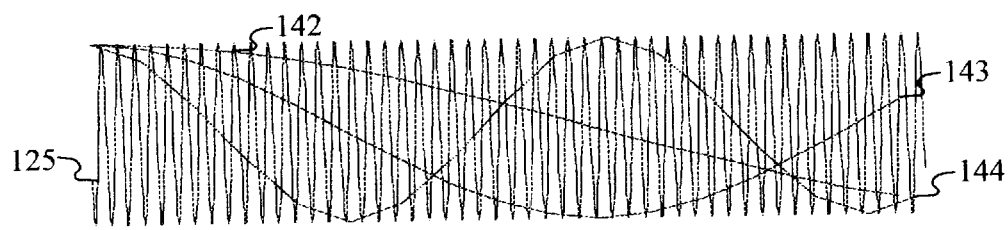
FIG. 35D shows a plurality of down-converted signals resulting from under sampling a modulated carrier signal at a plurality of sampling frequencies.

FIG. 35D shows a modulated carrier signal 125 having a frequency $f_c$ that is sampled at a plurality of sampling frequencies $f_{SR}$. The samples provide a plurality of down-converted versions 142, 143, and 144 of the modulated carrier signal 125 having different intermediate frequencies. The sampling frequencies $f_{SR}$ may be incrementally spaced or non-incrementally spaced. In either case, the differences in sampling frequency cause time offsets in the collected samples. In the case where the sampling frequencies $f_{SR}$ are incrementally spaced by a shift frequency $f_s(f_{SR}=f_o+n \cdot f_s)$, the intermediate frequencies of the down-converted signal are incrementally spaced by an equivalent amount $f_s$. Changes to the carrier frequency $f_c$ (such as variations due to source-frequency instability and Doppler shifts) result in changes to the intermediate frequencies. However, the frequency separation $f_s$ between the intermediate frequencies is not affected. Thus, an envelope signal resulting from a superposition of the intermediate-frequency signals 142, 143, and 144 is unaffected by variations of the carrier frequency $f_c$. It is preferable that the frequency separations of the sampling frequencies $f_c$. be equal to $1/T_s$ (or some integer multiple of $1/T_s$) where $T_s$ is the period of the baseband information signal.

In one embodiment, a plurality of sample sets generated at different sampling frequencies provides a plurality of down-converted signals. The down-converted signals are combined to provide a combined down-converted signal that is indicative of a modulation signal. In another embodiment, a plurality of sample sets having different sampling frequencies are combined to provide a high effective sampling rate. Parallel samplers generate signals that are combined serially. Thus, the clock rate of each sampling process can be relatively low. Non-uniform differences in delays between samples can reduce the aliasing effect of under sampling.

3.8.2. Time-offset Sampling Methods

Figure 36A:
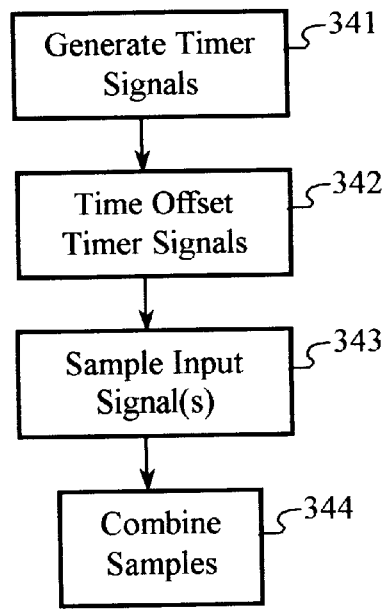
FIG. 36A shows a method of parallel processing that uses a relatively low clock rate to achieve a high sampling rate.

FIG. 36A shows a method of parallel processing that uses a relatively low clock rate to achieve a high sampling rate. In a timer signal generation step 341, a plurality of timer signals are produced. The timer signals may be any type of periodic signal having a low frequency relative to the carrier frequency. The timer signals control the frequency of each sampler (not shown). A time-offset step 342 provides an incremental time offset between each sampler's (not shown) sampling rate and the input signal. Time offsets may be applied to either or both the input signal and the sampling interval to cause time offsets between sample instances of the input signal. In this case, the time offsets are applied to the timer signals that control the sampling rates of each sampler (not shown). The time offsets allow each sampler (not shown) to collect a sample at a different time (in a sampling step 343) even though a plurality of samples may have the same sampling frequency. Small differences in time offsets allow a high effective sampling rate even though the sampling rate of each sampler is relatively low. The samples are combined in a combining step 344, which may include delaying one or more of the samples or applying complex weights to one or more of the samples. Additional signal-processing steps (not shown) may be performed after the combining step 344, including, but not limited to, interpolation, data sorting, digital-to-analog conversion, multi-user detection, interference cancellation, and filtering.

Figure 36B:
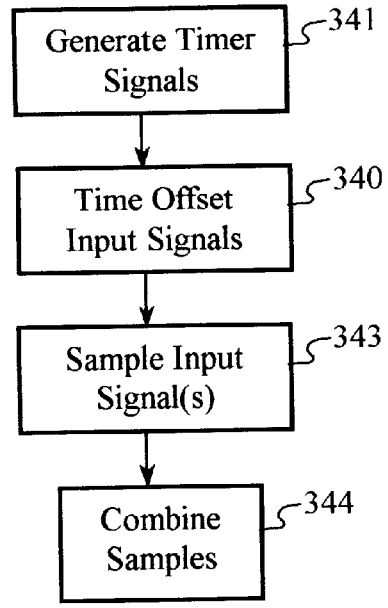
FIG. 36B shows a method of parallel processing that uses a relatively low clock rate to achieve a high sampling rate.

FIG. 36B shows a parallel-processing method that uses a relatively low clock rate to achieve a high sampling rate. In a timer signal generation step 341, a plurality of timer signals are produced. The timer signals may be any type of periodic signal having a low frequency relative to the carrier frequency. The timer signals control the frequency of each sampler (not shown). A time-offset step 342 provides an incremental time offset between each sampler's (not shown) sampling frequency and the input signal. Time offsets may be applied to either or both the input signal and the sampling interval to cause time offsets between sample instances of the input signal. In this case, the time offsets are applied to the input signals and samples from each sampler (not shown) are collected substantially simultaneously. The time offsets of the input signal allow each sampler (not shown) to collect a sample at a different effective time (in a sampling step 343) even though a plurality of samples may be collected at the same time. Small differences in time offsets allow a high effective sampling rate even though the sampling rate of each sampler (not shown) is relatively low. The samples are combined in a combining step 344, which may include delaying one or more of the samples or applying complex weights to one or more of the samples. Additional signal-processing steps (not shown) may be performed after the combining step 344, including, but not limited to, interpolation, data sorting, digital-to-analog conversion, multi-user detection, interference cancellation, and filtering.

Figure 36C:
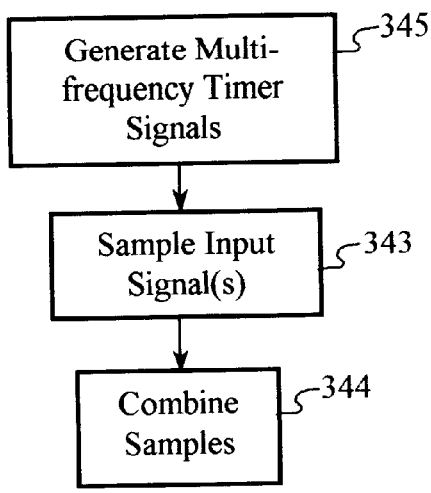
FIG. 36C shows a method of parallel processing that uses a relatively low clock rate to achieve a high sampling rate.

FIG. 36C shows a parallel-processing method that uses a relatively low clock rate to achieve a high sampling rate. In a timer signal generation step 341, a plurality of timer signals having different frequencies are produced. The timer signals may be any type of periodic signal having a low frequency relative to the carrier frequency. The timer signals control the frequency of each sampler (not shown). The different frequencies of the timer signals allow a plurality of samplers (not shown) to collect samples at different times. The different frequencies provide some short time differences in the sampling rate between different samplers (not shown), thus enabling a high effective sampling rate. The samples are combined in a combining step 344, which may include delaying one or more of the samples or applying complex weights to one or more of the samples. Additional signal-processing steps (not shown) may be performed after the combining step, including, but not limited to, interpolation, data sorting, digital-to-analog conversion, multi-user detection, interference cancellation, and filtering.

Any of the timer signal generation steps 341 may be preceded by one or more steps that provide a determination of the frequency (or frequencies) of the timer signals. Similarly, the time offset(s) of the timer signal may be determined prior to generating the timer signal. Time offsets include time offsets relative to multiple timer signals and/or timing relative to a time reference of one or more input signals. Determination of the frequency of the timer signal(s) may include one or more of the following steps:

1. Determine or select a frequency (or frequencies) of the input carrier signal(s).
2. Determine a desired sampling rate after determining the frequency (or frequencies) of the input carrier signal(s).
3. Determine an intermediate frequency (or frequencies) to which the input carrier signal(s) will be down converted.

FIG. 36D shows a table that illustrates relative times in which samples of an input signal are collected by a number N of samplers (not shown). The table includes a time column 351 showing relative times and a sample column 352 that describes which samples are collected by which samplers (not shown). A first time block 353a indicates a period of time $T_1+t_1$ to $T_1+t_N$ in which one sample is collected by each sampler (not shown). The times $t_1$ to $t_N$ may be uniformly spaced. A second time block 353b indicates a period of time $T_2+t_1$ to $T_2+t_N$ in which one additional sample is collected by each sampler (not shown). An $M^{th}$ time block 353M indicates a period of time $T_M+t_1$ to $T_M+t_N$ in which an $M^{th}$ sample is collected by each sampler (not shown).

There are several ways to combine the samples. A first combining method combines samples from each sampler separately, resulting in N down-converted signals. The N down-converted signals are combined to provide a combined down-converted signal having a relatively low frequency. A second combining method combines samples from each sampler together, resulting in a sampled signal having a relatively high sampling rate $f_{SR}$ equal to $1/\Delta t$. The time difference (i.e., sampling period) $\Delta T$ between adjacent time intervals $T_m$ may be equal to: $\Delta T=t_1+t_N=N\cdot\Delta t$, where $\Delta t$ is the time difference between adjacent time offsets $t_n$. The effective sampling rate $f_{SR}$ is equal to the time offset $\Delta t=\Delta T/N$ even though the sampling rate $\Delta T$ of each sampler is much longer than Δt. A third combining method combines N down-converted signals to provide a sampled signal having a relatively high sampling rate $f_{SR}$ equal to 1/Δt.

FIG. 36E shows the first combining method illustrated in FIG. 36D. A first combining step 346 combines samples from each of N samplers, resulting in N down-converted signals:

$$\sum_{m=1}^{M} S_{mn}(t).$$

An optional processing step 347 may process one or more of the down-converted signals:

$$P_1\left(\sum_{m=1}^{M} S_{mn}(t)\right)$$

where $P_1(\ )$ represents a first processing operation that acts on the down-converted signals and may include one or more processing operations including, but not limited to, filtering, delaying, scaling, interpolating, demodulating, decoding, amplifying, mixing, removing interference, applying transforms and/or inverse transforms, and multi-user detection.

A second combining step 348 combines the N down-converted signals into a down-converted signal or a signal having a high effective sampling rate:

$$\sum_{n=1}^{N} P_1\left(\sum_{m=1}^{M} S_{mn}(t)\right)$$

The first processing step 347 and/or the second combining step 348 may adjust the relative delays of the N down-converted signals to optimize the second combining process 348.

An optional second processing step 349 may process the combined down-converted signals:

$$P_2\left(\sum_{n=1}^{N} P_1\left(\sum_{m=1}^{M} S_{mn}(t)\right)\right)$$

where $P_2(\ )$ represents a second processing operation that acts on the combined down-converted signals and may include one or more processing operations including, but not limited to, filtering, delaying, scaling, interpolating, demodulating, decoding, amplifying, mixing, removing interference, applying transforms and/or inverse transforms, and multi-user detection.

Figure 36F:
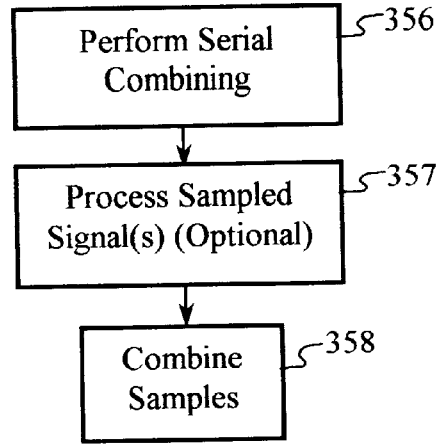
FIG. 36F illustrates the second combining method shown in FIG. 36D.

FIG. 36F shows the second combining method. A combining step 356 combines samples from a plurality of the N samplers serially, resulting in one or more combined signals:

$$\sum_{m=1}^{M}\sum_{n=1}^{N} S_{mn}(t)$$

An optional processing step 357 may process the combined signal:

$$P\left(\sum_{m=1}^{M}\sum_{n=1}^{N} S_{mn}(t)\right)$$

where P( ) represents a processing operation that acts on the combined signal and may include one or more processing operations including, but not limited to, filtering, combining, delaying, scaling, interpolating, demodulating, decoding, amplifying, mixing, removing interference, applying transforms and/or inverse transforms, and multi-user detection. The combined signal may be combined with a number L of other combined signals in an optional second combining step 358:

$$\sum_{l=1}^{L}\left(P\left(\sum_{m=1}^{M}\sum_{n=1}^{N} S_{mn}(t)\right)\right)_l$$

The combined signals provide a down-converted signal having the benefits of combined parallel down-conversion processes and a high effective sampling rate.

3.8.3. Time-offset Sampling Systems

Figure 37A:
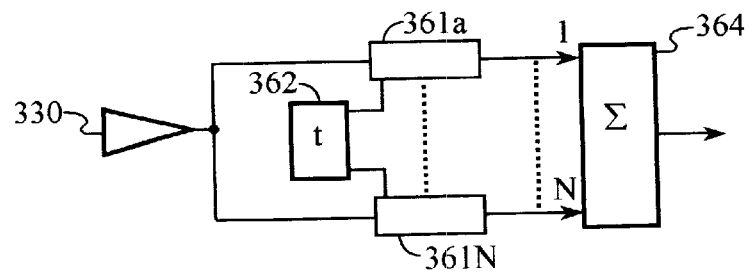
FIG. 37A illustrates basic components of a sampling system of the invention.

FIG. 37A illustrates basic components of a sampling system having N samplers that uses parallel processing to achieve a high effective sampling rate and/or increased energy transfer from an input signal to a sampled signal. A modulated carrier signal is input to a plurality N of samplers 361a to 361N from an input coupler, such as an antenna 330. The input signal is sampled at a sampling frequency $f_{SR}$ at each of the N samplers 361a to 361N. The sampling frequency $f_{SR}$ is set by the frequency of a control signal generated by a timer 362. Sampled signals generated by each sampler 361a to 361N are combined in a combiner 364. Additional processing may be performed by the combiner 364 or by processors (not shown) preceding and/or following the combiner 364.

The input signal may pass through one or more delay networks (not shown) before reaching the samplers 361a to 361N. Delay systems (not shown) may be incorporated into one or more of the samplers 361a to 361N to control the time offset of the input signal received by one or more of the samplers 361a to 361N. Time offsets of the input signal can provide relative sample timing or delay offsets between sampled signals produced by different samplers 361a to 361N. Delay systems (not shown) may be incorporated into the timer 362, into the network between the timer 362 and one or more of the samplers 361a to 361N, and/or into one or more of the samplers 361a to 361N to time offset the sampling rate $f_{SR}$ of each sampler 361a to 361N.

Delay systems (not shown) may be incorporated into one or more of the samplers 361a to 361N that control the relative timing of the sampled signals after they are produced in order to provide optimal combining of the sampled signals at the combiner 364. Similarly, one or more delay networks (not shown) may be positioned between the samplers 361a to 361N and the combiner 364 and/or incorporated into the combiner 364 to control the relative timing of the sampled signals that are combined in the combiner 364. The combiner 364 may provide complex or scalar weights to one or more of the sampled signals. Complex weighting may include delays. Additional signal processing may be performed during or after combining, such as interpolation, data sorting, digital-to-analog conversion, filtering, etc.

A timer (such as the timer 362) may include a signal generator (not shown) that generates timing pulses having a pulse width (aperture), a pulse shape, a relative phase, and a pulse frequency. One or more of the pulse width, pulse shape, phase, and pulse frequency may be controlled by an input control signal. For example, an input control signal may include any type of periodic signal (such as a sinusoid, a square wave, a saw-tooth wave, etc.) that controls the frequency of the generated pulse. Consequently, a timer (such as the timer 362) may include an LO (not shown) that is internal or external to the timer 362. The timer 362 may include a frequency multiplier (not shown), such as a frequency doubler (not shown), to reduce high-frequency requirements of the LO (not shown).

The timer's 362 input control signal may be generated by a feedback loop (not shown) that adjusts sampling characteristics (such as sample aperture, frequency, phase, and shape) relative to the sampled-signal output. Characteristics (such as amplitude, polarity, and IF) of the sampled signal depend on frequency and phase differences between the sample frequency and the input carrier frequency. The impedance of a sampler (such as samplers 361a to 361N) and the sampler's frequency selectivity (due to both impedance matching and frequency-domain consequences of windowing in the time domain) depend on the sample aperture width and the sample frequency. The aperture width, the sample frequency, and the number of sample instances determine how much energy of the input signal is transferred to the sampled signal. Thus, pulse apertures, frequencies, and number of instances may be controlled with respect to signal levels (such as signal-to-noise and signal-to-noise-plus-interference ratios) and frequency selectivity requirements of the sampled signal.

The coupler 330 and/or the samplers 361a to 361N may include one or more filters (not shown). A filter (not shown) may include an impedance-matching circuit (not shown) to provide frequency-dependent energy-transfer characteristics to the input signal(s). Thus, impedance matching and mismatching may be used to shape the gain distribution(s) of the received signal(s). Tank and resonant circuits (not shown) may be used to further optimize energy-transfer characteristics of the filter (not shown).

Figure 37B:
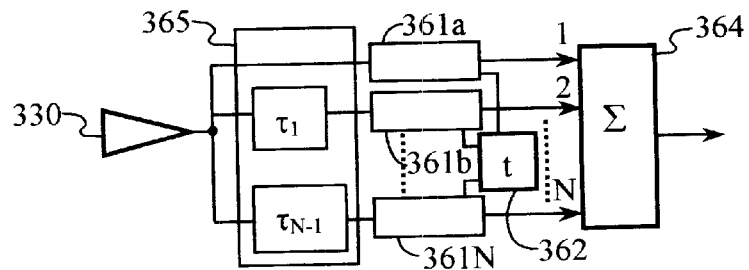
FIG. 37B illustrates basic components of a sampling system of the invention.

FIG. 37B shows a sampling system having similar components to the system shown in FIG. 37A. A delay system 365 is coupled between the input coupler 330 and the samplers 361a to 361N. The delay system 365 is capable of providing relative time offsets between the input signals sampled at each of the samplers 361a to 361N. If the samplers 361a to 361N sample their input signals at the same time, a relative time offset between the input signals result in relative time offsets in the sampled signals.

Figure 37C:
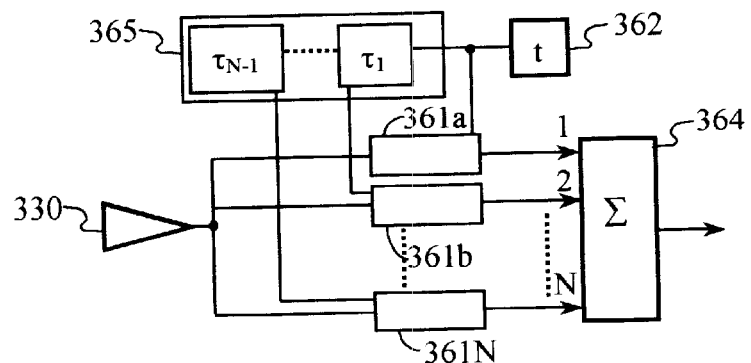
FIG. 37C illustrates basic components of a sampling system of the invention.

In a sampling system shown in FIG. 37C, a delay system 365 is coupled between the timer 362 and the samplers 361a to 361N. The delay system 365 causes the timer 362 signal (which controls the sampling rate $f_{SR}$ of each sampler 361a to 361N) to trigger time-offset samples of the input signal. If the samplers 361a to 361N receive the input signals at the same time, a relative time offset between the timer 362 signals result in relative time offsets in the sampled signals.

Figure 37D:
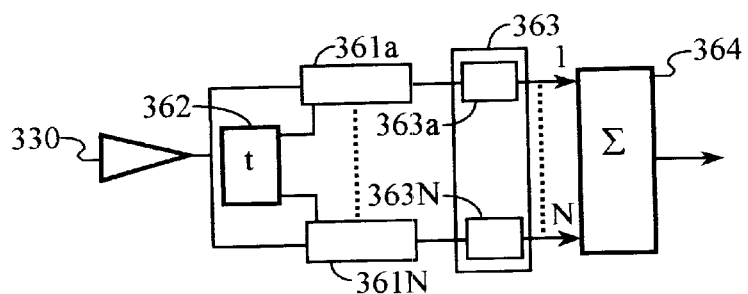
FIG. 37D illustrates basic components of a sampling system of the invention.

FIG. 37D shows a sampling system having similar components to the system shown in FIG. 37A. A processing network 363 consisting of a plurality of processors 363a to 363N is shown coupled between the samplers 361a to 361N and the combiner 364. The processors 363a to 363N may be incorporated into either or both the samplers 361a to 361N and the combiner 364. The processors 363a to 363N may perform signal-processing steps (not shown), including, but not limited to, interpolation, data sorting, digital-to-analog conversion, multi-user detection, interference cancellation, weighting, smoothing, rectifying, time-offsetting, and/or filtering.

Figure 38A:
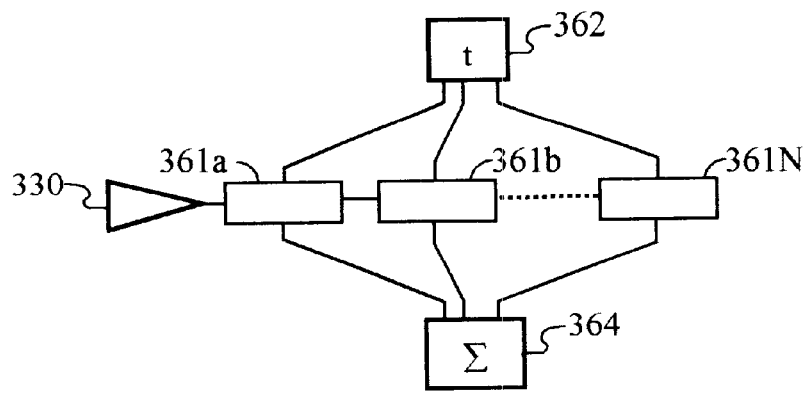
FIG. 38A illustrates an embodiment of a sampling system of the invention.

FIG. 38A illustrates a sampling system having a plurality N of samplers 361a to 361N. The sampling system 361 exploits parallel processing to achieve a high effective sampling rate and/or enhanced energy transfer from an input signal to a sampled signal. A modulated carrier signal is input to the system, such as from a channel coupler 330. The input signal is sampled at a sampling frequency $f_{SR}$ at a first sampler 361a. The sampling frequency $f_{SR}$ is set by a control signal generated by a timer 362. The input signal passes through the first sampler 361a (except when it is sampled by the first sampler 361a) before entering a second sampler 361b. The second sampler 361b samples the input signal at the sampling frequency $f_{SR}$. The input signal passes through the second sampler 361b (except when it is sampled by the second sampler 361b) into additional samplers (not shown) until it reaches an $N^{th}$ sampler 361N. Sampled signals from all of the samplers are combined in a combiner 364, which may provide complex or scalar weights to one or more of the sampled signals. Complex weighting may include delays. Additional signal processing may be performed prior to or after combining, such as interpolation, data sorting, digital-to-analog conversion, filtering, rectifying, multi-user detection, interference cancellation, and/or other well-known signal-processing techniques.

The input signal may pass through one or more delay networks (not shown) before reaching the samplers 361a to 361N. Delay systems (not shown) may be incorporated into one or more of the samplers 361a to 361N to control the time offset of the input signal received by one or more of the samplers 361a to 361N. Time offsets of the input signal can provide relative sample timing or delay offsets between sampled signals produced by different samplers. Delay systems (not shown) may be incorporated into the timer 362, into the network between the timer 362 and one or more of the samplers 361a to 361N, and/or into one or more of the samplers 361a to 361N to time offset the sampling rate $f_{SR}$ of each sampler 361a to 361N.

Delay systems (not shown) may be incorporated into one or more of the samplers 361a to 361N to control the relative timing of the sampled signals after they are produced. Timing of the sampled signals may be controlled in order to provide optimal combining of the sampled signals at the combiner 364. Similarly, one or more delay networks (not shown) may be positioned between the samplers 361a to 361N and the combiner 364 and/or incorporated into the combiner 364 to control the relative timing of the sampled signals that are combined in the combiner 364. The combiner 364 may provide complex or scalar weights to one or more of the sampled signals. Complex weighting may include delays. Additional signal processing may be performed during or after combining, such as interpolation, data sorting, digital-to-analog conversion, filtering, etc.

Figure 38B:
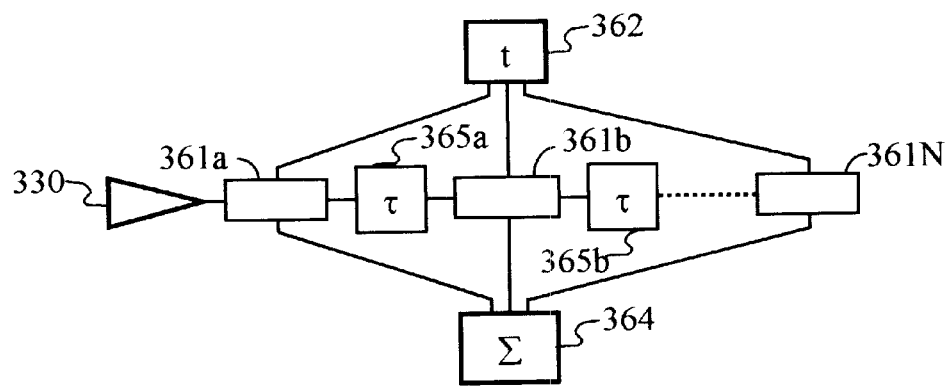
FIG. 38B illustrates an embodiment of a sampling system of the invention.

FIG. 38B illustrates an embodiment of a sampling system having N samplers 361a to 361N. The sampling system exploits parallel processing to achieve a high effective sampling rate and/or enhanced energy transfer from an input signal to a sampled signal. Many of the components in FIG. 38B are similar to the components illustrated in FIG. 38A. A delay network including multiple delay devices, such as delay devices 365a and 365b, provides relative time-offsets to the input signals sampled by the samplers 361a to 361N. The samplers 361a to 361N may sample the input signal without time offsets applied to timer 362 signal and provide time-offset samples due to relative time offsets between the input signal received by each sampler 361a to 361N.

A modulated carrier signal is input to the system, such as from the channel coupler 330. The input signal is sampled at a sampling frequency $f_{SR}$ at the first sampler 361a. The sampling frequency $f_{SR}$ is set by a control signal generated by the timer 362. The input signal passes through the first sampler 361a (except when it is sampled by the first sampler 361a) and is delayed by the first delay device 365a before entering the second sampler 361b. The second sampler 361b samples the input signal at the sampling frequency $f_{SR}$. The input signal passes through the second sampler 361b (except when it is sampled by the second sampler) into additional delay devices (such as the second delay device 365b) and additional samplers (not shown) until it reaches the $N^{th}$ sampler 361N. Sampled signals from all of the samplers 361a to 361N are combined in the combiner 364, which may provide complex or scalar weights to one or more of the sampled signals. Complex weighting may include delays. Additional signal processing may be performed after combining, such as interpolation, data sorting, digital-to-analog conversion, filtering, etc.

Figure 38C:
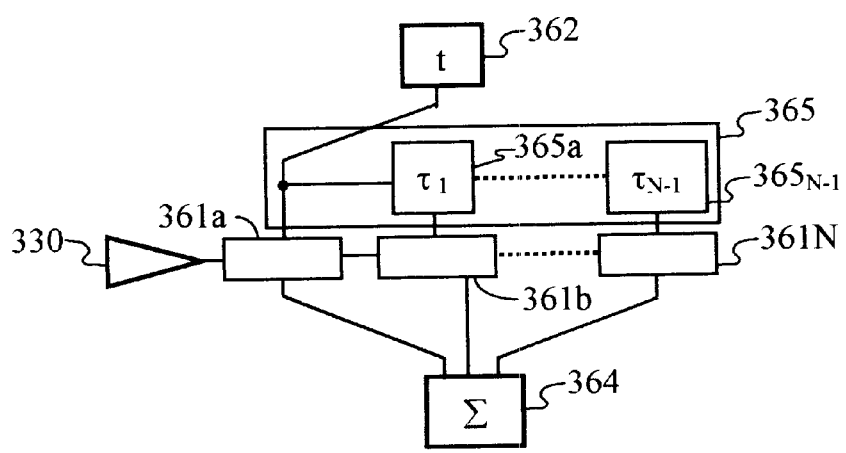
FIG. 38C illustrates an embodiment of a sampling system of the invention.

FIG. 38C shows an alternative design for a sampling system having N samplers. Many of the components in FIG. 38C are similar to components illustrated in FIG. 38A and thus, share the same reference numbers. A modulated carrier signal is input to the system, such as from the channel coupler 330. The input signal is sampled at a sampling frequency $f_{SR}$ at a first sampler 361a. The sampling frequency $f_{SR}$ is the frequency of a control signal generated by the timer 362. The input signal passes through the first sampler 361a to a second sampler 361b that samples the input signal at the same sampling frequency $f_{SR}$, except there is a time-offset (delay) relative to the sampling rate of the first sampler 361a. Similarly, the input signal is sampled at delay offsets at all of the other samplers (not shown) in the system including the $N^{th}$ sampler 361N. Sampled signals from all of the samplers 361a to 361N are combined in the combiner 364, which may provide complex or scalar weights to one or more of the sampled signals. Additional signal processing may be performed after combining, such as interpolation, data sorting, digital-to-analog conversion, filtering, etc.

Figure 38D:
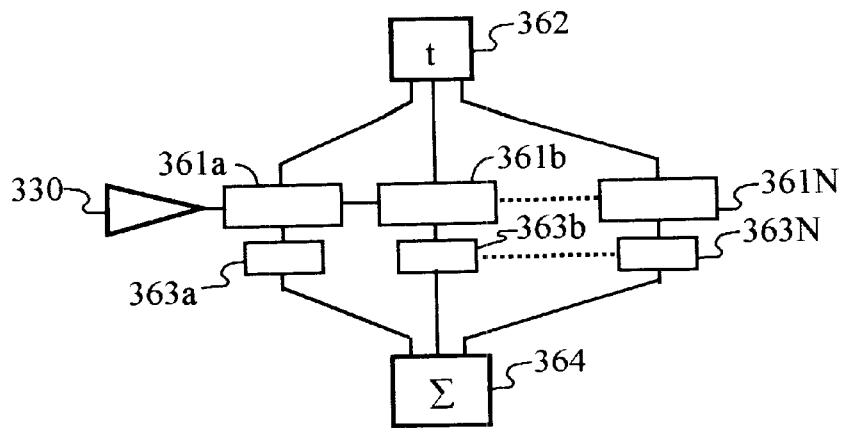
FIG. 38D illustrates an embodiment of a sampling system of the invention.

FIG. 38D shows a generalized design for a sampling system having N samplers. Many of the components in FIG. 38D are similar to the components illustrated in FIG. 38A and, thus, share the same reference numbers. A processing network 363 including a plurality of processors 363a to 363N is coupled to the samplers 361a to 361N to the combiner 364. The processors 363a to 363N may be incorporated into either or both the samplers 361a to 361N and the combiner 364. The processors 363a to 363N may perform signal-processing steps, including, but not limited to, interpolation, data sorting, digital-to-analog conversion, multi-user detection, interference cancellation, weighting, smoothing, time-offsetting, and/or filtering.

Figure 38E:
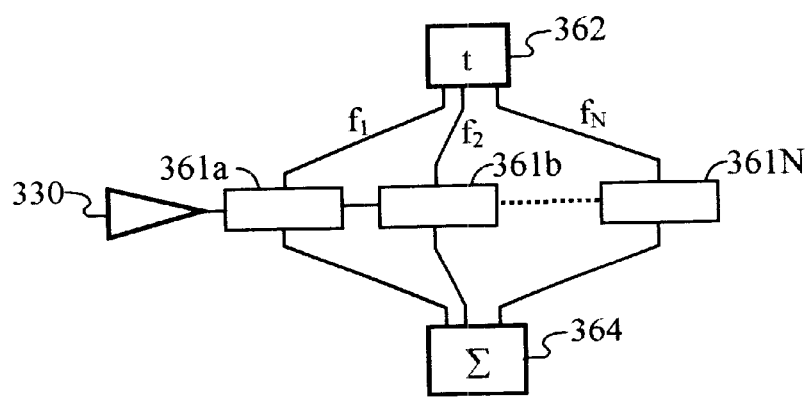
FIG. 38E illustrates an embodiment of a sampling system of the invention.

FIG. 38E shows an alternative design for a sampling system having N samplers. An input signal is received by an input coupler (such as an antenna 330) and provided to a plurality of samplers 361a to 361N. Each sampler 361a to 361N samples its input signal at a different sampling rate $f_{SRn}$ and a time offset $t_n$ dictated by a timer 362. The sampled signals are combined in a combiner 364. The combiner 364 may provide complex or scalar weights to one or more of the sampled signals. Additional signal processing may be performed prior to or after combining, such as interpolation, data sorting, digital-to-analog conversion, multi-user detection, interference cancellation, smoothing, filtering, etc.

Each of the N samplers 361a to 361N sample an input modulated carrier signal at a different sampling frequency $f_{SRn}$. The modulated carrier signal is input to the samplers 361a to 361N via the antenna 330 or any other type of coupling device(s) that couples the samplers 361a to 361N to a communication channel (not shown). The first sampler 361a samples the carrier signal at a first sampling rate $f_{SR1}$. The carrier signal passes through the first sampler to a second sampler 361b that samples the carrier signal at a second sampling rate $f_{SR2}$. The carrier signal passes through the second sampler 361b and propagates through additional samplers (not shown) until it reaches an $N^{th}$ sampler 361N where the carrier signal is sampled at an $N^{th}$ sampling rate $f_{SRN}$. The timer 362 generates a plurality N of periodic timing signals having frequencies $f_{SRn}$, where n=1 to N. The periodic signals control the sampling rate $f_{SRn}$ of each sampler 361a to 361N. The combiner 364 may compensate for overlapping samples, such as by removing one or more overlapping samples, weighting one or more of the overlapping samples, interpolating over corrupted or missing samples, and/or replacing overlapping samples. The combiner 364 may provide complex weights to the samples. Complex weighting may include delays and/or phase shifts. The combiner 364 may perform additional signal-processing steps, such as interpolation, data sorting, digital-to-analog conversion, filtering, smoothing, multi-user detection, optimal combining, interference cancellation, etc.

Figure 38F:
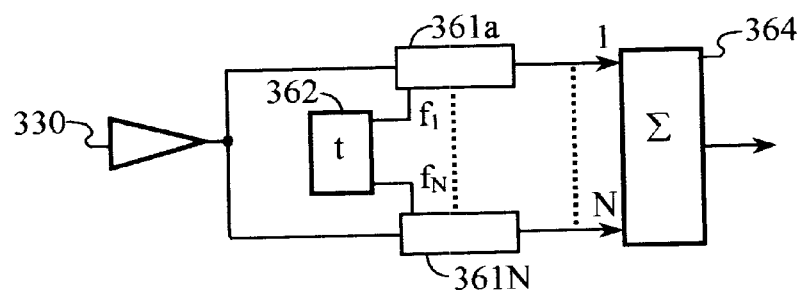
FIG. 38F illustrates an embodiment of a sampling system of the invention.

FIG. 38F shows an alternative design for a sampling system having N samplers. The components shown in FIG. 38F are similar to the components illustrated in FIG. 38E and thus, share the same reference numbers.

Sampling of an analog signal is typically performed by a sample-and-hold (S/H) circuit. A sampler may include an inverted S/H circuit, a make-before-break S/H circuit, a weighted S/H circuit, or any other type of S/H circuit. The S/H can be a digitally controlled analog circuit that tracks an analog signal input during a sample mode and holds the value of the signal during a hold mode. Samplers, as described herein, may sample at multiple and/or variable sampling rates, may have multiple and/or variable sample-aperture widths and one or more sample-aperture shapes. The sampled signal is then quantized and converted to digital form.

Samplers, as described herein, may include one or more analog-to-digital converters (ADC). Samplers, under sampling, and ADCs are described in "Wide-dynamic range A/D converters pave the way for wideband digital-radio receivers," by Brannon in EDN Access Magazine and in *Digital Signal Processing Principles Algorithms, and Applications*, by Proakis and Manolakis, which are hereby incorporated by reference. A sampler can be implemented in hardware, software, firmware, or any combination thereof. Samplers, as well as other components (such as shown in FIG. 37A to FIG. 37D and FIG. 38A to FIG. 38F) maybe implemented with integrated circuitry, discretely, with logic circuitry, or with any other fabrication technology.

An ADC converts a continuous-time (analog) signal to a digital sequence that can be processed by a digital system. The ADC quantizes the sampled values to a finite number of levels and represents each level by a number of bits. Thus, the ADC converts a continuous range of input amplitudes into a discreet set of digital code words. The conversion process involves quantization or coding. Quantization is usually a nonlinear and non-inevitable process that maps a given amplitude $x(n)=x(nT)$ at time $t=nT$ into an amplitude $x_k$, which is taken from a finite set of values. An ADC may be oversampled to allow for a low-resolution quantizer. Oversampling reduces the dynamic range of the signal values between successive samples and thus reduces the resolution requirements on the quantizer.

Figure 39A:
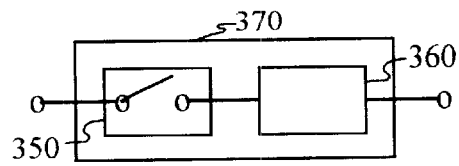
FIG. 39A shows an embodiment of a sample-and-hold circuit that can be used in the invention.

FIG. 39A shows an embodiment of an S/H circuit 370 that may be used in the invention. It will be appreciated that many other embodiments of samplers and S/H circuits not shown may be used in the invention. An S/H circuit (such as S/H circuit 370, which includes a switch module 350 and a holding module 360) down converts a received electromagnetic signal to an IF signal, a baseband signal, and/or a signal having a different modulation scheme. The received electromagnetic signal may be an analog signal, a digital signal, and/or a multicarrier signal.

The switch module 350 closes during a timer signal pulse (such as on rising or falling edges of the pulse). An input electromagnetic signal is coupled to the holding module 360, which captures and holds energy from the signal. The pulse width (or aperture) determines how much energy is received by the holding module 360. The holding module 360 holds the sampled energy after the switch module 350 opens until a next sample interval. The holding module 360 may output a sampled signal as an unfiltered signal (such as a stair-step signal), a filtered signal, or a partially filtered signal.

Switch modules (such as the switch module 350) can be any type of switch device having a relatively low impedance when closed and a relatively high impedance when open. A switch device may be used that is substantially impedance matched to a circuit when open and substantially impedance mismatched to a circuit when closed. Switch modules (such as the switch module 350) can be implemented with one or more normally open and/or normally closed switches. A switch module (such as the switch module 350) can be implemented with any type of suitable switch device, including, but not limited to, mechanical switches, electrical switches, optical switches, and combinations thereof. Such switch devices include, but are not limited to, transistor switches, diode switches, relay switches, optical switches, impedance-match switches, micro-machine switches, etc.

Holding modules (such as holding module 360) are capable of capturing energy (such as signal amplitude, signal intensity, charge, flux, voltage, current, etc.) of an input signal during a timing pulse aperture. Holding modules (such as holding module 360) are capable of holding the captured energy during the timing pulse aperture and during the time interval between pulses. Holding modules can include reactive holding modules. A reactive holding module employs one or more electrical components including, but not limited to, capacitors and inductors.

Figure 39B:
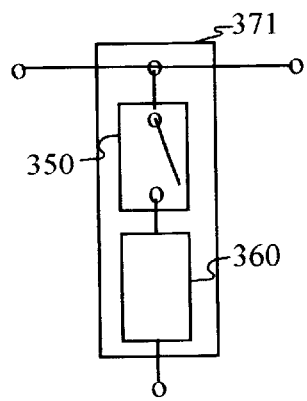
FIG. 39B shows an alternative embodiment of a sample-and-hold circuit that can be used in the invention.
Figure 39C:
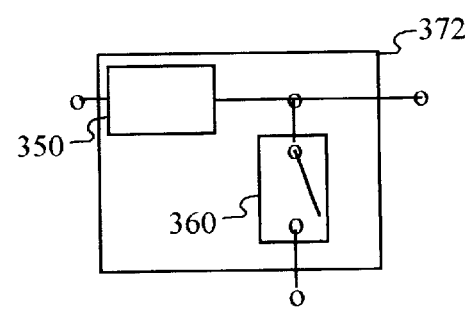
FIG. 39C shows an alternative embodiment of a sample-and-hold circuit that can be used in the invention.
Figure 39D:
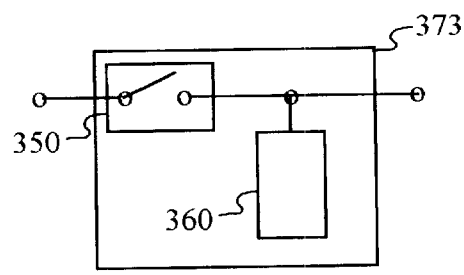
FIG. 39D shows an alternative embodiment of a sample-and-hold circuit that can be used in the invention.

FIG. 39B shows an alternative embodiment of an S/H circuit 371 that maybe used in the invention. Components shown in FIG. 39B are similar to components shown in FIG. 39A and thus, have the same reference numbers. FIG. 39C shows an alternative embodiment of an S/H circuit 372 that may be used in the invention. Components shown in FIG. 39C are similar to components shown in FIG. 39A as indicated by identical reference numbers. FIG. 39D shows an alternative embodiment of an S/H circuit 373 that may be used in the invention. Components shown in FIG. 39D are similar to components shown in FIG. 39A. Therefore, components in both FIG. 39D and FIG. 39A share the same reference numbers.

4. Coherence Multiplexing 4.1. Overview of Coherence Multiplexing

Wireless coherence multiplexing is described in Applicant's pending U.S. Pat. Appl. No. 60/194,633 and PCT Appl. No. PCT/US00/18113, which is hereby incorporated by reference. In coherence multiplexing, an information signal is encoded (e.g., modulated) onto a wideband signal. In one embodiment, multiple copies of the encoded signal are mapped into different values of at least one diversity parameter. In another embodiment, the encoded signal and a decode signal are mapped into different values of at least one diversity parameter. Mapping occurs at a transmitter, the communication channel, and/or at a receiver. Signals received by a receiver are separated with respect to their diversity-parameter values and correlated. Coherence multiplexing reduces receiver complexity and allows information to be recovered from true noise signals because a coherence-multiplex receiver does not need to generate a decode signal.

FIG. 40A and FIG. 40B each show relative time offsets between two modulated noise signals received or transmitted from two spatially separated antennas. Relative positioning of either or both transmitters and/or receivers can generate multiple instances of a modulated noise signals that are time offset.

Figure 42B:
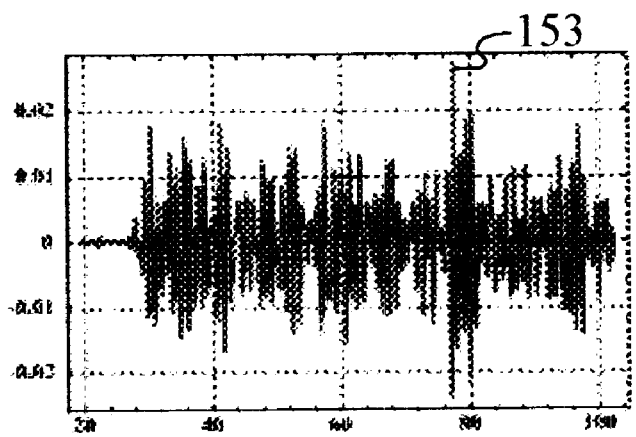
FIG. 42B shows an amplitude-versus-time profile of a received signal in an outdoor multipath environment.

FIG. 41 shows effects of a multipath environment on a transmitted signal. Reflectors (such as reflector 177) in a communication channel cause multiple time-offset instances of the transmitted signal to arrive at a receiver 97. FIG. 42A shows an amplitude-versus-time profile 152 of a received signal in an outdoor multipath environment. The time base is in microseconds. The amplitude profile 152 was recorded by Applicant during field tests to measure multipath effects at the ramp and concourses at Denver International Airport. The amplitude profile 152 indicates that certain time offsets applied to the received signals result in high correlation. Similarly, FIG. 42B shows an amplitude-versus-time profile 153 of a received signal in an indoor multipath environment. The time base is in nanoseconds. The amplitude profile 153 was measured in a commercial office building. The transmit and receive antennas were eight meters apart with three intervening interior walls.

Figure 43:
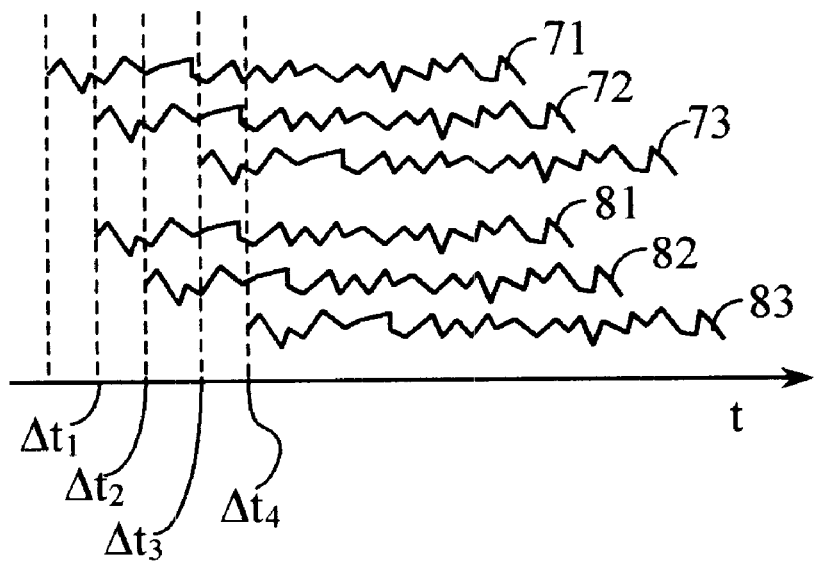
FIG. 43 shows a relative time-domain representation of two time-offset samples of a received signal and its multipath components.

FIG. 43 shows a relative time-domain representation of two samples 61 and 62 of a received signal $s_n(t)$ and its multipath components. The first sample 61 includes three multipath components 71, 72, and 73. Components 72 and 73 have relative delays of $\Delta t_1$ and $\Delta t_3$, respectively. The second sample 62 also includes three multipath components 81, 82, and 83. Components 82 and 83 also have relative delays of $\Delta t_2 - \Delta t_1 = \Delta t_1$ and $\Delta t_4 - \Delta t_1 = \Delta t_3$, respectively.

The samples 61 and 62 may be taken from multiple receivers (not shown), or one or more samples (such as sample 62) may be split (or otherwise replicated) from the first sample 61 taken from a single receiver (not shown). The second sample is time-shifted by an amount of $\Delta t_1$ so that component 72 lines up with component 81. This causes components 72 and 81 to be correlated, whereas the other components are substantially uncorrelated. Some of the preferred embodiments of the invention use narrow time-domain pulses to achieve narrow correlation peaks.

The use of subcarriers provides wideband radio transmissions with added channelization, smoothing and fidelity. Subcarriers of different frequencies or waveforms can be used (simultaneously) to enhance channelization of wideband radio signals. Thus, a wideband radio link can communicate many independent channels simultaneously by employing different subcarriers for each channel.

Subcarrier modulation in wideband radio systems is described in U.S. Pat. Nos. 6,031,862, 5,995,534, 5,963,581, and 5,677,927, which are hereby incorporated by reference. Many features of the designs and methods for subcarrier modulation and impulse radio may be incorporated into the coherence-multiplexing embodiments of the invention. Similarly, CI and/or CI combined with one or more information-modulated subcarriers may be incorporated into coherence multiplexing.

4.2. Coherence-multiplexing Methods

4.2.1. Coherence Multiplexing Transmission Methods

Figure 44A:
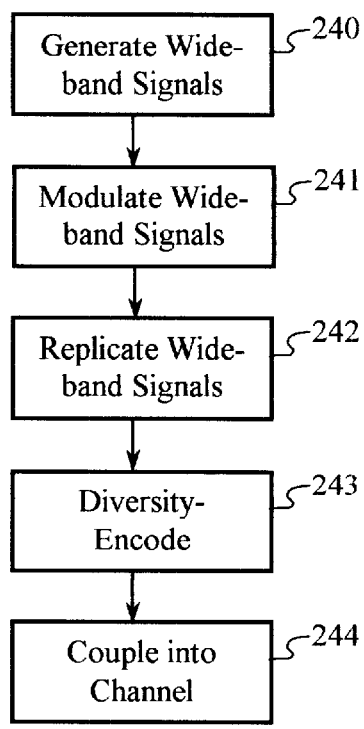
FIG. 44A shows a method of generating a coherence-multiplexing signal for transmission.

FIG. 44A shows a method of generating a coherence-multiplex signal for transmission. A wideband signal is produced in a generation step 240. An information signal is impressed onto the wideband signal in a modulation step 241. The modulated signal is replicated into a plurality of modulated signals in a replication step 242. The replicated signals are diversity encoded in an encoding step 243. The encoded signals are coupled into a communication channel in a coupling step 244.

The wideband signal may be an impulse signal, a multi-carrier signal, a noise signal, a direct-sequence signal, or any type of spread-spectrum or otherwise wideband signal. The wideband signal may include a plurality of wideband signals and/or a plurality of narrowband signals. The modulation step 241 impresses at least one information signal onto the wideband signal. Modulation may include any modulation technique, such as frequency modulation (FM), AM, phase modulation (PM), frequency shift keying (FSK), phase shift keying (PSK), pulsed FM, or the like. The modulation step 241 and the generation step 240 may be effected simultaneously by spread-spectrum modulation employing a code representing the information signal.

In a preferred embodiment, one or more subcarriers translate (or shift) the information signal(s) to a higher frequency before the modulation step 241. The subcarrier signal is modulated by the information signal via any well-known modulation techniques, such as FM, AM, PM, FSK, PSK, pulsed FM, or the like. Other non-sinusoidal and/or non-continuous waveforms can also be employed as subcarriers.

A modulated subcarrier signal may be used to time shift the pulse positions of the wideband signal in the modulation step 240. In another embodiment, direct digital modulation using Manchester encoding is employed as a subcarrier. A combination of these subcarrier techniques may also be implemented.

Diversity encoding involves changing at least one diversity-parameter value of a signal and/or mapping the signal onto at least one diversity-parameter value. Diversity parameters include, but are not limited to, polarization, frequency, directionality, time, mode, code, space, phase space, spatial gain distributions, and subspace channels.

The order of various steps may be changed without departing from the spirit of the invention. For example, the replication step 242 and the encoding step 243 may occur as a result of the coupling step 244 or may occur after the coupling step 244.

Figure 44B:
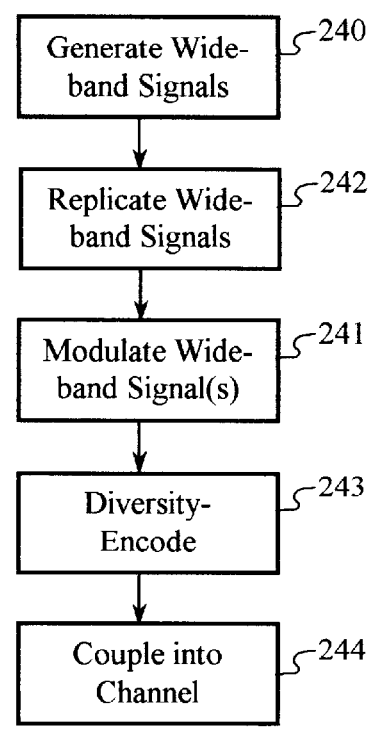
FIG. 44B shows an alternative method of generating a coherence-multiplexing signal for transmission.

FIG. 44B shows a method of generating a coherence-multiplex signal for transmission. This method may be used to generate multiple diversity-encoded information-modulated signals. This method may also be used to generate a diversity encoded information-modulated signal and a diversity-encoded decode signal.

Steps shown in FIG. 44B are similar to steps shown in FIG. 44A. A wideband signal is generated in a generation step 240. A replication step 242 results in the generation of multiple wideband signals. One or more of the wideband signals are modulated with an information signal in a modulation step 241. The wideband signals (at least one modulated wideband signal and possibly at least one unmodulated wideband signal) are diversity encoded in a diversity-encoding step 243. The diversity-encoded signals are coupled into a communication channel in a coupling step 244.

The order of various steps may be changed without departing from the spirit of the invention. For example, the diversity-encoding step 243 may occur between the replication step 242 and the modulation step 241. The diversity-encoding step 243 may occur during or after the coupling step 244.

4.2.2. Coherence Multiplexing Reception Methods

Figure 45A:
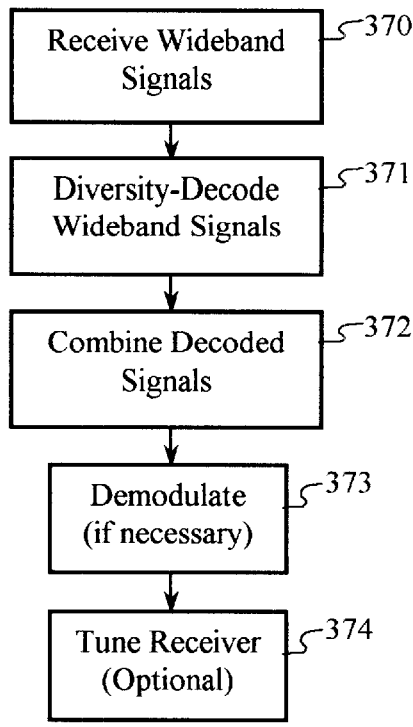
FIG. 45A shows a method of processing a received coherence-multiplexing signal.

FIG. 45A shows a method of processing a received coherence-multiplexing signal. Wideband signals are coupled out of a communication channel (not shown) in a coupling step 370. A decoding step 371 separates the received wideband signals with respect to at least one encoded diversity parameter. The separated signals may be mapped into a common diversity-parameter value before being combined in a combining step 372. The combining step 372 may include any type of combining process, such as cross correlation and/or coherent combining. The combined signals may be demodulated in an optional demodulation step 373. The demodulation step 373 may include decoding (e.g., spread-spectrum, channel, and/or error-correction decoding), decrypting, demodulation, and/or any type of signal-enhancement technique that extracts or enhances a received information signal. An optional tuning step 374 may be used to optimize one or more of the processing steps 370, 371, 372, and 373, and/or any of the transmission steps shown in FIG. 44A and/or FIG. 44B.

The effect of using a cross-correlation function for the combining step 372 causes the output of the receiver (not shown) to be a nonlinear function of the amplitude of the received signal(s). For baseband modulation, this is undesirable. However, for subcarriers, such as FM, AM, FSK, PSK, and Manchester, the harmonics are filtered, thereby eliminating any distortion. Such filtering can not remove harmonics when baseband modulation is used because the harmonics stay at baseband, making the information signal unrecoverable.

The addition of subcarriers also enhances fidelity by increasing bandwidth and signal to noise. The subcarrier inherently makes the information more impervious to noise. The subcarrier embodiments provide less signal compression and lower signal distortion by reducing baseband noise for high-reliability voice, data, and/or imagery communications.

The linearity requirements for modulation are reduced by using the subcarrier technique of the present invention. The use of a subcarrier also reduces harmonic distortion due to a nonlinear modulation transfer function, compared to baseband modulation. Modulation transfer characteristics should be extremely linear in order to minimize distortion in speech or music transmissions. This is very difficult to achieve in a non-subcarrier baseband impulse system.

Figure 45B:
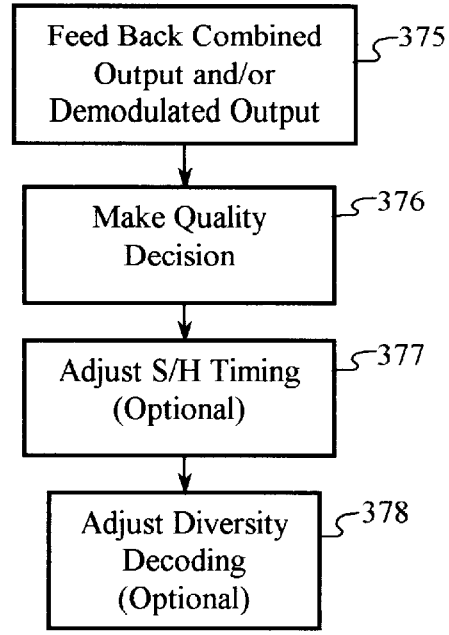
FIG. 45B shows a method of tuning a coherence-multiplexing receiver to optimize signal reception.

FIG. 45B shows a method of tuning a coherence-multiplex receiver (not shown) to optimize signal reception. An information signal resulting from a combining method (such as cross correlation) or a demodulation method is coupled into a feedback loop in a feedback step 375. The feedback signal is analyzed in a decision step 376 based on one or more reference points that may be fixed or coupled to previous performance and/or control metrics. The decision step 376 may generate an action signal if a system adjustment is required. The action signal may be processed by an optional timing-adjustment step 377 that may adjust the timing of a sample-and-hold circuit (not shown) in the receiver (not shown) or otherwise adjust the combining step 372 shown in FIG. 45A. The action signal may be processed in an optional decode-adjustment step 378 that is capable of providing adjustment to the diversity-decoding step 371 shown in FIG. 45A. Similarly, other optional adjustment steps (not shown) may receive an action signal to adjust other reception steps and/or transmission steps.

Figure 46A:
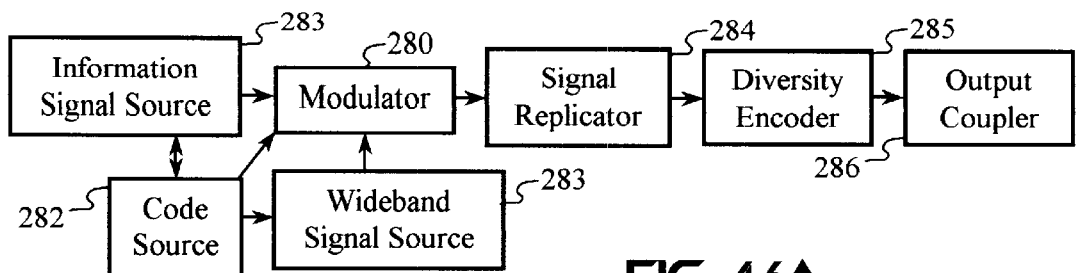
FIG. 46A shows a basic coherence-multiplexing transmission system.

4.3. Coherence-multiplexing Systems
4.3.1. Coherence-multiplexing Transmitter FIG. 46A shows a basic coherence-multiplexing transmission system. An information-signal generator 281 and a wideband-signal generator 283 are coupled to a modulator 280. An optional code generator 282 may be coupled to any of the set of the information-signal generator 281, the wideband-signal generator 283, and the modulator 280. The modulator 280 is coupled to a signal replicator 284 and a diversity encoder 285. The diversity encoder 285 is coupled to an output coupler 286, which includes a coupling device, such as an antenna (not shown).

Figure 46B:
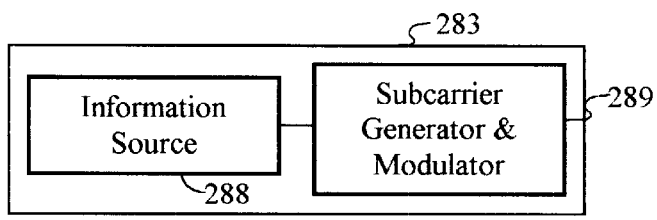
FIG. 46B shows an embodiment of an information-signal generator that may be used in the invention.

FIG. 46B shows an embodiment of an information-signal generator 281. An information-signal source 288 generates an information signal that may be modulated onto one or more subcarriers in an optional subcarrier generator and modulator 289. The information-signal generator 281 is capable of producing an information signal output representing either at least one signal from the information source 288 and/or at least one information-modulated sub carrier signal.

The wideband-signal generator 283 may include one or more of any type of signal generator that generates a wideband signal as defined herein. The wideband-signal source 283 may include a switch (not shown), a multicarrier generator (not shown), an IFFT circuit (not shown), an FFT circuit, a pseudo-random noise generator (not shown), a Gaussian white-noise generator (not shown), and/or any type of transform and/or inverse-transform circuit.

The signal replicator 284 may include any device that splits, duplicates, or substantially replicates an input signal. The replicator 284 may be integrated with either or both the wideband-signal generator 283 and the diversity encoder 285. If the replicator 284 is integrated with the wideband-signal generator 283, the generator 283 generates a plurality of wideband signals.

The code generator 282 is an optional device that may encode the information signal, the wideband signal(s) or both. The code generator 282 may encode one or more information-modulated wideband signals. The code generator 282 may control the wideband signals generated by the wideband-signal generator 283. Thus, the code generator 282 may be coupled to one or more of the modulator 280, the wideband-signal generator 283, and the information-signal generator 281.

Figure 46C:
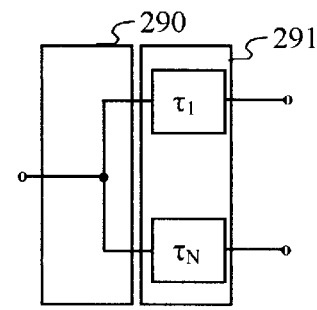
FIG. 46C shows a device capable of performing signal replication and diversity encoding.
Figure 46D:
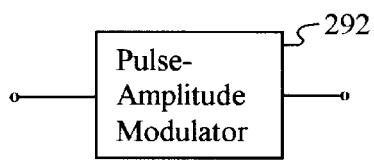
FIG. 46D shows a pulse-amplitude modulator capable of performing modulation, signal replication, and diversity encoding.
Figure 46E:
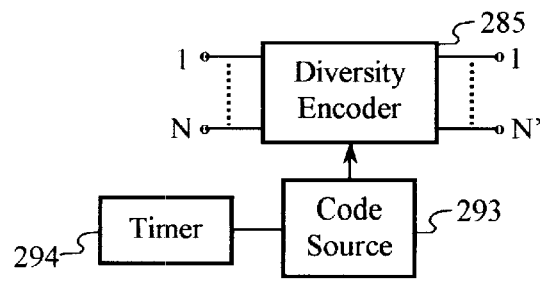
FIG. 46E shows a diversity encoder including a code generator and a timer.

The diversity encoder 285 provides different values of at least one diversity parameter to the wideband signals. The diversity encoder 285 maybe controlled (such as in a feedback loop) to optimize reception and decoding of the information signals. FIG. 46C shows a device that acts as the signal replicator 284 and the diversity encoder 285. An input signal is split into multiple signals by a splitter 290 and provided with differential delays by a time-offset system 291. The modulator 280 may provide signal replication and diversity encoding, such as via pulse-amplitude modulation. The modulator 280, signal replicator 284, and diversity encoder 285 may be implemented as a pulse-amplitude modulator 292 shown in FIG. 46D. The diversity encoder 285 may provide time-dependent diversity encoding to one or more wideband signals. FIG. 46E shows the diversity encoder 285 including a code generator 293 and a timer 294. The code generator 293 may provide a code signal that controls diversity encoding.

Figure 47:
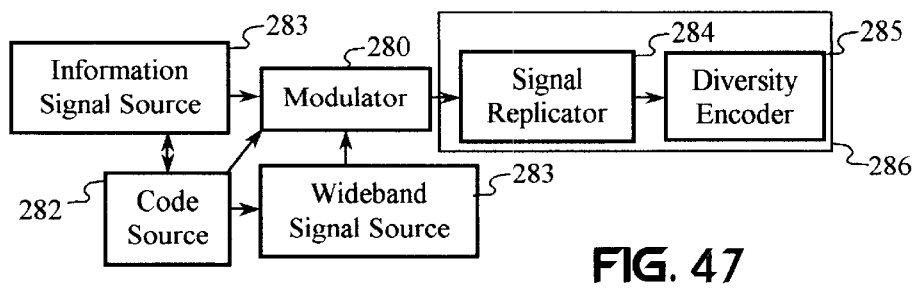
FIG. 47 shows an alternative embodiment of a coherence-multiplexing transmission system.
Figure 48A:
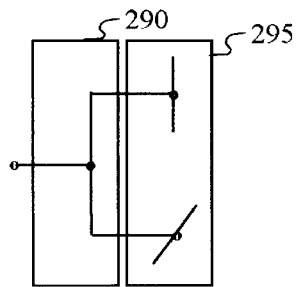
FIG. 48A shows an embodiment of an output coupler that may be used in the invention.
Figure 48B:
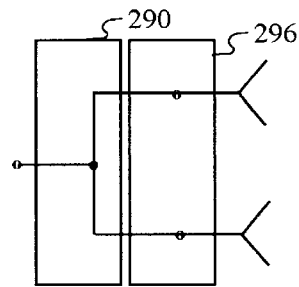
FIG. 48B shows an alternative embodiment of an output coupler that may be used in the invention.

FIG. 47 shows an alternative embodiment of a coherence-multiplex transmission system in which an output coupler 286 includes a replicator 284 and a diversity encoder 285. Two possible embodiments of the output coupler 286 are shown in FIG. 48A and FIG. 48B. In FIG. 48A, a splitter 290 splits an input signal into a plurality N of split signals that are coupled to an antenna array 295 consisting of a plurality N of antennas having different values of polarization. FIG. 48B shows a splitter 290 coupled to an array 296 of spatially separated antennas.

The output coupler 286 may include one or more amplifiers (not shown), filters (not shown), up converters (not shown), LOs (not shown), antenna arrays (not shown), array subsystems (not shown), and/or any other components that may normally be used in a system that couples electromagnetic signals into a communication channel (not shown).

Figure 49A:
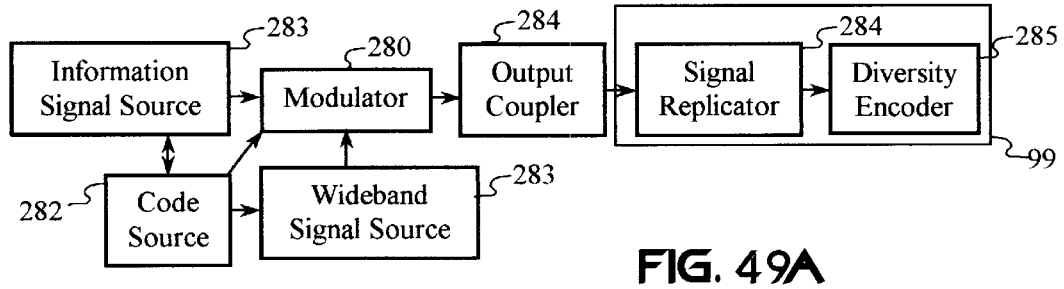
FIG. 49A illustrates an embodiment of a coherence-multiplexing transmission system in which a communication channel acts as a replicator and a diversity encoder.
Figure 49B:
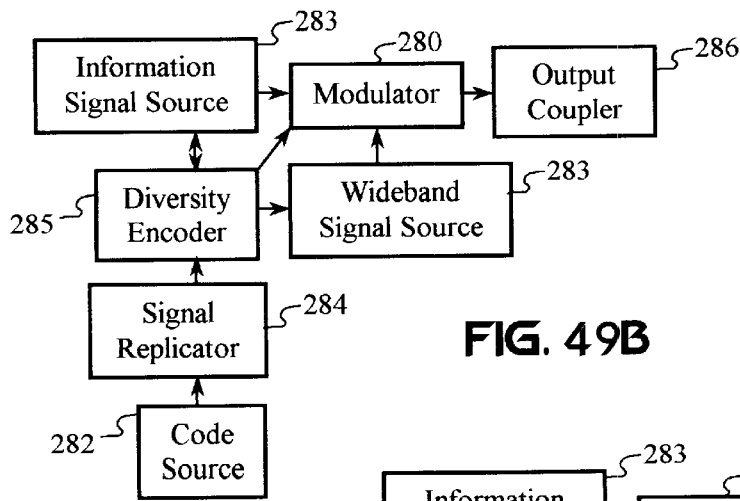
FIG. 49B shows an alternative embodiment of a coherence-multiplexing transmission system.
Figure 49C:
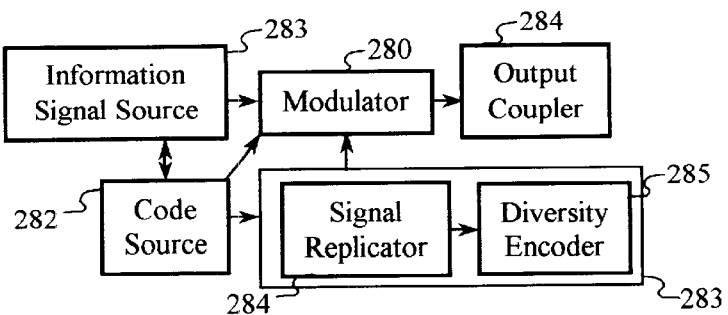
FIG. 49C shows an embodiment of a coherence-multiplexing transmission system in which a wideband-signal generator includes a replicator and a diversity encoder.
Figure 49D:
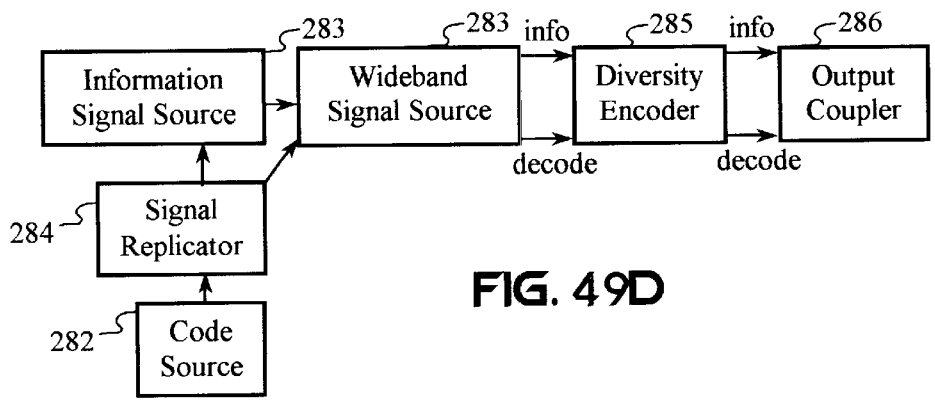
FIG. 49D shows an alternative embodiment of a coherence-multiplexing transmission system.
Figure 49E:
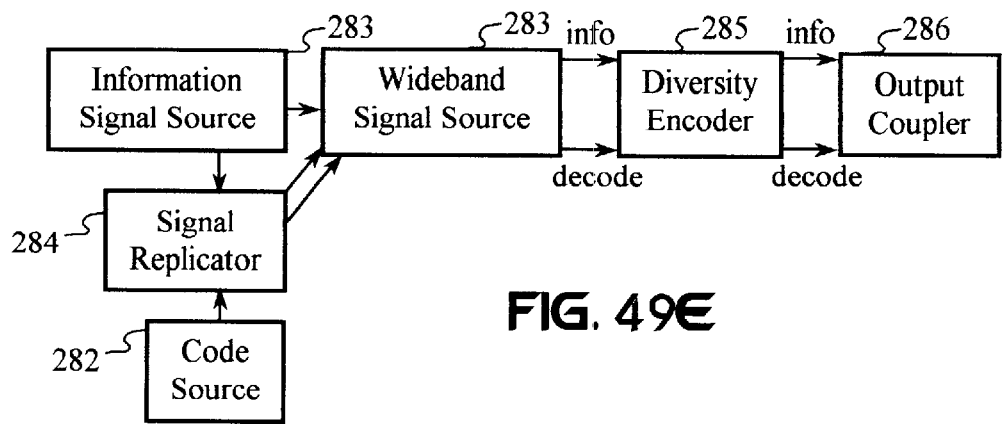
FIG. 49E shows an alternative embodiment of a coherence-multiplexing transmission system.

FIG. 49A shows an alternative embodiment of a coherence-multiplex transmission system in which a communication channel 99 acts as a replicator 284 and a diversity encoder 285. In FIG. 49B, a replicator 284 and diversity encoder 285 act on a code signal generated by a code source 282. In one embodiment, a wideband source 283 is acted upon by a plurality of diversity-encoded coding signals to generate a plurality of diversity-encoded wideband signals. An information signal modulates one or more of the wideband signals. In another embodiment, an information signal modulates one or more of the coding signals. In another embodiment, the wideband source is controlled by at least one unmodulated coding signal and at least one modulated coding signal. FIG. 49C shows an alternative embodiment of a coherence-multiplex transmission system in which a wideband-signal generator 283 includes a replicator 284 and a diversity encoder 285. FIG. 49D and FIG. 49E show alternative embodiments of a coherence-multiplex transmission system.

Figure 50A:
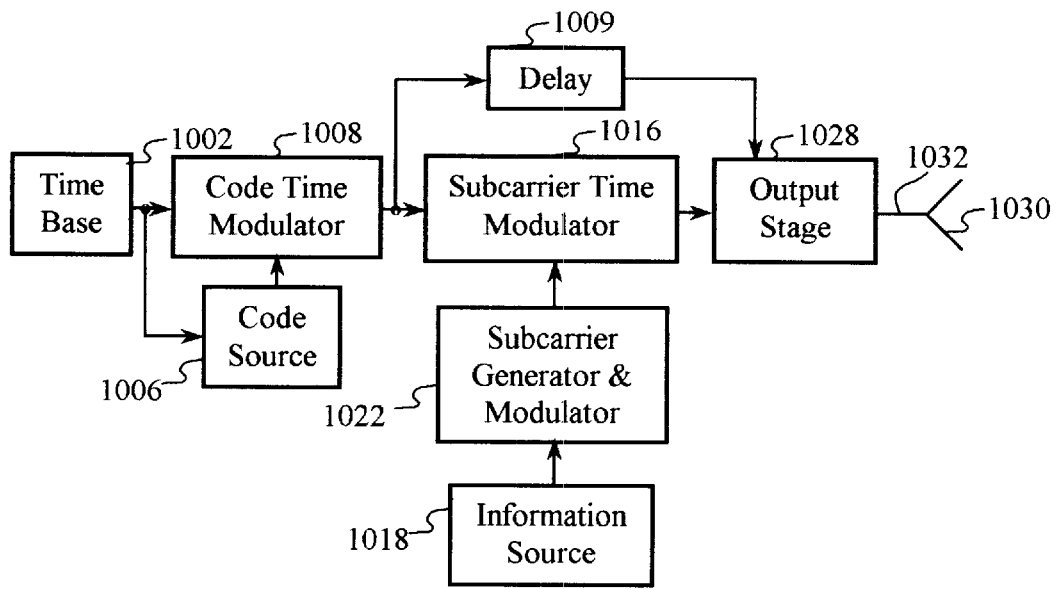
FIG. 50A shows a generalized embodiment of an impulse transmitter implemented as a coherence-multiplexing transmission system.

FIG. 50A shows a generalized embodiment of an impulse transmitter implemented as a coherence-multiplex transmission system. The transmitter comprises a time base 1002 that generates a periodic timing signal. The time base 1002 may comprise a voltage-controlled oscillator (VCO) (not shown) or a similar device (not shown) having a high timing accuracy on the order of picoseconds. The voltage control to adjust the VCO (not shown) center frequency is set at the desired center frequency used to define the transmitter's non-divided pulse repetition rate. The periodic timing signal is supplied to a code source 1006 and a code time modulator 1008.

The code source 1006 comprises a storage device (not shown), such as a random access memory (RAM), read only memory (ROM), or the like, for storing orthogonal pseudo-noise (PN) codes and for outputting the PN codes as a code signal. Alternatively, maximum length shift registers (not shown) can be used to generate the PN codes. Code source 1006 monitors the periodic timing signal to permit the code signal to be synchronized to the code time modulator 1008. The code time modulator 1008 uses the code signal to modulate the periodic timing signal for channelization and smoothing of a final emitted signal. The code time modulator 1008 outputs a coded timing signal.

The coded timing signal is supplied to a subcarrier time modulator 1016 for information modulation thereof. The coded timing signal is also coupled through a delay device 1009 to an output stage 1028. In other impulse systems, the information modulation was done by using the information itself as the modulating source. In the present invention, however, an information source 1018 supplies an information signal to a subcarrier generator and modulator 1022. The information signal can be any type of intelligence, including digital bits representing voice, data, imagery, or the like, analog signals, or complex signals. Both the coded timing signal and the subcarrier time modulator 1016 can be implemented using voltage, current, or digital sources as modulation inputs.

In this case, a subcarrier is a carrier modulated with information separate from carrier modulation, which in turn modulates a carrier. The subcarrier generator and modulator 1022 generates a modulated subcarrier signal that is modulated by the information signal. Modulator 1022 supplies the modulated subcarrier signal to the subcarrier time modulator 1016. Thus, the modulated subcarrier signal is used by the subcarrier time modulator 1016 to modulate the carrier, which, in this case, is the coded timing signal. Modulation of the coded timing signal by the subcarrier time modulator 1016 generates a modulated, coded timing signal that is sent to the output stage 1028.

The modulated subcarrier signal is used by the subcarrier time modulator 1016 to time shift the position of the pulses of the coded timing signal. Thus, in addition to the coded timing signal, a second signal triggers the output stage 1028 (in this case, the modulated, coded timing signal), which is a train of pulse position modulated pulses.

The output stage 1028 uses the coded timing signal and the modulated, coded timing signal as triggers to generate electrical monocycle pulses. The electrical monocycle pulses are sent to a transmit antenna 1030 via a transmission line 1032 coupled thereto. The electrical monocycle pulses are converted into propagating electromagnetic pulses by the transmit antenna 1030. In the present embodiment, the electromagnetic pulses propagate to an impulse-radio receiver (not shown) through a communication channel (not shown), such as air in an RF embodiment. In the preferred embodiment, the emitted signals are wide-band or ultrawide-band signals. However, the emitted signals can be spectrally modified by filtering the monocycle pulses. This bandpass filtering causes each monocycle pulse to have more zero crossings in the time domain.

Direct digital modulation can be used alone to time modulate the periodic timing signal or the direct digitally modulated periodic timing signal can be further modulated with one or more modulated subcarrier signals. Impulse-radio systems use pulse-position modulation, with the actual pulse-to-pulse interval being varied on a pulse-by-pulse basis by two components: an information component and a pseudo-random code component. Unlike spread-spectrum systems, the pseudo-random code is not necessary for energy spreading (because the impulses are inherently wideband), but rather for channelization, energy smoothing in the frequency domain, and jamming resistance. Impulse radio achieves optimal smoothing by applying to each pulse a PN code dither with a much larger magnitude than the modulation dither.

Figure 50B:
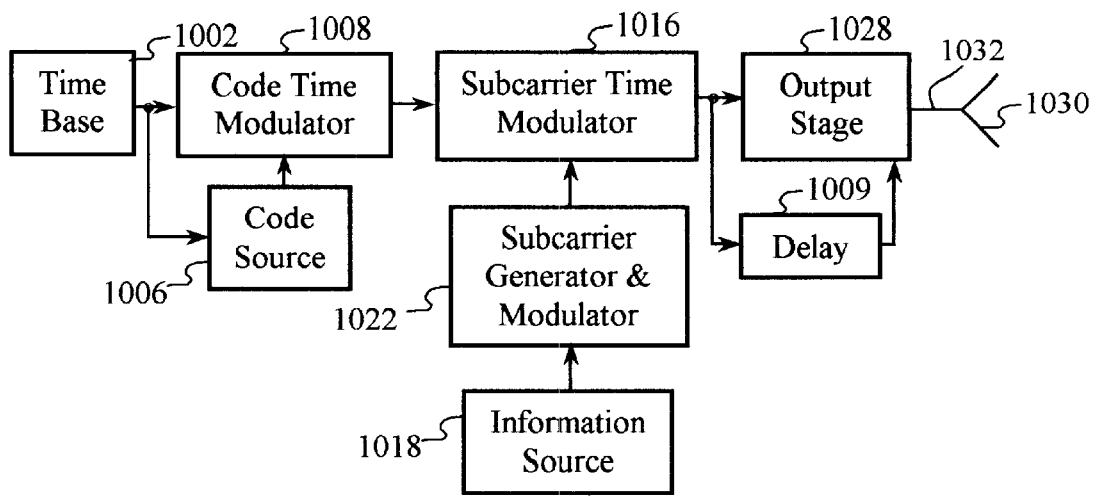
FIG. 50B shows an alternative embodiment of an impulse transmitter implemented as a coherence-multiplexing transmission system.

FIG. 50B shows an alternative embodiment of an impulse transmitter implemented as a coherence-multiplex transmission system. Components in both FIG. 50B and FIG. 50A are similar, as indicated by identical reference numbers. The output of the subcarrier time modulator 1016 is split into multiple modulated, coded timing signals. A first split signal is coupled into the output stage 1028. A second split signal is delayed by a delay element 1011 before being coupled into the output stage 1028. Thus, the output stage 1028 uses a plurality of time-offset instances of the modulated, coded timing signal as triggers to generate electrical monocycle pulses.

Multiple delayed instances of a transmitted signal may be created by transmitting the signal from multiple antennas. Replication and delay of a transmitted signal can result from a multipath propagation environment, in which case, the delay element 1011 is not needed because it is incorporated into the propagation environment. A receiver (not shown) may use multiple antennas (not shown) to create the same effect as a multipath environment.

Figure 50C:
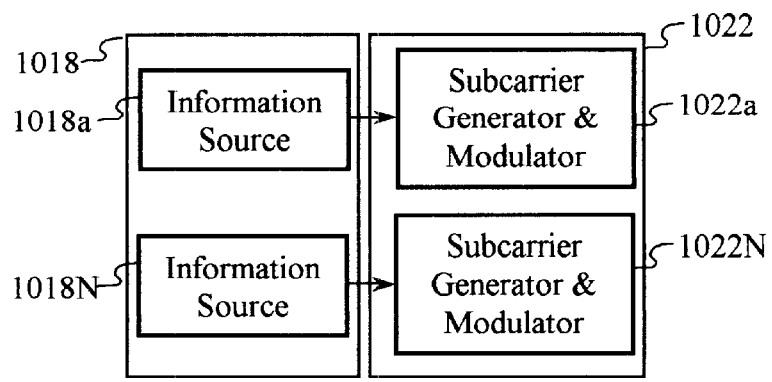
FIG. 50C shows an embodiment of an information source and a subcarrier generator and modulator.

FIG. 50C shows an embodiment of an information source 1018 and a subcarrier generator and modulator 1022. The information source 1018 is comprised of a plurality N of information signal generators 1018a to 1018N. The subcarrier generator and modulator 1022 is comprised of a plurality N of subcarrier generator/modulator units 1022a to 1022N. Thus, each information signal may be modulated onto a different subcarrier to facilitate separation by a receiver (not shown).

Subcarriers having different frequencies or waveforms can add channelization to coherence-multiplex radio signals. Thus, a coherence-multiplex radio link can communicate many independent channels simultaneously by employing different subcarriers for each channel. Alternatively, the two pairs of coherence-multiplex radio users can have isolated communications if each pair uses different PN codes and the same subcarriers. Additionally, channelization can be achieved when sets of radios operate at different pulse-repetition rates, independent of PN codes and/or subcarriers.

4.3.2. Coherence Multiplexing Receiver

Coherence-multiplex radio-receiver embodiments set forth below are used by way of example, not limitation, to describe the present invention and enable those skilled in the relevant arts to make and use the invention. These arts include the fields of communications, discrete analog, digital and integrated-circuit design and implementation, digital signal processing and PN-code theory. The implementation of various elements and blocks will become evident to those skilled in the pertinent art.

Figure 51:
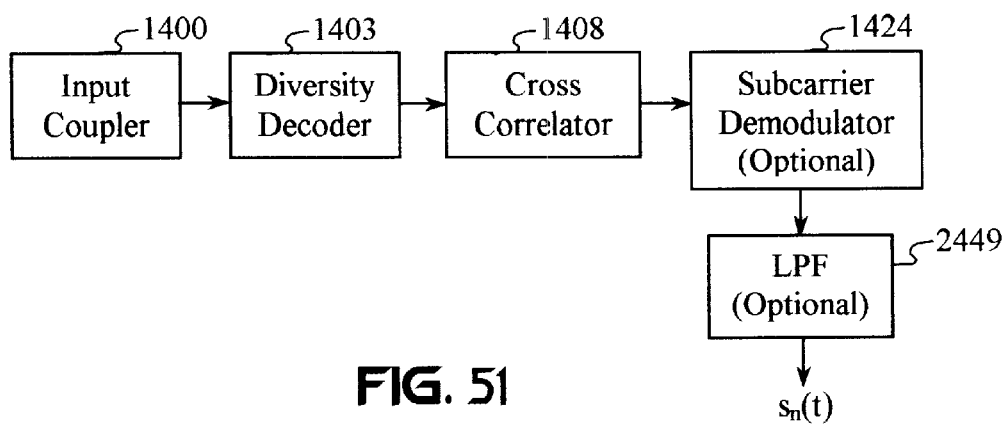
FIG. 51 is a generalized block diagram of a coherence-multiplexing radio receiver.

There are several coherence-multiplex radio receiver embodiments. FIG. 51 shows a generalized block diagram of a coherence-multiplex radio receiver. Each coherence-multiplex radio receiver generally comprises a diversity decoder 1403, a cross correlator 1408, an optional subcarrier demodulator 1424, an optional low-pass filter 2449 and an optional controller (not shown), such as a microprocessor.

The coherence-multiplex radio receiver is a homodyne receiver with a cross correlator 1408 front end. The cross correlator 1408 coherently converts a received wideband signal (such as an electromagnetic pulse train) to a baseband signal in one stage. A multicarrier implementation of the coherence-multiplex receiver integrates multiple carrier signals to recover each bit of the transmitted information. An impulse-radio implementation of the coherence-multiplex receiver (which is a multicarrier implementation in which the carriers are time-domain pulses) integrates multiple pulses to recover each bit of the transmitted information. The receiver performs a correlating, synchronous receiving function (at the RF level) that uses a statistical sampling of many pulses to recover the transmitted information.

At the coherence-multiplex radio receiver, at least one diversity-decoded signal is separated from the received signal. The diversity-decoded signal has a waveform that matches the waveform of the desired encoded information signal. A diversity-decoded signal may be a copy of the desired encoded signal or it may be a decode signal. The diversity-decoded signal is positioned in time and cross correlated with the received radio signal. The cross-correlation output is integrated and then demodulated (if necessary) to remove any subcarriers.

Figure 52A:
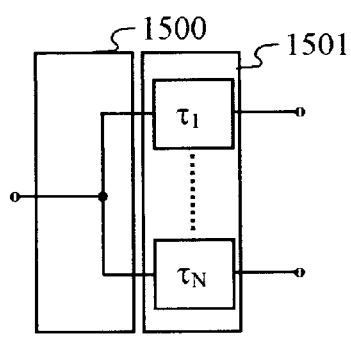
FIG. 52A illustrates an embodiment of a diversity decoder.
Figure 52B:
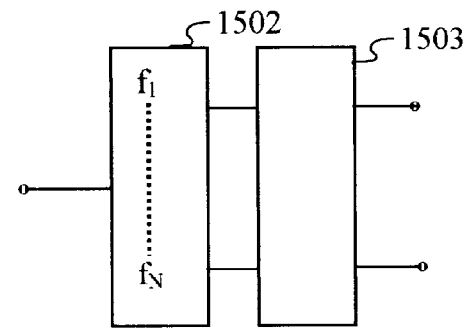
FIG. 52B illustrates an alternative embodiment of a diversity decoder.
Figure 52C:
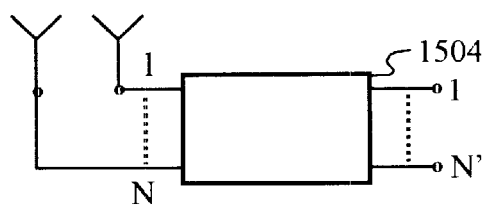
FIG. 52C shows an alternative embodiment of a diversity decoder.

FIG. 52A through FIG. 52E show various embodiments of a diversity decoder 1403. A simple diversity decoder 1403 is shown in FIG. 52A. An input signal is separated into N signals and provided with differential delays by a time-offset system 1501. FIG. 52B shows an embodiment of a diversity decoder 1403 in which an input signal is separated into a plurality N of frequency components by a filter bank 1502. An optional demodulator 1503 may remove information signals or encoded information signals from the frequency components. A variable delay may be applied to one or more of the components to enhance cross correlation. FIG. 52C shows a diversity decoder 1403 comprising an antenna array having a plurality of antennas 1402*a* to 1402N and a spatial demultiplexer 1504. The spatial demultiplexer 1504 generates a plurality of output signals representing spatial channels. These channels may contain at least one instance of an encoded information signal and a decode signal.

Figure 52D:
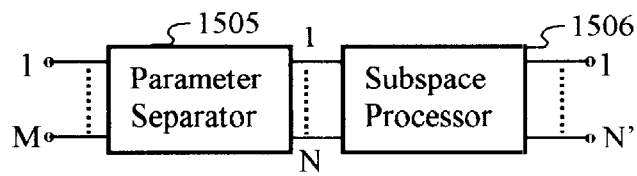
FIG. 52D illustrates an alternative embodiment of a diversity decoder.

FIG. 52D shows a diversity decoder 1403 that uses a sub-space processor 1506 or some other type of multi-user detector. A diversity-parameter separator 1505 separates one or more received signals with respect to different values of at least one diversity parameter. One or more interfering signals may be present in at least one of the separated signals. The sub-space processor 1506 extracts one or more desired signals from at least one non-interfering subchannel of the at least one diversity parameter. A subchannel is any subspace of a diversity parameter obtained by a multi-user and/or multi-channel detection technique, such as interference cancellation.

Figure 52E:
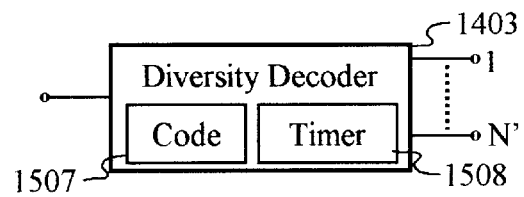
FIG. 52E illustrates an alternative embodiment of a diversity decoder.

FIG. 52E shows a diversity decoder 1403 having a code generator 1507 and a timer 1508. The diversity decoder 1403 may decode a time-dependent diversity-encoded signal. For example, a transmitter (not shown) may provide time-dependent diversity encoding to one or more transmitted signals. The code generator 1507 provides a code signal that controls the diversity decoder 1403. The code signal is typically the same code or the complex conjugate of the code used to encode one or more of the transmitted signals. The timer 1508 controls the timing of the code signal to optimize decoding. The timer 1508 may be controlled by a feedback signal from a feedback network (not shown) to optimize recovery of an encoded information signal. An impulse-radio receiver (hereafter called the receiver) 1400 includes an antenna 1402 for receiving a propagated impulse radio signal. The received signal is input to a cross correlator 1408.

Figure 53:
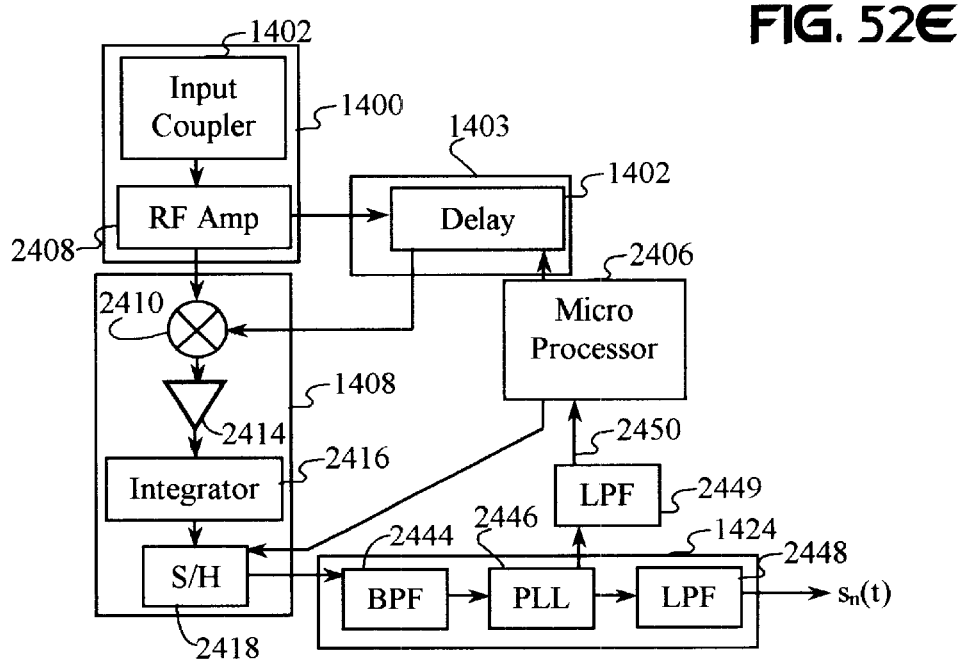

FIG. 53 shows another embodiment of a coherence-interferometry radio receiver. The receiver illustrated in FIG. 53 comprises a cross correlator 1408, a subcarrier demodulator 1424, an input coupler 1400 including an antenna 1402, a variable-delay device 1402 implemented as a diversity decoder, and a microprocessor 2406.

According to this embodiment, a transmitted signal $s_n(t)$ and at least one delayed transmitted signal $s_n(t+\tau)$ and/or at least one delayed decode signal $d_n(t+\tau)$ are received by the antenna 1402, which passes the received signal to an RF amplifier 2408. The RF amplifier 2408 amplifies and passes the received signal to the cross correlator 1408.

The cross correlator 1408 can include a multiplier 2410, an amplifier 2414, an integrator 2416, and a sample-and-hold unit 2418. The sample-and-hold unit 2418 may include a timer (not shown) that generates timing signals to control sampling. The timer (not shown) may have properties (e.g., frequency, shape, width, and delay) of its timing signals controlled by the microprocessor 2406.

The multiplier 2410 may be a double-balanced mixer adapted to operate in the linear mode. The multiplier 2410 linearly multiplies the received transmit signal $s_n(t)$ with at least one delayed signal $s_n(t+\tau)$ and/or $d_n(t+\tau)$ received by the input coupler 1400. A product signal of the multiplier 2410 is buffered by amplifier 2414 and then integrated over time by integrator 2416. The integrator 2416 is essentially a low-pass filter of first order that is adapted to respond on a time scale similar to the width of a component of the received signal $s_n(t)$. Integrator 2416 outputs a signal to the sample-and-hold unit 2418, which holds the peak value of the signal.

The timer (not shown) may be delayed for proper triggering of the sample-and-hold unit 2418. The timer (not shown) may be delayed to compensate for delay caused by the multiplier 2410, and the amplifier 2414, and for integrator 2416 settling time.

Either a decode signal (such as decode signal $d_n(t+\tau)$) or a diversity encoded (e.g., delayed) transmit signal (such as delayed signal $s_n(t+\tau)$) may be used to decode the received transmit signal $s_n(t)$. According to one embodiment of the receiver, the decode signal $d_n(t+\tau)$ is received from the communication channel and delayed by the variable-delay device 1402 before being combined in the multiplier with the received transmit signal $s_n(t)$.

The microprocessor 2406 may vary the delay of the delay device 1402 to optimize correlation of the received signals $s_n(t)$ and $d_n(t+\tau)$. The delay device 1402 may provide more than one delay in order to correlate more than two received signals. The delay(s) $\tau$ may vary in time relative to changes in the communication channel (not shown), the receiver, and/or a transmitter (not shown). The microprocessor 2406 may employ a feedback loop 2450 to track these changes and adjust the delay device 1402 accordingly. The microprocessor 2406 may control the delay of the delay device 1402 relative to a predefined code that characterizes a coded delay applied to the transmitted signals (such as the transmitted signals $s_n(t)$ and $d_n(t+\tau)$) by a transmission system (not shown).

In this example, the subcarrier demodulator 1424, comprises a bandpass filter 2444, a phase-locked loop 2446, and a low-pass filter 2448. Additional subcarrier demodulators (not shown) may be used to separate additional modulated subcarrier signals having the same diversity characteristics of the signal $s_n(t)$ and one or more of its associated signals $d_n(t+\tau)$ and/or $s_n(t+\tau)$.

In an FM subcarrier embodiment, a phase-locked loop frequency demodulator is used. The characteristics of the phase-locked loop 2446 determine the bandwidth capture and other basic aspects of the received signal. The optional bandpass filter 2444 can be used in series before the phase-locked loop 2446 to narrow the spectrum of demodulation performed by the phase-locked loop 2446.

In this case, bandpass filter 2444 outputs a filtered signal to the phase-locked loop 2446. The phase-locked loop 2446 outputs an in-phase estimate signal via a further low-pass filter 2449 to the microprocessor 2406. The in-phase estimate signal provides the microprocessor 2406 with an estimate of the amplitude of the subcarrier so that the microprocessor 2406 can assess the quality of signal lock. A demodulated output signal of the phase-locked loop 2446 is filtered by low-pass filter 2448, which outputs a demodulated information signal.

Additional subcarrier modulation is achieved according to another aspect of the invention using pseudo Manchester coding of digital data. It is referred to as "pseudo" because conventional Manchester coding performs digital decoding. According to the present invention, however, decoding of Manchester encoded signals is performed in the analog domain. The pseudo-Manchester encoding shifts digital information from the baseband to a frequency equivalent to an integral sub-multiple of the adjustable time base, or integer multiples of the time base. This achieves a coherent shift of digital data for proper recovery in the impulse radio receiver.

5. CI-CDMA

5.1. CI-CDMA Overview

FIG. 54A shows a pulse envelope 186 representing a pulse-shaped carrier signal 188 that is shifted by 180 degrees from a pulse envelope 187 representing a pulse-shaped carrier signal 189 shown in FIG. 54B. Although a 180-degree relative phase shift is shown, differential phase shifts other than 180 degrees may be provided.

FIG. 55A shows a monocycle pulse 196 having a 180-degree relative phase shift from a monocycle pulse 197 shown in FIG. 55B. Although a 180-degree relative phase shift is shown, differential phase shifts other than 180 degrees may be provided.

FIG. 56A shows a plurality of weighted waveform components (or carriers) 105 that, when combined, form a superposition signal 110A. A superposition envelope signal 110B, which is an envelope of the superposition signal 110A is shown in FIG. 56B. In this case, the superposition signal 110B is part of a $k^{th}$ user's direct-sequence CDMA code. The superposition signal 110B is a high-rate signal having a short chip period $T_c$ and a long chip-code period $NT_c$ (where N is the number of chips). The chip-code period $NT_c$ is determined by the frequency spacing $f_s$ of the carriers: $NT_c=1/f_s$. A symbol period $T_s$ is typically equal to the chip-code period $NT_c$. The weights $\beta'_n(k)$ applied to the waveform components 105 can be constant with respect to time. Thus, the clock speed required to generate an information-encoded CDMA signal having a chip rate $f_c=1/T_c$ is approximately $f_c/N=1/NT_c$. An information-signal duration is represented by a timeline 108 shown in FIG. 56A.

Any type of time-domain spread-spectrum signal can be created using a superposition of weighted carrier signals, such as carriers 105. Individual pulses that are closely spaced, distantly spaced, overlapping, uniformly spaced, and/or non-uniformly spaced (i.e., variable-time offset) may be generated by combining multiple carrier signals into a superposition signal, such as the superposition signal 110A. Uniformly spaced-in-frequency carrier signals produce a periodic superposition signal. Thus, constant weights $\beta'_n(k)$ applied to the waveform components 105 can provide a repetitive coded signal, such as a CDMA code signal. PCT Appl. No. PCT/US99/02838, which is hereby incorporated by reference, shows a CDMA signal resulting from a superposition of weighted carrier signals.

FIG. 57A shows a plurality of weighted waveform components (or carriers) 105*a* to 105N that, when combined, form a direct-sequence spreading code (illustrated by a superposition signal shown in FIG. 57B that is a portion of a DS-CDMA signal). In this case, each of the waveform components 105*a* to 105N is a time-offset pulse having a period of $NT_c$. The periodic waveform components 105*a* to 105N can each be created using a superposition of signals having a frequency offset of $f_s=1/NT_c$. Each of the waveform components 105*a* to 105N comprises a chip in the $k^{th}$ user's direct-sequence CDMA code wherein the CDMA code values $\beta_n(k)$ are applied directly to the waveform components 105*a* to 105N. Thus, the clock speed required to generate an information-encoded CDMA signal having a chip rate of $1/T_c$ is approximately $1/NT_c$.

CI processing can be used to create complex time-domain signals (such as DS-CDMA signals) in either or both transmitters and receivers while requiring a low clock speed. CI processing may be used in receivers to generate a reference or decode signal that is cross correlated with a received signal. A received multicarrier or wideband signal may be separated into multiple carrier components (with respect to at least one diversity parameter). The multiple-carrier components may then be processed to recover an embedded information signal, remove interference, and/or perform multi-user detection.

FIG. 58A shows a portion of a plurality of time-offset multiplex code signals 106*a* to 106N corresponding to a plurality of users and/or communication channels. In this case, the signals 106*a* to 106N have the same time-offset multiplex code. However, the signals 106*a* to 106N each have a unique phase-shift modulation code. The phase-shift modulation code is a user-specific phase-shift sequence corresponding to a code-chip sequence $\beta_j(k)$, where j=1, ..., M, and M is the number of time-offset multiplex code chips. The phase-shift modulation code enables multiple users having the same time-offset multiplexing code to be supported. Similarly, multiple users having the same phase-shift modulation code may be accommodated if those users have unique time-offset multiplexing codes. Time-offset multiplexing includes pulse-position modulation, such as pulse-position modulation protocols described in U.S. patents assigned to Time-Domain Systems Inc.

The signals 106*a* to 106N are shown with a binary phase shift key coding sequence. However, other types of coding modulation may be employed, including, but not limited to, differential phase-shift modulation, M-ary PSK, continuous phase-shift modulation, all types of frequency modulation, all types of amplitude modulation, all types of polarization modulation, and time-division multiplexing. Multiple types of modulation may also be employed. Although a two-dimensional coding structure (time-offset multiplexing and binary phase-shift key multiplexing codes) is illustrated by FIG. 58A and described herein, other multi-dimensional coding structures may be used without departing from the spirit and scope of the invention. These multi-dimensional coding structures may comprise more than two dimensions.

FIG. 58B illustrates a pulse-position modulation protocol that may be used with the present invention. A center position 199B may correspond to a pulse position (such as pulse positions 107A to 107E shown in FIG. 58A) of a time-offset multiplexing code. Information modulated onto the time-offset multiplexing code causes a time offset of one or more of the code pulses. Either or both the direction and magnitude of the time offset can convey the information. A binary information signal is represented by pulses 198A and 198B. A negative time offset 199A may correspond to one value of a binary data bit and a positive time offset 199B may correspond to the data bit's other possible value.

5.2. CI-CDMA Signal-generation Methods

FIG. 59 shows a method for generating a CI transmission signal that includes generating 401 a multicarrier signal having a predetermined phase relationship, impressing 402 an information signal onto the multicarrier signal, combining 403 the multicarrier signal components to produce a CI signal, and coupling 404 the CI signal into a communication channel.

FIG. 60 shows a procedural description of a CI-CDMA transmitter. CI-pulse generation 410 involves generating 411 a multicarrier signal that is combined 412 into a modulated superposition pulse having a pulse shape h(t):

$$|h(t)| = \left| A \cdot \frac{\sin\left(\frac{1}{2} N 2\pi \Delta f t\right)}{\sin\left(\frac{1}{2} 2\pi \Delta f t\right)} \right|$$

To transmit an $i^{th}$ chip, an $i^{th}$ value of a spreading sequence $\beta_i(k)$ (where $\beta_i(k)=\pm 1$) is modulated by a CI pulse-shape filter 413, $h(t-iT_c)$. User k's transmission signal is:

$$s^k(t) = b_k \sum_{i=0}^{N-1} \beta_i^{(k)} \sum_{n=0}^{N-1} \cos(2\pi\omega_c t + 2\pi n \Delta f(t - iTc))g(t)$$

where $b_k$ is a data bit for the $k^{th}$ user and g(t) is a unit-amplitude rectangular waveform having a duration of $T_s$. The expression for $s_k(t)$ can be written as:

$$s_k(t) = b_k \sum_{i=0}^{N-1} \beta_i^{(k)} \sum_{n=0}^{N-1} \cos(2\pi\omega_c t + 2\pi n \Delta f t - ni2\pi/N)g(t)$$

where $T_c \Delta f = T_c/T_s = 1/N$. The total transmitted signal for K users is:

$$S(t) = \sum_{k=0}^{K-1} b_k \sum_{i=0}^{N-1} \beta_i^{(k)} \sum_{n=0}^{N-1} \cos(2\pi\omega_c t + 2\pi n \Delta f t - ni2\pi/N)g(t)$$

The time-shifted pulses are orthogonal to each other:

$$\int_0^{Ts} h(t - pTc)h(t - qTc) dt = 0 \quad (p \neq q).$$

The chips $h(t-iT_c)$ can be created by phase offsetting each $n^{th}$ carrier of the pulse h(t) by $2\pi n/N$.

FIG. 61A illustrates a method of using low-rate parallel processing to generate a high-rate DS-CDMA signal having an underlying CI architecture. A pulse-generation step 421 provides a plurality of time-offset pulses. The pulse-generation step 421 may include any pulse-generation technique. A modulation step 422 provides the individual pulses with a weight indicative of a code (such as a DS-CDMA code) or a combined information signal and code. A weight may be a chip value of a DS-CDMA code or an information bit combined with a DS-CDMA code. A combining step 423 combines the modulated pulses to produce a higher-frequency time-domain signal.

FIG. 61B and FIG. 61C illustrate different embodiments of a low-rate parallel-processing method that produces a high-rate DS-CDMA signal. A modulation step 424 is shown in which an information signal is modulated (or otherwise impressed) onto the pulses.

FIG. 62A shows a method of using low-rate parallel processing to generate a high-rate DS-CDMA signal having an underlying CI architecture. A multicarrier-generation step 431 provides a plurality of multi-frequency carrier signals. The carrier signals may be uniformly spaced in frequency by an amount $f_s$. A weighting step 432 provides a plurality of weights to a plurality of the carrier signals. A combining step 433 generates a superposition of the weighted carriers, resulting in a time-domain spread-spectrum signal, such as a DS-CDMA signal.

The weights may represent a spreading code, such as a set of weights required to create a superposition signal having a predetermined DS-CDMA code. The code of the applied weight values may be different than the DS-CDMA code indicated by the time-domain superposition signal. The weights may represent a coded information signal.

FIG. 62B shows an embodiment of a parallel-processing method that generates a high-rate DS-CDMA signal. Steps shown in FIG. 62B, FIG. 62C, and FIG. 62D are similar to the steps shown in FIG. 62A except for an information-modulation step 434. In FIG. 62B, the information-modulation step 434 modulates (or otherwise impresses) an information signal onto the carrier signals prior to the weighting step 432. In FIG. 62C, the information-modulation step 434 is performed after the carriers are combined 433. In FIG. 62D, the information-modulation step 434 is performed after weighting 432 and prior to combining 433.

5.3. CI-CDMA Systems

5.3.1. CI-CDMA Transmission Systems

FIG. 63A shows a CI-CDMA transmission system comprising a timing system 501, a CI system 502, an information source 503, and a transmission module 504. The CI system 502 includes a multicarrier generator 510, a code source 512, a multicarrier modulator 511, and a combining system 513.

The timing system 501 may provide timing signals to one or more components in the transmission system, such as the information source 503, the code source 512, and the multicarrier generator 510. A microprocessor (not shown) may be used to control functions of one or more components, such as the timing system 501, the information source 503, the code source 512, the modulator 511, the combining system 513, and the multicarrier generator 510. The multicarrier generator 510 generates a plurality of carrier signals that, when combined, produce a superposition signal having wideband characteristics. The multicarrier generator 510 may be any type of signal generator that produces a plurality of signals that are distinguishable from each other with respect to at least one diversity parameter. The multicarrier generator 510, as well as the information source 503, the timing source 501, and any of the other components in the CI system 502 may be implemented in hardware, software, and/or firmware.

The information source 503 provides at least one information signal to the CI generator 502 wherein the information signal is modulated (or otherwise impressed) onto the multicarrier signal. The code source may provide static or dynamic weights to the multicarrier components in order to provide a coded superposition signal. The transmission module 504 may be any type of output coupler adapted to couple the superposition signal into a communication channel (not shown).

An embodiment of a transmission module (such as the transmission module 504) is shown in FIG. 64. A filter bank 515 separates a transmission signal into a plurality of narrowband components. An array-processor system 517 processes each narrowband component, providing beam-forming and/or spatial-interferometry weights to each narrowband component. The weighted narrowband components are coupled to a plurality of antennas 518a to 518N to generate predetermined beam patterns or spatial-interferometry patterns.

FIG. 63B shows an embodiment of the CI-CDMA transmission system shown in FIG. 63A wherein the information source 503 is coupled to the code source 512. FIG. 63C shows an embodiment of the transmission system shown in FIG. 63A wherein the information source 503 is coupled to the multicarrier generator 510. FIG. 63D shows an embodiment of the CI-CDMA transmission system shown in FIG. 63A wherein the information source 503 is coupled to the multicarrier modulator 511. FIG. 63E shows an embodiment of the CI-CDMA transmission system shown in FIG. 63A wherein the information source 503 modulates the superposition signal.

FIG. 65A shows a CI-CDMA transmission system that includes a timer system 501, an information source 503, a code source 512, a multicarrier-signal generator 510, a multicarrier modulator 511, a combiner 513, and a transmission module 504. The timer system 501 may provide a timing signal to the information source 503 that controls the rate at which an information signal is applied to the code source 512. An information signal may be coded and/or modulated onto a subcarrier. The timer system 501 may provide a timing signal to the code source 512 that controls the rate at which an information-bearing code is applied to the multicarrier modulator 511. The timer system 501 may provide a timing signal to the multicarrier-signal generator 510 to control the frequency of pulses produced by a pulse generator 521. The pulses may, optionally, be filtered by a filter 522.

The pulses are delayed by a delay device 523 that generates a plurality N of delayed pulses. The relative delay between pulses may be substantially equal to a pulse width or half width. Each pulse is modulated in the modulator 511 with a code weight or an information-bearing code weight before being combined in the combiner 513 and transmitted by the transmission module 504.

A transmission module, such as the transmission module 504, may include one or more signal-processing systems including, but not limited to, amplifiers, filters, up converters, mixers, analog-to-digital converters, digital-to-analog converters, integrators, combiners, rectifiers, LOs, and modulators.

FIG. 65B shows a CI-CDMA transmission system that includes a timer system 501, an information source 503, a code source 512, a multicarrier-signal generator 510, a multicarrier modulator 511, a combiner 513, and a transmission module 504. The timer system 501 may provide a timing signal to the information source 503 that controls the rate at which an information signal is applied to the code source 512. The timer system 501 may provide a timing signal to the code source 512 that controls the rate at which an information-bearing code is applied to the multicarrier modulator 511. The timer system 501 may provide a timing signal to the multicarrier-signal generator 510 to control the frequency of pulses produced by a plurality N of pulse generators 521a to 521N.

A delay network 523a to 523N generates a plurality N of delayed timing signals. The relative delay between the timing signals may be substantially equal to the pulse width of the pulses generated by the pulse generators 521a to 521N. Thus, the generated pulses are separated by a pulse width. The pulses may optionally be filtered by a filter 522, such as a plurality of filters 522a to 522N. Each pulse is modulated in the modulator 511 with a code weight or an information-bearing code weight before being combined in the combiner 113 and transmitted by the transmission module 504.

FIG. 66A shows a CI-CDMA transmission system that includes a timer system 501, an information source 503, a code source 512, a multicarrier-signal generator 510, a multicarrier modulator 511, a combiner 513, and a transmission module 504. The timer system 501 may provide a timing signal to the information source 503 to control the rate at which an information signal is applied to the code source 512. The timer system 501 may provide a timing signal to the code source 512 to control the rate at which an information-bearing code is applied to the multicarrier modulator 511. The timer system 501 may provide a timing signal to the multicarrier-signal generator 510 to control the frequency of pulses produced by a pulse generator 521.

The pulses are separated by a filter 522 into a plurality of different-frequency carrier signals. The filter 522 may be a filter bank implemented in hardware, software, and/or firmware. The filter 522 may attenuate or otherwise remove predetermined carrier signals generated by the pulse generator 521. The carrier signals are modulated with a set of code weights or information-bearing code weights. The modulated carrier signals are combined in a combining circuit 513 and coupled into a communication channel (not shown) by a transmission module 504.

FIG. 66B shows a CI-CDMA transmission system that includes a timer system 501, an information source 503, a code source 512, a multicarrier-signal generator 510, a multicarrier modulator 511, an array-processing system 517, and an antenna array 518.

The generation of modulated carrier signals is described with reference to FIG. 66A. Each modulated carrier signal is processed by one of a plurality of array processors 517a to 517N. The array-processing system 517 provides a plurality of beam-forming and/or spatial-interferometry weights to each carrier signal. The weighted carrier signals are coupled to the antenna array 518 to generate predetermined beam patterns or spatial-interferometry patterns corresponding to each carrier signal.

5.3.2. CI-CDMA Receiver Systems

FIG. 67A shows an embodiment of CI receiver configured to operate with DS-CDMA. A plurality N of chip receivers 405a to 405N process each time-domain chip separately before combining the processed chips in a DS-CDMA combiner 415. An output signal from the combiner 415 is processed by a decision system 417.

FIG. 67B shows an embodiment of one of the chip receivers 405n. Each carrier of a chip is down converted to baseband by a down-converter system 407a to 407(N−1). Each baseband signal is processed (e.g., integrated or sampled) over a symbol duration $T_s$ by an integrator (or sampling circuit) 414a to 414(N−1). The symbol duration $T_s$ is typically substantially longer than the chip duration $T_c$. The processed baseband signal are combined in a combiner 416.

In a Rayleigh frequency-selective slow fading channel, each multi-frequency carrier comprising the CI-CDMA signal experiences a unique flat fade. The received signal is represented as:

$$r(t) = \sum_{k=0}^{K-1} b_k \sum_{i=0}^{N-1} \beta_i^{(k)} \sum_{n=0}^{N-1} \alpha_n \cos(2\pi\omega_c t + 2\pi n \Delta f t - ni2\pi/N + \phi_n) g(t) + n(t)$$

where $\alpha_n$ is a gain and $\phi_n$ is a phase offset of an $n^{th}$ carrier of a CI pulse resulting from fading, and n(t) is additive white Gaussian noise. Assuming exact phase synchronization, a decision variable resulting from a received multi-frequency carrier component of each received chip is expressed by:

$$r_{m,n} = \sum_{k=0}^{K-1} b_k \sum_{i=0}^{N-1} \beta_i^{(k)} \alpha_n \cos(nm2\pi/N - ni2\pi/N) + n_{m,n}$$

The CI-CDMA receiver for an $l^{th}$ user detects an $m^{th}$ chip at each carrier as shown in FIG. 67B. The $m^{th}$ chip is separated into its N carrier components. Each chip and each carrier contribute a decision variable $r_{m,n}$ corresponding to $$r_{m,n} = b_l \beta_i^{(k)} \alpha_n + b_l \alpha_n \sum_{k=0}^{N-1} \beta_i^{(l)} \cos(nm2\pi/N - ni2\pi/N)$$

-continued $$+ \sum_{\substack{k=0 \\ k \neq l}}^{K-1} b_k \beta_m^{(k)} \alpha_n + \sum_{\substack{k=0 \\ k \neq l}}^{K-1} b_k \alpha_n \sum_{\substack{i=0 \\ i \neq m}}^{N-1} \beta_i^{(k)} \cos(nm2\pi/N - ni2\pi/N) + n_{m,n}$$

The first term represents the contribution from user l, carrier n, and chip m. The second term represents the other N−1 chips of the user l. The third term represents interference due to the $m^{th}$ chip of other users. The fourth term represents interference from user l's other N−1 chips. The fifth term is a zero-mean Gaussian random variable with variance $\sigma_n^2 = N_0/2$. The terms, $n_{m,n}$, are correlated across chips, but not across carriers.

The covariance matrix of the vector noise $(n_{0,n}, n_{1,n}, n_{2,n}, \ldots n_{N-1,n})$ corresponding to a fixed carrier number n and a variable chip number m is:

$$C_n = \frac{N_0}{2} \begin{pmatrix} 1 & \cos(2\pi/N) & \cos(2*2\pi/N) & \cdots & \cos(N-1)*2\pi/N \\ \cos(2\pi/N) & 1 & \cos(2\pi/N) & \cdots & \cos(N-2)*2\pi/N \\ & & \vdots & & \\ \cos(N-1)*2\pi/N & & & \cdots & 1 \end{pmatrix}$$

Multi-frequency carrier combining is used to combine the $r_{m,n}$'s across the carriers, as indicated by the functionality shown in FIG. 67B. This results in frequency-diversity benefits when recreating each chip and removal of the second and fourth interference terms (which represent inter-chip interference).

Orthogonality Restoring Combining (ORC) may be used to remove the second and fourth interference terms. Each $r_{m,n}$ term is scaled by $\alpha_n$ and summed over n to provide a decision variable $R_m$ for an $m^{th}$ chip:

$$R_m = \sum_{n=0}^{N-1} r_{m,n} \cdot 1/\alpha_n$$

However, ORC can result in substantial noise enhancement. Thus, ORC is most suitable for low-noise conditions (i.e., high signal-to-noise).

Equal Gain Combining (EGC) is preferable for low signal-to-noise. EGC combines the N carrier terms for the $m^{th}$ chip according to:

$$R_m = \sum_{n=0}^{N-1} r_{m,n}$$

Minimum Mean Square Error Combining (MMSEC) minimizes the second term and the fourth term and optimizes frequency diversity while minimizing the noise. Using multi-carrier MMSEC provides a decision variable $R_m$ for an $m^{th}$ chip:

$$R_m = \sum_{n=0}^{N-1} r_{m,n} \cdot (\alpha_n / (K\alpha_n^2 + N_0))$$

A final decision variable $D_l$ for user l results from a typical DS-CDMA combining technique across chips, which eliminates multi-user interference. Each chip's decision variable $R_m$ is multiplied by an $m^{th}$ spreading code $\beta_m^{(l)}$ and combined:

$$D_l = \sum_{m=0}^{N-1} R_m \beta_m^{(l)}$$

The orthogonal cross-correlation between spreading codes of different users minimizes the multi-user interference.

Channel simulations show dramatically improved bit-error rate (BER) performance when a CI architecture is applied to a conventional DS-CDMA system. Because CI exploits frequency-diversity benefits that are inherent in multi-carrier pulse shaping, CI does not require a RAKE receiver.

The Hilly Terrain (HT) multipath-fading channel (from the COST-207 GSM standard) was used to evaluate the performance of the CI-CDMA system. the HT channel represents a two-path Rayleigh-fading channel. The average power of the second path is 4.25 dB lower than the first. The channel model includes a chip duration of $T_c=3.69$ $\mu s$ and a bit rate of 270.8 kbit/sec.

FIG. 68 and FIG. 69 show BER versus SNR performance for a CI-CDMA system, a conventional DS-CDMA system that uses a RAKE receiver, and an MC-CDMA system. Each system uses Hadamard-Walsh codes and has a processing gain of 32. The dotted line (marked with solid circles) represents the CI-CDMA system, the dashed line (marked with stars) represents the benchmark DS-CDMA system, and the solid line (marked with x's) represents the MC-CDMA system. All systems support 32 users.

In FIG. 68, the CI-CDMA and MC-CDMA systems employ MMSEC combining. DS-CDMA's BER floor, which is due to multiple-access interference, severely limits its performance. The CI-CDMA system with MMSEC combining suppresses this floor. By employing frequency diversity, CI-CDMA achieves equivalent BER performance to MC-CDMA with MMSEC combining.

FIG. 69 shows a comparison of BER results for a CI-CDMA system with EGC combining, traditional DS-CDMA, and MC-CDMA with EGC combining. CI-CDMA with EGC combining achieves results similar to MC-CDMA with EGC combining. This BER performance is much better than DS-CDMA.

A major drawback to conventional multicarrier techniques, such as MC-CDMA, is high susceptibility to phase jitter and frequency offsets. FIG. 70 illustrates how CI is substantially unaffected by even severe phase offsets. Similarly, FIG. 71 illustrates how CI is unsusceptible to severe frequency offsets.

Complexity is another drawback to conventional multi-carrier techniques. CI not only offers less complexity than other multicarrier techniques, but it also provides reduced complexity to non-multicarrier systems. When used as an underlying architecture in non-multicarrier protocols (such as CDMA and TDMA), CI provides the capacity and signal-quality benefits of a multicarrier protocol and reduces system complexity by enabling parallel processing, direct down-conversion, direct up-conversion, and digitally controlled RF processing.

FIG. 72 shows a correlation receiver that may be used to process CI-CDMA signals. The correlation receiver includes a channel coupler 1402 coupled to a communication channel (not shown). An amplifier 2408 may be used to amplify received signals. An adjustable time base 2404 controls the generation of a decode signal by a decode-signal generator 2402. The decode signal is correlated with the received signal in a cross correlator 1408. An embodiment of the cross correlator 1408 includes a multiplier 2410, an amplifier 2414, an integrator 2416, and a sample-and-hold module 2418. Correlated signals maybe demodulated (if necessary) in an optional demodulator 1424. A feedback loop 2450 to a microprocessor 2406 may be used to adjust system components, such as the adjustable time base 2404, decode-signal generator 2402, and/or the sample-and-hold module 2418. For example, timing of the decode signal may be adjusted to optimize cross correlation. Timing of the sample-and-hold module 2418 may be adjusted to compensate for delay resulting from the amplifier 2414 and the integrator 2416.

FIG. 73A shows a generalized embodiment of a decode-signal generator 2402. A timer input terminal 2402t accepts a timing signal from a time base (not shown). The timing signal provides control to a multicarrier generator 610. The timing signal may optionally control a code source 612. The multicarrier generator 610 generates a multicarrier signal that is coupled to a modulator 611 and modulated with a set of weights generated by a code source 612. The modulated multicarrier signals are combined in a combining system 613 and output to a cross correlator (not shown) via an output terminal 2402o.

Components of the decode-signal generator 2402 may be implemented in hardware, software, and/or firmware. For example, the function of the multicarrier generator 610 may be implemented by a microprocessor using one or more transform techniques, such as an FFT or an IFFT. The multicarrier generator 610 may be implemented as an ensemble of one or more switches and/or digital circuits. The multicarrier generator 610 may be implemented as an ensemble of carrier-signal generators.

The code source 612 may provide static or dynamic weights to the modulator 611. The weights are modulated or otherwise impressed onto individual carrier signals. The weights may be selected to provide one or more predetermined time-domain signal characteristics to the combined signal.

FIG. 73B shows an embodiment of a decode-signal generator 2402. A multicarrier generator 610 provides a plurality of different-frequency carrier signals. The multicarrier generator 610 includes a pulse generator 621 that generates a wideband signal. The wideband signal may be a continuous signal in the frequency domain or it may be comprised of a plurality of narrowband components. The pulse generator 621 may be controlled by a periodic timing signal, which causes the output spectra of the pulse generator to be a comb in the frequency domain. A plurality of different-frequency carrier signals is selected by a filter, such as a filter bank 622.

FIG. 73C shows an alternative embodiment of a decode-signal generator 2402. A multicarrier generator 610 provides a plurality of time-domain pulsed carrier signals. The multicarrier generator 610 accepts a timing signal that is duplicated and provided with incremental delays by a delay network 630a to 630N. The incrementally delayed timing signals trigger a plurality of pulse generators (such as switches 631a to 631N) that produce a plurality of time-offset pulses. The pulses are weighted in a modulator 611 with weights generated by a code source 612. The weights may represent chips $\beta_m^{(i)}$ of a direct-sequence spreading code since the combined signal has the time-domain characteristics of the direct-sequence code.

An alternative embodiment of a decode-signal generator 2402 is shown in FIG. 73D. A single switch 631 generates a pulse that is duplicated and provided with incremental delays by a delay network 630a to 630N. The time-offset pulses are weighted in a modulator 611 with weights generated by a code source 612 in the same manner as described with respect to FIG. 73C.

6. Interferometry-assisted Tunneling

Pair production is the formation or materialization of a particle and an anti-particle (such as an electron and a positron) from a pulse of electromagnetic energy traveling through matter, usually in the vicinity of an atomic nucleus. A photon can decay into an electron-positron pair in the Coulomb field of a nucleus when the center of the momentum-frame energy exceeds the rest mass of the nucleus plus two electrons. Pair production is a direct conversion of radiant energy to matter and is one of the principal ways in which high-energy gamma rays are absorbed in matter. To produce an electron-positron pair, the photon energy must be at least 1.02 MeV. Photon energy in excess of this amount is converted into motion of the electron-positron pair. The total probability for pair production over a path δx is:

$$P_p = \int_{m_e}^{k} \Phi(E_+, k) \delta E_+$$

where k is the energy of the incident photon, $E_+$ is the energy of the produced positron, and $m_e$ is the electron mass.

Because pair production cannot occur without the presence of another particle, this suggests that this catalyzing particle may change the relative phases of the incident photon's component waveforms to generate at least one coherent superposition indicative of the electron-positron pair. It is the interaction of the component waves of the incident photon with the potential well (or the component waves of the catalyzing particle, which defines the potential well) that changes the state $\Psi(x_i, \Phi_j)$ of the photon to that of an electron-positron pair.

In resonant tunneling, the quantized energy levels of a potential well are matched to the energy of incident particles outside of the well to stimulate tunneling. In essence, the component waveforms of the well are adjusted in frequency to initiate a resonance with the waveforms of the desired particle. When two or more systems share the same natural frequencies, coupling of energy between the systems results in forced vibrations.

Each set of waveforms is coupled with other sets of waveforms, as demonstrated by quantum entanglement. Thus, energy is transferred between the sets. If the resonant frequencies of two or more waveform sets are similar (i.e., the waveform sets share one or more resonant frequencies), then coupling between waveforms causes phase locking (i.e., each of the waveform sets can resonate in phase or at some other fixed-phase relationship). Thus, interaction between the waveforms occurs that changes the state $\Psi(x_i, \Phi_j)$ of the particle to a zero phase space inside the well. The interaction between the waveforms changes the state $\Psi(x_i, \Phi_j)$ of at least one set of the waveforms in order to maximize resonance.

In order to optimize resonance between sets of waveforms, state changes may be applied to one or more of the waveforms. These state changes may include one or more of the following: frequency changes, phase changes, amplitude changes, and position changes. These state changes may be effected by generating or otherwise applying a magnetic field, an electric field, and/or an electromagnetic field.

Since conventional physics treats energy states as a natural consequence of potential wells rather than waveforms that comprise a potential well, it is convenient to maintain this perspective to illustrate how state changes may be effected. Accordingly, state changes of a set of waveforms may be effected by causing or changing the nonlinear nature of a potential well defined by those waveforms.

In the case of an asymmetric potential well having a potential U(x) expressed by:

$$U(x) = \tfrac{1}{2}kx^2 - \tfrac{1}{3}m\epsilon x^3,$$

the equation of motion is:

$$\ddot{x} + \omega_o^2 x - \epsilon x^2 = 0,$$

where $\epsilon$ is a proportionality factor for the nonlinear term and $\omega_o$ is the resonant frequency of a linear oscillator having a force constant k and mass m. An approximate solution x(t) to this equation is obtained by a first-order perturbation calculation. If it can be assumed that a perturbation expansion of x(t) can be expressed as a power series in $\epsilon$, then:

$$x(t) \approx x_0 + \epsilon x_1 \text{ and } x_0(t) = A\cos\omega_o t$$

where A is the amplitude of xo(t). The solution for x(t) correct to first order in $\epsilon$ is:

$$x(t) = A\cos\omega_o t - \epsilon \frac{A^2}{6\omega_o^2}(\cos 2\omega_o t - 3).$$

Higher-order perturbation calculations introduce higher harmonics. The solution x(t) shows that the relative amplitudes of the different harmonics depend on both the nonlinearity term $\epsilon$ and the amplitude A of the fundamental oscillation. These terms can be controlled to provide desired proportions (even complex proportions) between different harmonics.

Using a method to remove secular terms (terms that are proportional to time) from higher-order approximations applied to a symmetric potential having an equation of motion:

$$\ddot{x} + \omega_o^2 x = \epsilon x^3$$

and a zero-order (or generating) solution: $x_o(t) = A\cos\omega t$ yields a second-order solution:

$$x(t) = \left(1 + \frac{\epsilon A^2}{32\omega^2} - \frac{\epsilon^2 A^4}{1024\omega^4}\right) A\cos\omega t - \frac{\epsilon A^2}{32\omega^2}\cos 3\omega t + \frac{\epsilon^2 A^5}{1024\omega^4}\cos 5\omega t$$

where frequency $\omega$ is:

$$\omega \cong \omega_o \left(1 - \frac{3A^2}{8\omega_o^2}\epsilon + \frac{3A^4}{256\omega_o^4}\epsilon^2\right)^{\tfrac{1}{2}}$$

In this case, the frequency spacing $\omega = 2\pi f_s$ is determined by a selection of the nonlinearity term $\epsilon$ and the amplitude A of the generating solution $x_o(t)$. The ratios of the harmonics depend on A, $\epsilon$, and $\omega$.

A nonlinear system generates combination tones resulting from the intermodulation of impressed tones having different frequencies. Proportions of harmonics and combination tones depend on the amplitudes and frequencies of the impressed tones and the system's resonant frequency $\omega_o$. Relative phase shifts introduced into the impressed tones may affect the relative phases and/or amplitudes of the solution x(t).

FIG. 74A illustrates a method for receiving and processing an information-modulated multicarrier signal. A first step 701 involves applying a field (such as a magnetic field, an electric field, or an electromagnetic field) to a potential well (such as a potential well 720 shown in FIG. 75A) to adjust one or more states $\psi(x_i,\Phi_j,f_k,A_l)$ of the well's component waveforms 725. The first step 701 is to create a coherent superposition of a plurality of waveforms 735 of a desired information-bearing signal within the potential well 720. The well 720 shown in FIG. 75A represents an initial condition in which at least part of the state $\psi(x_i,\Phi_j,f_k,A_l)$ of the waveforms 725 does not substantially match the state $\psi(x_e,\Phi_p,f_g,A_h)$ of the plurality of waveforms 735 of the desired information-bearing signal. For example, the frequencies $f_k$ and $f_g$ of the waveform sets may not substantially match. The first step 701 may be necessary only when a particular variable set of the states $\psi(x_i,\Phi_j,f_k,A_l)$ and $\psi(x_e,\Phi_p,f_g,A_h)$ such as the frequencies $f_k$ and $f_g$ do not substantially match. The first step 301 may include indirect ways of applying a field. The first step 701 may include alternative ways of adjusting at least one of the state variables of either or both of the states $\psi(x_i,\Phi_j,f_k,A_l)$ and $\psi(x_e,\Phi_p,f_g,A_h)$ such that a superposition of the waveforms 735 occurs inside of the potential well 720. This may involve making at least one set of the state variables (such as the frequencies $f_k$ and $f_g$) substantially similar.

FIG. 75B shows an adjustment 721 to the potential well 720 shown in FIG. 75A resulting from an applied field 730. At least one state variable of the well's 720 waveforms 725 substantially matches a corresponding state variable of the waveforms 735 comprising the desired information-bearing signal. In step 702, the resulting superposition of waveforms 735 is measured. The superposition contains an information signal that is measured, extracted, or otherwise determined in a demodulation step 703.

FIG. 74B illustrates a detailed method for receiving and processing an information-modulated multicarrier signal. The superposition step 701 shown in FIG. 74A is also shown in FIG. 74B, and it includes a reception step 710, a phase-shift step 711, and a combining step 712. The reception step 710 involves receiving a plurality of waveforms characterized by one or more predetermined diversity parameters. For example, the reception step 710 may use a filter bank (not shown) to acquire waveforms having a predetermined set of frequencies.

The reception step 710 may involve a resonant tunneling step (not shown) in which energy levels of the potential well 720 are matched to energy levels of a desired information-bearing set of waveforms 735. The resonant tunneling step (not shown), which may be effected by the application of an appropriate field, represents a type of frequency filtering in which only a set of waveforms (such as waveforms 735) having a matching set of state variables (such as the frequencies $f_k$ and $f_g$) are received.

The phase-shift step 711 involves shifting the relative phases of the component waveforms 735 from a non-zero phase space to a zero phase space. This step 711 occurs naturally as a result of resonant tunneling. The combining step 712 involves coherently combining the phase-shifted waveforms 735 to provide a coherent superposition of the waveforms 735 inside the potential well 720. This step 712 occurs as a result of resonant tunneling.

The measurement step 702 may include an optional interference-removal step 713 in which interfering signals are canceled or otherwise removed. This step 713 may involve multi-user detection. A measurement step 714 involves measuring at least one attribute (defined by at least one diversity parameter) of the superposition signal. The measurement step 714 may include any type of detection including, but not limited to, envelope detection and sampling.

The demodulation step 703 includes a decoding step 715 in which the measured signal is demodulated and/or decoded in order to obtain the information signal that was impressed upon the waveforms. The demodulation step 703 may include an optional interference-removal step 716 in which interfering signals are canceled or otherwise removed after decoding/demodulation.

FIG. 76 shows a transmission method of the present invention. A generation step 731 produces a plurality of waveforms that are modulated with an information signal in a modulation step 732. The modulation step 732 involves impressing the information signal onto the waveforms. Modulation may include the variation of at least one diversity parameter of the waveforms. The modulated waveforms are coupled into a communication channel in a coupling step 733. The communication channel may include one or more forbidden regions (potential barriers) between quantum wells.

FIG. 77 shows a communication system of the present invention. A transmission system 745 includes a modulator 740 that impresses an information signal (received from an information-signal source 741) onto a multicarrier signal comprised of a plurality of waveforms provided by a multicarrier-signal generator 742. A channel coupler 749 couples the modulated waveforms into a communication channel.

The channel coupler 749 may include a potential well and the communication channel may include at least one forbidden region (potential barrier) beyond the boundaries of the potential well. The multicarrier-signal generator 742 is a device that provides component waveforms having at least one predetermined set of state variables (diversity parameters) to the modulator 740. The multicarrier-signal generator 342 may include a field generator (not shown) that adjusts the state $\psi(x_i,\Phi_j,f_k,A_l)$ of the waveforms.

A receiver system 755 includes a channel coupler 759 connected to a filter 751, a phase adjuster 752, and a combiner 753. The channel coupler 759 may include a potential well. The filter 751, phase adjuster 752, and combiner 753 may be embodied by a field controller 750 that adjusts the state $\psi(x_i,\Phi_j,f_k,A_l)$ of the waveforms comprising the potential well to stimulate resonant tunneling of desired information-bearing waveforms. The field controller 750 causes the functions of the filter 751, phase adjuster 752, and combiner 753 to be performed under the condition of resonant tunneling, resulting in a coherent superposition of the waveforms of the desired information-bearing signal. The coherent superposition is processed in a signal processor 754. The signal processor 754 may include a sensor (not shown) for converting the coherent superposition into an electrical signal. The signal processor 754 may also include a demodulator (not shown) for demodulating and/or decoding the electrical signal to extract or otherwise detect the information signal. The processor 754 may provide additional forms of signal processing including, but not limited to, sampling, filtering, amplifying, down converting, up converting, mixing, multi-user detection, interference cancellation, and applying any type of transform or inverse-transform operation.

An optional feedback circuit 756 may be used to control the function of the field controller 750 based on signals received and/or processed in the signal processor 754. For example, when a tunneling current is detected, the feedback circuit 756 responds to changes in the current and adjusts the field produced by the field controller 750 until the current reaches a desired value.

7. Scope of the Invention

In the preferred embodiments, several kinds of CI and interferometry multiplexing are demonstrated to provide a basic understanding of diversity reception and spatial demultiplexing of signals having an underlying quantum-interferometry architecture. With respect to this understanding, many aspects of this invention may vary. For example, signal spaces and diversity parameters may include redundantly modulated signal spaces.

For illustrative purposes, the operation of the invention is represented by flowcharts. It should be understood, however, that the use of flowcharts is for illustrative purposes only, and is not limiting. For example, the invention is not limited to the operational embodiment(s) represented by the flowcharts. Instead, alternative operational embodiments will be apparent to persons skilled in the relevant art(s) based on the discussion contained herein. Also, the use of flowcharts should not be interpreted as limiting the invention to discrete or digital operation. In practice, as will be appreciated by persons skilled in the relevant art(s) based on the herein discussion, the invention can be achieved via discrete or continuous operation, or a combination thereof. Further, the flow of control represented by the flowcharts is provided for illustrative purposes only. As will be appreciated by persons skilled in the relevant art(s), other operational control flows are within the scope and spirit of the present invention.

Exemplary structural embodiments for implementing the methods of the invention are also described. It should be understood that the invention is not limited to the particular embodiments described herein. Alternate embodiments (equivalents, extensions, variations, deviations, combinations, etc.) of the methods and structural embodiments of the invention and the related art will be apparent to persons skilled in the relevant arts based on the teachings contained herein. The invention is intended and adapted to include such alternate embodiments. Such equivalents, extensions, variations, deviations, combinations, etc., are within the scope and spirit of the present invention.

Signal processing with respect to sinusoidal oscillating signals are described herein. Those skilled in the art will recognize there are other types of periodic oscillating signals that could be alternatively used, including, but not limited to, sinusoids, square waves, triangle waves, and arbitrary waveforms.

The foregoing discussion and the claims that follow describe the preferred embodiments of the present invention. With respect to the claims, it should be understood that changes could be made without departing from the essence of the invention. To the extent such changes embody the essence of the present invention, each naturally falls within the breadth of protection encompassed by this patent. This is particularly true for the present invention because its basic concepts and understandings are fundamental in nature and can be broadly applied.

What is claimed is:

1. An electromagnetic-wave transmission system capable of generating at least one time-domain signal from a superposition of a plurality of carrier signals, the transmission system including:

a multicarrier-signal generator capable of generating a plurality of carrier signals, a complex-weight generator coupled to the multicarrier-signal generator adapted to generate a plurality of complex carrier weights to map at least one information symbol into at least one pulse waveform resulting from a superposition of the carrier signals and centered at a predetermined time, and a combiner coupled to at least one of the complex-weighting system and the multicarrier-signal generator, the combiner capable of combining the plurality of carrier signals to produce a superposition signal having at least one desired time-domain property resulting from interference between the carrier signals.

2. The transmission system recited in claim 1, wherein the complex-weight generator is adapted to control at least one of a set of carrier signal parameters, including amplitude, phase, and frequency.

3. The transmission system recited in claim 1 wherein the multicarrier-signal generator is adapted to generate at least one multicarrier signal characterized by at least one set of orthogonalizing properties, including time intervals, frequencies, subspaces, polarizations, modes, and orthogonal codes.

4. The transmission system recited in claim 1 wherein the complex-weight generator is adapted to map a plurality of information symbols into a plurality of orthogonal pulse waveforms to generate a sequence of orthogonal information-modulated superposition signals.

5. The transmission system recited in claim 1 wherein the multicarrier generator is adapted to generate a number N of orthogonal carriers having a uniform carrier frequency separation $f_s$, and the complex-weight generator is adapted to apply a plurality of complex weights to the orthogonal carriers to generate N orthogonal information-modulated pulse waveforms in a symbol interval $T=1/f_s$.

6. The transmission system recited in claim 1 wherein the complex-weight generator is adapted to provide for at least one of a plurality of data multiplexing processes, including time division multiplexing, code division multiplexing, and orthogonal frequency division multiplexing.

7. The transmission system recited in claim 1 wherein the complex-weight generator is adapted to generate a plurality of weights characterized by at least one of a set of weights, including windowing weights, channel-compensation weights, code weights, and weights that facilitate signal separation via cancellation.

8. The transmission system recited in claim 1 wherein the complex-weight generator includes a modulator.

9. The transmission system recited in claim 1 further including a processor coupled to the combiner, the processor adapted to perform at least one of a set of signal processing functions, including selecting a subset of the carrier signals, providing filtering, providing digital-to-analog conversion, providing analog-to-digital conversion, providing amplification, providing frequency up-conversion, providing array processing, and providing coupling into a communication channel.

10. The transmission system recited in claim 1 wherein the complex-weight generator includes a superposition controller and a modulator, the modulator adapted to modulate at least one information signal onto the carrier signals and the superposition controller adapted to provide at least one predetermined set of weights to the carrier signals for providing a predetermined superposition signal.

11. The transmission system recited in claim 1 wherein the multicarrier-signal generator includes at least one of a set of signal generators, including a pulse generator, a plurality of local oscillators, a mode-locked system, a frequency-shifted feedback system, an FFT circuit, an IFFT circuit, a nonlinear system capable of generating harmonic and/or inter-modulation products, and a wideband signal generator coupled to a filter bank.

12. The transmission system recited in claim 1 wherein the multicarrier-signal generator and the combiner are implemented as an invertible transform function and the complex-weight generator is adapted to weight the bins of the invertible transform function.

13. The transmission system recited in claim 12, wherein the invertible transform function is implemented with at least one of a fast Fourier transform and an inverse fast Fourier transform.

14. The transmission system recited in claim 1 further including a filter for selecting a predetermined plurality of the carrier signals for transmission.

15. The transmission system recited in claim 1 wherein at least one of the multicarrier-signal generator, the complex-weight generator, and the combiner is adapted to provide at least one of the plurality of carrier signals with frequency hopping.

* * * * *